(12) United States Patent
Gruner-Nielsen et al.

(10) Patent No.: US 9,709,731 B2
(45) Date of Patent: Jul. 18, 2017

(54) MULTIPLE LP-MODE FIBER DESIGNS FOR MODE-DIVISION MULTIPLEXING

(71) Applicant: OFS Fitel, LLC, Norcross, GA (US)

(72) Inventors: Lars Gruner-Nielsen, Copenhagen (DK); Robert L. Lingle, Johns Creek, GA (US); David W. Peckham, Lawrenceville, GA (US); Yi Sun, Suwanee, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/575,821

(22) Filed: Dec. 18, 2014

(65) Prior Publication Data

US 2015/0168643 A1 Jun. 18, 2015

Related U.S. Application Data

(63) Continuation-in-part of application No. 13/838,981, filed on Mar. 15, 2013, now Pat. No. 8,948,559.

(60) Provisional application No. 62/060,138, filed on Oct. 6, 2014, provisional application No. 61/696,932, filed on Sep. 5, 2012.

(51) Int. Cl.
*G02B 6/028* (2006.01)
*G02B 6/26* (2006.01)

(52) U.S. Cl.
CPC ............ *G02B 6/0288* (2013.01); *G02B 6/268* (2013.01)

(58) Field of Classification Search
CPC .. G02B 6/0288; G02B 6/268; G02B 6/03661; G02B 6/03672; G02B 6/03683
See application file for complete search history.

(56) References Cited

U.S. PATENT DOCUMENTS

| 4,889,404 | A | 12/1989 | Bhagavatula | |
|---|---|---|---|---|
| 7,272,286 | B2 * | 9/2007 | Provost | G02B 6/02014 385/123 |
| 7,450,807 | B2 * | 11/2008 | Bickham | G02B 6/0365 385/123 |
| 7,555,187 | B2 * | 6/2009 | Bickham | G02B 6/0365 385/125 |

(Continued)

FOREIGN PATENT DOCUMENTS

WO 2012161809 A1 11/2012

OTHER PUBLICATIONS

Kubota et al., Intermodal group velocity dispersion of few-mode fiber, IEICE Electronics Express, Oct. 25, 2010, vol. 7, No. 20, pp. 1552-1556.

*Primary Examiner* — Rhonda Peace
(74) *Attorney, Agent, or Firm* — Jacobs + Kim LLP

(57) ABSTRACT

A few-mode fiber is described, having a graded-index core and a surrounding cladding comprising a ledge between the core and the trench, a down-doped trench abutting the ledge, and an undoped cladding region abutting the trench. The fiber's refractive index profile is configured to support 9 or more LP modes for transmission of a spatially-multiplexed optical signal. Undesired modes have respective effective indices that are close to, or less than, the cladding index so as to result in leakage of the undesired modes into the outer cladding. The index spacing between the desired mode having the lowest effective index and the leaky mode with the highest effective index is sufficiently large so as to substantially prevent coupling therebetween.

6 Claims, 45 Drawing Sheets

(56) References Cited

U.S. PATENT DOCUMENTS

| | | | |
|---|---|---|---|
| 7,787,732 B2* | 8/2010 | Sugizaki | G02B 6/02004 385/123 |
| 7,865,050 B1* | 1/2011 | Sun | G02B 6/0288 385/123 |
| 8,189,978 B1* | 5/2012 | Bennett | G02B 6/0365 385/124 |
| 8,406,593 B2* | 3/2013 | Molin | G02B 6/0288 385/124 |
| 8,428,410 B2* | 4/2013 | Molin | G02B 6/0288 385/124 |
| 8,483,535 B2* | 7/2013 | Molin | G02B 6/03666 385/126 |
| 8,520,993 B2* | 8/2013 | Molin | G02B 6/0288 385/124 |
| 8,639,079 B2* | 1/2014 | Molin | G02B 6/0281 385/123 |
| 8,644,664 B2* | 2/2014 | Molin | G02B 6/0281 385/124 |
| 8,687,932 B2* | 4/2014 | Peckham | G02B 6/03683 385/124 |
| 8,693,834 B2* | 4/2014 | Bickham | G02B 6/0288 385/127 |
| 8,705,922 B2* | 4/2014 | Bickham | G02B 6/0288 385/123 |
| 8,718,431 B2* | 5/2014 | Peckham | G02B 6/03683 385/127 |
| 8,768,129 B2* | 7/2014 | Peckham | G02B 6/03683 385/124 |
| 8,792,763 B2* | 7/2014 | Bickham | G02B 6/0288 385/126 |
| 8,879,878 B2* | 11/2014 | Bigot-Astruc | G02B 6/0288 385/126 |
| 8,948,559 B2* | 2/2015 | Gruner-Nielsen | G02B 6/0288 385/124 |
| 8,977,092 B2* | 3/2015 | Bickham | G02B 6/0288 385/124 |
| 9,014,525 B2* | 4/2015 | Molin | G02B 6/03627 385/127 |
| 2009/0086770 A1* | 4/2009 | Sugizaki | G02B 6/02004 372/6 |
| 2010/0067858 A1 | 3/2010 | Kim et al. | |
| 2010/0329671 A1 | 12/2010 | Essiambre et al. | |
| 2011/0002590 A1* | 1/2011 | Ooizumi | G02B 6/0288 385/124 |
| 2011/0058781 A1* | 3/2011 | Molin | G02B 6/0288 385/126 |
| 2011/0135262 A1* | 6/2011 | Molin | G02B 6/0288 385/124 |
| 2011/0194827 A1* | 8/2011 | Jiang | G02B 6/0288 385/124 |
| 2011/0243519 A1 | 10/2011 | Jiang et al. | |
| 2012/0183267 A1* | 7/2012 | Jiang | G02B 6/02023 385/124 |
| 2012/0195549 A1* | 8/2012 | Molin | G02B 6/0281 385/28 |
| 2012/0230638 A1* | 9/2012 | Bickham | G02B 6/0288 385/124 |
| 2012/0251062 A1* | 10/2012 | Molin | G02B 6/0281 385/124 |
| 2012/0328255 A1* | 12/2012 | Bickham | G02B 6/02019 385/124 |
| 2013/0004135 A1* | 1/2013 | Bigot-Astruc | G02B 6/0288 385/126 |
| 2013/0028564 A1* | 1/2013 | Molin | G02B 6/03627 385/124 |
| 2013/0071079 A1* | 3/2013 | Peckham | G02B 6/03683 385/124 |
| 2013/0071080 A1* | 3/2013 | Peckham | G02B 6/03683 385/124 |
| 2013/0071081 A1* | 3/2013 | Peckham | G02B 6/03683 385/124 |
| 2013/0071114 A1* | 3/2013 | Bickham | G02B 6/0288 398/44 |
| 2013/0322837 A1* | 12/2013 | Bickham | G02B 6/0288 385/124 |
| 2014/0064686 A1* | 3/2014 | Lars | G02B 6/0288 385/124 |
| 2015/0168643 A1* | 6/2015 | Gruner-Nielsen | G02B 6/0288 385/124 |

* cited by examiner

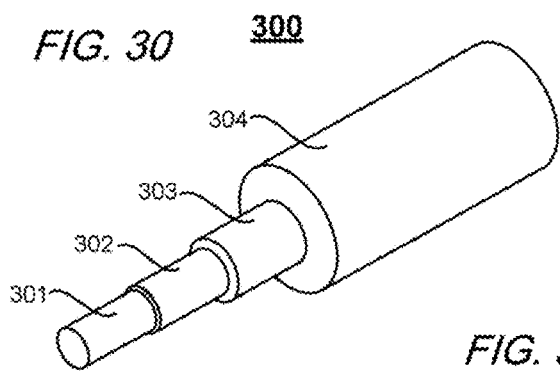
FIG. 30
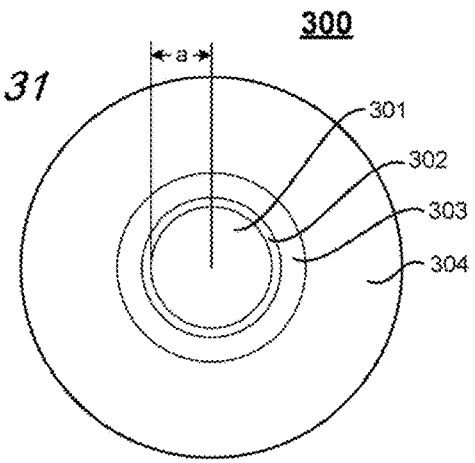
FIG. 31
FIG. 32
| Region | Start Index | End Index | Alpha | Width (um) |
|---|---|---|---|---|
| 1 | 0.0095 | 0.0000 | 1.9820 | 15.0000 |
| 2 | 0.0000 | 0.0000 | 0.0000 | 1.2200 |
| 3 | -0.0040 | -0.0040 | 0.0000 | 5.0000 |
| 4 | 0.0000 | 0.0000 | 0.0000 | 31.0000 |

| Mode Group | Mode(s) | Loss (dB/km) |
|---|---|---|
| 1 | $LP_{01}$ | 0.20 |
| 2 | $LP_{11}$ | 0.20 |
| 3 | $LP_{21/02}$ | 0.21 |
| 4 | $LP_{31/12/41/22/03}$ | 0.22 |

| Region | Start Index | End Index | Alpha | Width (um) |
|---|---|---|---|---|
| 1 | 0.0068 | 0.0000 | 1.9870 | 17.80 |
| 2 | 0.0000 | 0.0000 | 0.0000 | 1.80 |
| 3 | -0.0040 | -0.0040 | 0.0000 | 5.00 |
| 4 | 0.0000 | 0.0000 | 0.0000 | 31.00 |

450

| wavelength (μm) | effective area (μm²) | | | | | | | | |
|---|---|---|---|---|---|---|---|---|---|
| | 0,1 | 1,1 | 0,2 | 2,1 | 1,2 | 3,1 | 0,3 | 2,2 | 4,1 |
| 1.485 | 160 | 214 | 322 | 285 | 344 | 343 | 470 | 430 | 393 |
| 1.490 | 160 | 214 | 323 | 286 | 345 | 344 | 472 | 432 | 394 |
| 1.495 | 161 | 215 | 324 | 287 | 346 | 345 | 473 | 433 | 396 |
| 1.500 | 161 | 216 | 325 | 288 | 347 | 347 | 475 | 435 | 397 |
| 1.505 | 162 | 217 | 326 | 289 | 348 | 348 | 477 | 436 | 398 |
| 1.510 | 163 | 217 | 327 | 290 | 349 | 349 | 478 | 438 | 400 |
| 1.515 | 163 | 218 | 328 | 291 | 351 | 350 | 480 | 439 | 401 |
| 1.520 | 164 | 219 | 329 | 292 | 352 | 351 | 481 | 441 | 402 |
| 1.525 | 164 | 220 | 330 | 293 | 353 | 353 | 483 | 442 | 404 |
| 1.530 | 165 | 220 | 331 | 294 | 354 | 354 | 485 | 443 | 405 |
| 1.535 | 165 | 221 | 333 | 295 | 355 | 355 | 486 | 445 | 406 |
| 1.540 | 166 | 222 | 334 | 296 | 357 | 356 | 488 | 446 | 408 |
| 1.545 | 166 | 222 | 335 | 297 | 358 | 357 | 489 | 448 | 409 |
| 1.550 | 167 | 223 | 336 | 298 | 359 | 358 | 491 | 449 | 410 |
| 1.555 | 168 | 224 | 337 | 299 | 360 | 360 | 493 | 451 | 412 |
| 1.560 | 168 | 225 | 338 | 300 | 361 | 361 | 494 | 452 | 413 |
| 1.565 | 169 | 225 | 339 | 301 | 362 | 362 | 496 | 454 | 414 |
| 1.570 | 169 | 226 | 340 | 302 | 364 | 363 | 497 | 455 | 416 |
| 1.575 | 170 | 227 | 341 | 303 | 365 | 364 | 499 | 457 | 417 |
| 1.580 | 170 | 228 | 343 | 304 | 366 | 366 | 500 | 458 | 418 |
| 1.585 | 171 | 228 | 344 | 305 | 367 | 367 | 502 | 459 | 420 |
| 1.590 | 171 | 229 | 345 | 306 | 368 | 368 | 504 | 461 | 421 |
| 1.595 | 172 | 230 | 346 | 307 | 369 | 369 | 505 | 462 | 423 |
| 1.600 | 172 | 230 | 347 | 308 | 371 | 370 | 507 | 464 | 424 |
| 1.605 | 173 | 231 | 348 | 309 | 372 | 371 | 508 | 465 | 425 |
| 1.610 | 174 | 232 | 349 | 310 | 373 | 373 | 510 | 467 | 427 |
| 1.615 | 174 | 233 | 350 | 311 | 374 | 374 | 511 | 468 | 428 |
| 1.620 | 175 | 233 | 351 | 312 | 375 | 375 | 513 | 470 | 429 |
| 1.625 | 175 | 234 | 352 | 313 | 377 | 376 | 515 | 471 | 431 |
| 1.630 | 176 | 235 | 354 | 314 | 378 | 377 | 516 | 472 | 432 |

*FIG. 45*

FIG. 46
460
| Region | Start Index | End Index | Alpha | Width (um) |
|---|---|---|---|---|
| 1 | 0.0095 | 0.0000 | 1.9835 | 14.00 |
| 2 | 0.0000 | 0.0000 | 0.0000 | 1.39 |
| 3 | -0.0050 | -0.0050 | 0.0000 | 6.00 |
| 4 | 0.0000 | 0.0000 | 0.0000 | 31.00 |
FIG. 47
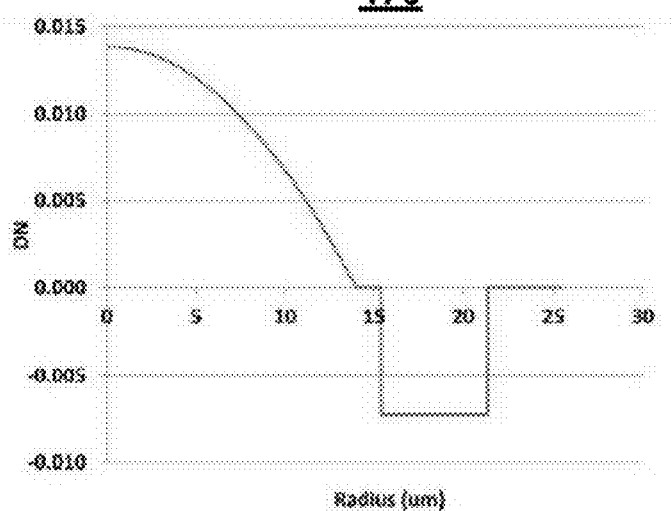
FIG. 48
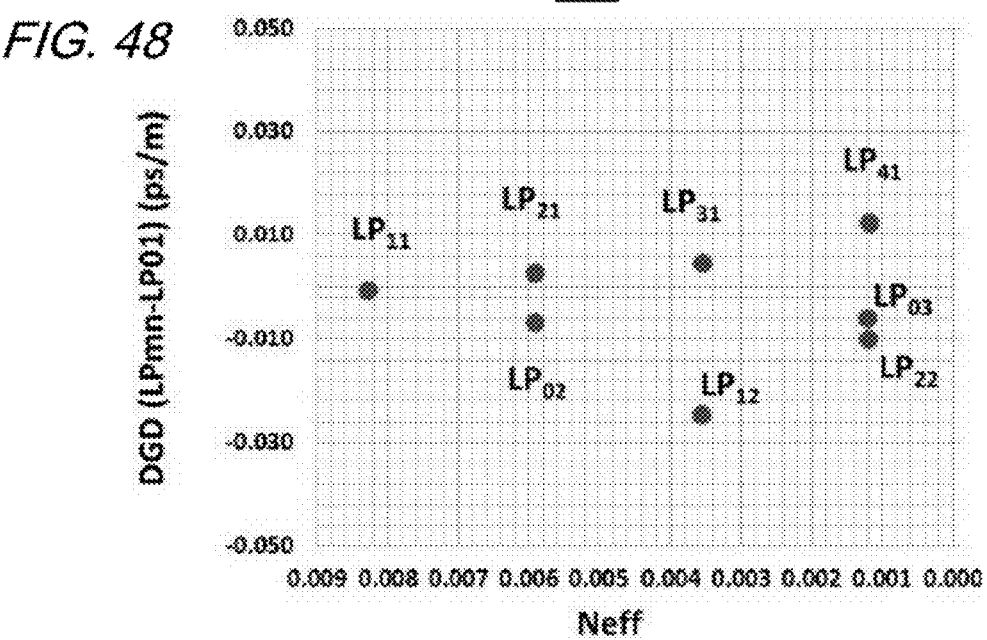

| wavelength (μm) | effective area (μm²) | | | | | | | | |
|---|---|---|---|---|---|---|---|---|---|
| | 0,1 | 1,1 | 0,2 | 2,1 | 1,2 | 3,1 | 0,3 | 2,2 | 4,1 |
| 1.395 | 100 | 133 | 201 | 178 | 215 | 214 | 294 | 269 | 245 |
| 1.400 | 100 | 134 | 201 | 179 | 215 | 215 | 295 | 270 | 246 |
| 1.405 | 100 | 134 | 202 | 179 | 216 | 216 | 296 | 271 | 247 |
| 1.410 | 101 | 135 | 203 | 180 | 217 | 217 | 298 | 272 | 248 |
| 1.415 | 101 | 135 | 204 | 181 | 218 | 217 | 299 | 273 | 249 |
| 1.420 | 101 | 136 | 204 | 181 | 219 | 218 | 300 | 274 | 250 |
| 1.425 | 102 | 136 | 205 | 182 | 219 | 219 | 301 | 275 | 251 |
| 1.430 | 102 | 137 | 206 | 183 | 220 | 220 | 302 | 276 | 252 |
| 1.435 | 103 | 137 | 207 | 183 | 221 | 221 | 303 | 277 | 253 |
| 1.440 | 103 | 138 | 207 | 184 | 222 | 221 | 304 | 278 | 254 |
| 1.445 | 103 | 138 | 208 | 185 | 222 | 222 | 305 | 279 | 255 |
| 1.450 | 104 | 139 | 209 | 185 | 223 | 223 | 306 | 280 | 255 |
| 1.455 | 104 | 139 | 210 | 186 | 224 | 224 | 307 | 281 | 256 |
| 1.460 | 104 | 140 | 210 | 187 | 225 | 224 | 308 | 282 | 257 |
| 1.465 | 105 | 140 | 211 | 187 | 226 | 225 | 309 | 283 | 258 |
| 1.470 | 105 | 141 | 212 | 188 | 226 | 226 | 310 | 284 | 259 |
| 1.475 | 105 | 141 | 213 | 189 | 227 | 227 | 311 | 285 | 260 |
| 1.480 | 106 | 142 | 213 | 189 | 228 | 228 | 313 | 286 | 261 |
| 1.485 | 106 | 142 | 214 | 190 | 229 | 228 | 314 | 287 | 262 |
| 1.490 | 107 | 143 | 215 | 191 | 230 | 229 | 315 | 288 | 263 |
| 1.495 | 107 | 143 | 215 | 191 | 230 | 230 | 316 | 289 | 264 |
| 1.500 | 107 | 144 | 216 | 192 | 231 | 231 | 317 | 290 | 264 |
| 1.505 | 108 | 144 | 217 | 192 | 232 | 232 | 318 | 291 | 265 |
| 1.510 | 108 | 144 | 218 | 193 | 233 | 232 | 319 | 292 | 266 |
| 1.515 | 108 | 145 | 218 | 194 | 234 | 233 | 320 | 293 | 267 |
| 1.520 | 109 | 145 | 219 | 194 | 234 | 234 | 321 | 294 | 268 |
| 1.525 | 109 | 146 | 220 | 195 | 235 | 235 | 322 | 295 | 269 |
| 1.530 | 109 | 146 | 221 | 196 | 236 | 235 | 323 | 296 | 270 |
| 1.535 | 110 | 147 | 221 | 196 | 237 | 236 | 324 | 296 | 271 |
| 1.540 | 110 | 147 | 222 | 197 | 237 | 237 | 325 | 297 | 272 |

| wavelength (μm) | effective area (μm²) | | | | | | | | |
|---|---|---|---|---|---|---|---|---|---|
| | 0,1 | 1,1 | 0,2 | 2,1 | 1,2 | 3,1 | 0,3 | 2,2 | 4,1 |
| 1.545 | 111 | 148 | 223 | 198 | 238 | 238 | 326 | 298 | 273 |
| 1.550 | 111 | 149 | 224 | 199 | 240 | 239 | 328 | 300 | 274 |
| 1.555 | 111 | 149 | 224 | 199 | 240 | 239 | 328 | 300 | 274 |
| 1.560 | 112 | 149 | 225 | 200 | 241 | 240 | 329 | 301 | 275 |
| 1.565 | 112 | 150 | 226 | 200 | 241 | 241 | 331 | 302 | 276 |
| 1.570 | 112 | 150 | 227 | 201 | 242 | 242 | 332 | 303 | 277 |
| 1.575 | 113 | 151 | 227 | 202 | 243 | 243 | 333 | 304 | 278 |
| 1.580 | 113 | 151 | 228 | 202 | 244 | 243 | 334 | 305 | 279 |
| 1.585 | 113 | 152 | 229 | 203 | 245 | 244 | 335 | 306 | 280 |
| 1.590 | 114 | 152 | 229 | 204 | 245 | 245 | 336 | 307 | 281 |
| 1.595 | 114 | 153 | 230 | 204 | 246 | 246 | 337 | 308 | 282 |
| 1.600 | 115 | 153 | 231 | 205 | 247 | 247 | 338 | 309 | 282 |
| 1.605 | 115 | 154 | 232 | 206 | 248 | 247 | 339 | 310 | 283 |
| 1.610 | 115 | 154 | 232 | 206 | 248 | 248 | 340 | 311 | 284 |
| 1.615 | 116 | 155 | 233 | 207 | 249 | 249 | 341 | 312 | 285 |
| 1.620 | 116 | 155 | 234 | 207 | 250 | 250 | 342 | 313 | 286 |
| 1.625 | 116 | 156 | 235 | 208 | 251 | 250 | 343 | 314 | 287 |
| 1.630 | 117 | 156 | 235 | 209 | 252 | 251 | 344 | 315 | 288 |
| 1.635 | 117 | 157 | 236 | 209 | 252 | 252 | 345 | 316 | 289 |
| 1.640 | 117 | 157 | 237 | 210 | 253 | 253 | 346 | 317 | 290 |
| 1.645 | 118 | 158 | 238 | 211 | 254 | 254 | 347 | 318 | 290 |
| 1.650 | 118 | 158 | 238 | 211 | 255 | 254 | 348 | 319 | 291 |
| 1.655 | 119 | 159 | 239 | 212 | 256 | 255 | 350 | 320 | 292 |
| 1.660 | 119 | 159 | 240 | 213 | 256 | 256 | 351 | 321 | 293 |
| 1.665 | 119 | 160 | 241 | 213 | 257 | 257 | 352 | 322 | 294 |
| 1.670 | 120 | 160 | 241 | 214 | 258 | 257 | 353 | 323 | 295 |
| 1.675 | 120 | 161 | 242 | 215 | 259 | 258 | 354 | 324 | 296 |
| 1.680 | 120 | 161 | 243 | 215 | 259 | 259 | 355 | 325 | 297 |
| 1.685 | 121 | 161 | 243 | 216 | 260 | 260 | 356 | 326 | 298 |
| 1.690 | 121 | 162 | 244 | 217 | 261 | 261 | 357 | 327 | 299 |

(END OF TABLE)

FIG. 49 (CONT'D)

FIG. 50
500
| Region | Start Index | End Index | Alpha | Width (um) |
|---|---|---|---|---|
| 1 | 0.0095 | 0.0000 | 1.9850 | 13.500 |
| 2 | 0.0000 | 0.0000 | 0.0000 | 1.535 |
| 3 | -0.0060 | -0.0060 | 0.0000 | 5.000 |
| 4 | 0.0000 | 0.0000 | 0.0000 | 31.000 |
FIG. 51
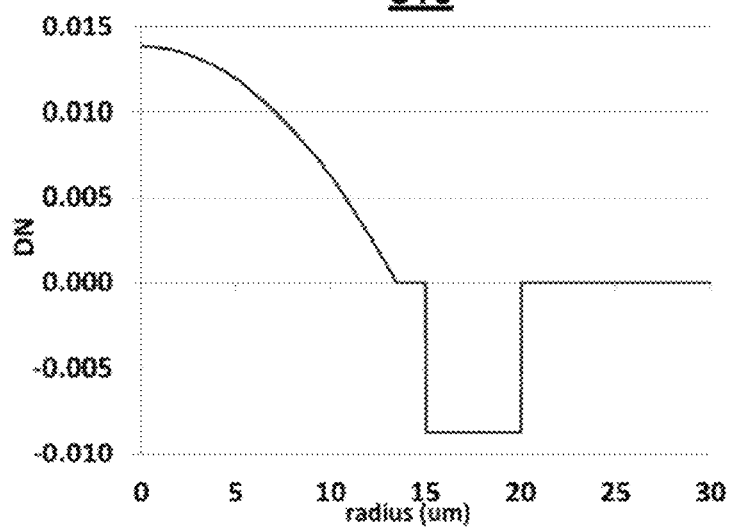
FIG. 52
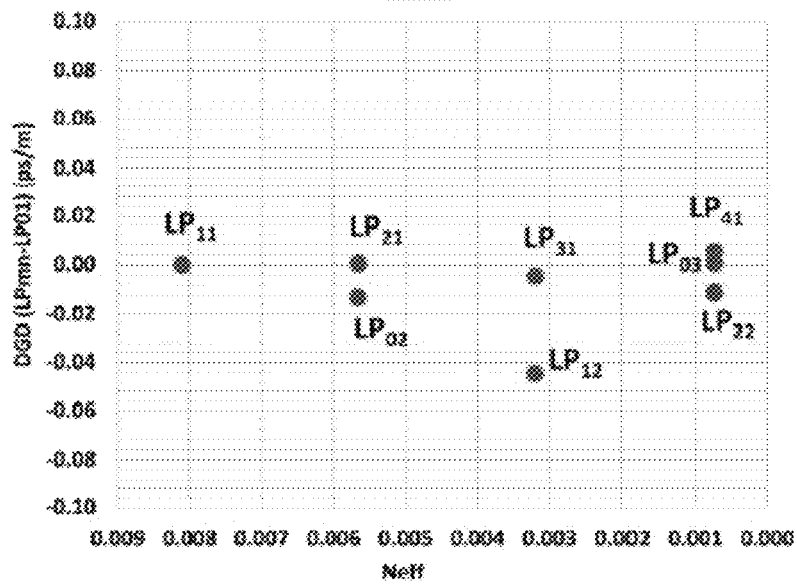

530 effective area (um^2)

| wavelength (um) | 0,1 | 1,1 | 0,2 | 2,1 | 1,2 | 3,1 | 0,3 | 2,2 | 4,1 |
|---|---|---|---|---|---|---|---|---|---|
| 1.395 | 96 | 129 | 194 | 172 | 207 | 207 | 284 | 260 | 237 |
| 1.400 | 96 | 129 | 194 | 172 | 208 | 207 | 286 | 261 | 238 |
| 1.405 | 97 | 130 | 195 | 173 | 209 | 208 | 287 | 262 | 239 |
| 1.410 | 97 | 130 | 196 | 174 | 209 | 209 | 288 | 263 | 240 |
| 1.415 | 98 | 130 | 197 | 174 | 210 | 210 | 289 | 264 | 241 |
| 1.420 | 98 | 131 | 197 | 175 | 211 | 211 | 290 | 265 | 241 |
| 1.425 | 98 | 131 | 198 | 176 | 212 | 211 | 291 | 266 | 242 |
| 1.430 | 99 | 132 | 199 | 176 | 213 | 212 | 292 | 267 | 243 |
| 1.435 | 99 | 132 | 199 | 177 | 213 | 213 | 293 | 268 | 244 |
| 1.440 | 99 | 133 | 200 | 178 | 214 | 214 | 294 | 269 | 245 |
| 1.445 | 100 | 133 | 201 | 178 | 215 | 214 | 295 | 269 | 246 |
| 1.450 | 100 | 134 | 201 | 179 | 216 | 215 | 296 | 270 | 247 |
| 1.455 | 100 | 134 | 202 | 179 | 216 | 216 | 297 | 271 | 248 |
| 1.460 | 101 | 135 | 203 | 180 | 217 | 217 | 298 | 272 | 248 |
| 1.465 | 101 | 135 | 204 | 181 | 218 | 217 | 299 | 273 | 249 |
| 1.470 | 101 | 136 | 204 | 181 | 219 | 218 | 300 | 274 | 250 |
| 1.475 | 102 | 136 | 205 | 182 | 219 | 219 | 301 | 275 | 251 |
| 1.480 | 102 | 137 | 206 | 183 | 220 | 220 | 302 | 276 | 252 |
| 1.485 | 102 | 137 | 206 | 183 | 221 | 220 | 303 | 277 | 253 |
| 1.490 | 103 | 138 | 207 | 184 | 222 | 221 | 304 | 278 | 254 |
| 1.495 | 103 | 138 | 208 | 184 | 222 | 222 | 305 | 279 | 255 |
| 1.500 | 104 | 138 | 209 | 185 | 223 | 223 | 306 | 280 | 255 |
| 1.505 | 104 | 139 | 209 | 186 | 224 | 224 | 307 | 281 | 256 |
| 1.510 | 104 | 139 | 210 | 186 | 225 | 224 | 308 | 282 | 257 |
| 1.515 | 105 | 140 | 211 | 187 | 226 | 225 | 309 | 283 | 258 |
| 1.520 | 105 | 140 | 211 | 188 | 226 | 226 | 310 | 283 | 259 |
| 1.525 | 105 | 141 | 212 | 188 | 227 | 227 | 311 | 284 | 260 |
| 1.530 | 106 | 141 | 213 | 189 | 228 | 227 | 312 | 285 | 261 |
| 1.535 | 106 | 142 | 214 | 189 | 229 | 228 | 313 | 286 | 261 |
| 1.540 | 106 | 142 | 214 | 190 | 229 | 229 | 314 | 287 | 262 |
| 1.545 | 107 | 143 | 215 | 191 | 230 | 230 | 315 | 288 | 263 |
| 1.550 | 107 | 143 | 216 | 191 | 231 | 230 | 316 | 289 | 264 |
| 1.555 | 107 | 144 | 216 | 192 | 232 | 231 | 317 | 290 | 265 |
| 1.560 | 108 | 144 | 217 | 193 | 232 | 232 | 318 | 291 | 266 |
| 1.565 | 108 | 145 | 218 | 193 | 233 | 233 | 319 | 292 | 267 |
| 1.570 | 108 | 145 | 219 | 194 | 234 | 233 | 320 | 293 | 268 |
| 1.575 | 109 | 145 | 219 | 195 | 235 | 234 | 321 | 294 | 268 |
| 1.580 | 109 | 146 | 220 | 195 | 235 | 235 | 322 | 295 | 269 |
| 1.585 | 109 | 146 | 221 | 196 | 236 | 236 | 323 | 295 | 270 |
| 1.590 | 110 | 147 | 221 | 196 | 237 | 236 | 324 | 296 | 271 |
| 1.595 | 110 | 147 | 222 | 197 | 238 | 237 | 325 | 297 | 272 |
| 1.600 | 111 | 148 | 223 | 198 | 238 | 238 | 326 | 298 | 273 |
| 1.605 | 111 | 148 | 224 | 198 | 239 | 239 | 327 | 299 | 274 |
| 1.610 | 111 | 149 | 224 | 199 | 240 | 239 | 328 | 300 | 274 |
| 1.615 | 112 | 149 | 225 | 200 | 241 | 240 | 329 | 301 | 275 |
| 1.620 | 112 | 150 | 226 | 200 | 241 | 241 | 330 | 302 | 276 |
| 1.625 | 112 | 150 | 226 | 201 | 242 | 242 | 331 | 303 | 277 |
| 1.630 | 113 | 151 | 227 | 201 | 243 | 242 | 332 | 304 | 278 |
| 1.635 | 113 | 151 | 228 | 202 | 244 | 243 | 333 | 305 | 279 |
| 1.640 | 113 | 152 | 229 | 203 | 244 | 244 | 335 | 306 | 280 |

| Region | Start Index | End Index | Alpha | Width (um) |
|---|---|---|---|---|
| 1 | 0.0095 | 0.0000 | 1.9830 | 17.00 |
| 2 | 0.0000 | 0.0000 | 0.0000 | 1.38 |
| 3 | -0.0040 | -0.0040 | 0.0000 | 5.00 |
| 4 | 0.0000 | 0.0000 | 0.0000 | 31.00 |

560

| Region | Start Index | End Index | Alpha | Width (um) |
|---|---|---|---|---|
| 1 | 0.0095 | 0.0000 | 1.9840 | 20.00 |
| 2 | 0.0000 | 0.0000 | 0.0000 | 1.60 |
| 3 | -0.0040 | -0.0040 | 0.0000 | 5.00 |
| 4 | 0.0000 | 0.0000 | 0.0000 | 31.00 |

580

| Region | Start Index | End Index | Alpha | Width (um) |
|---|---|---|---|---|
| 1 | 0.0095 | 0.0000 | 1.9830 | 22.50 |
| 2 | 0.0000 | 0.0000 | 0.0000 | 1.75 |
| 3 | -0.0040 | -0.0040 | 0.0000 | 5.00 |
| 4 | 0.0000 | 0.0000 | 0.0000 | 31.00 |

US 9,709,731 B2

MULTIPLE LP-MODE FIBER DESIGNS FOR MODE-DIVISION MULTIPLEXING

CROSS REFERENCE TO RELATED APPLICATIONS

The present application claims the priority benefit of U.S. Prov. Pat. App. No. 62/060,138, filed on Oct. 6, 2014.

The present application is a continuation-in-part of U.S. patent application Ser. No. 13/838,981, which was filed on Mar. 15, 2013, and which was published as United States Pat. Pub. No. 2014/0064686 on Mar. 6, 2014.

U.S. patent application Ser. No. 13/838,981 claims priority from U.S. Prov. App. No. 61/696,932 filed Sep. 5, 2012.

The above applications are owned by the assignee of the present invention and are incorporated herein by reference in their entirety.

BACKGROUND OF THE INVENTION

Field of the Invention

The invention relates to optical fibers designed for space-division multiplexing (SDM). More specifically it relates to optical fibers that efficiently transmit optical signals in multiple modes without substantial crosstalk.

Background of the Invention (The following may or may not constitute prior art.)

Previous work on multiple mode optical fibers for mode-division multiplexing focused on step and graded index (GRIN) fiber designs for optimized two LP mode fibers (having three spatial modes). We have also disclosed GRIN fiber designs with 1% core relative deltas, including a shelf and trench in the cladding, which are optimized to support four LP modes (having six spatial modes).

SUMMARY OF INVENTION

We have now designed GRIN fibers with lower core relative delta (near 0.8%) which have desirable properties for transmission. These lower delta fibers will have lower attenuation losses due to reduced Rayleigh scattering, which is desirable to improve performance. We have also designed fibers with optimized-raised triangle, depressed-cladding profiles to support two and four LP modes. Recently work on fibers designed to support space-division multiplexing (SDM) has been reported. This work has generally focused either on fibers that contain multiple cores with weak coupling between the cores or on fibers with a single core that supports the propagation of a few modes.

An aspect of the invention is directed to a few-mode fiber having a graded-index core and a surrounding cladding. The cladding comprises a plurality of regions, including a ledge, a down-doped trench abutting the ledge, and an undoped outer cladding abutting the trench. The fiber's refractive index profile is configured to support 9 or more LP modes for transmission of a spatially-multiplexed optical signal. Undesired modes have respective effective indices that are close to, or less than, the cladding index so as to result in leakage of the undesired modes into the outer cladding. The index spacing between the desired mode having the lowest effective index and the leaky mode with the highest effective index is sufficiently large so as to substantially prevent coupling therebetween.

BRIEF DESCRIPTION OF THE DRAWINGS

FIGS. 30 and 31 show, respectively, cross section and isometric views of an exemplary FMF according to a further aspect of the invention (Example 10);

FIG. 32 shows a table setting forth design parameters for Regions 1-4 of Example 10;

FIG. 41 shows a table setting forth the measured modal loss for the four-mode groups of Example 10;

FIGS. 42-45 set forth data for a further example of a 9 LP mode FMF according to the invention (Example 11-1);

FIGS. 46-49 set forth data for another example of a 9 LP mode FMF according to the invention (Example 11-2);

FIGS. 50-53 set forth data for a further example of a 9 LP mode FMF according to the invention (Example 11-3);

DETAILED DESCRIPTION

Figure 1:
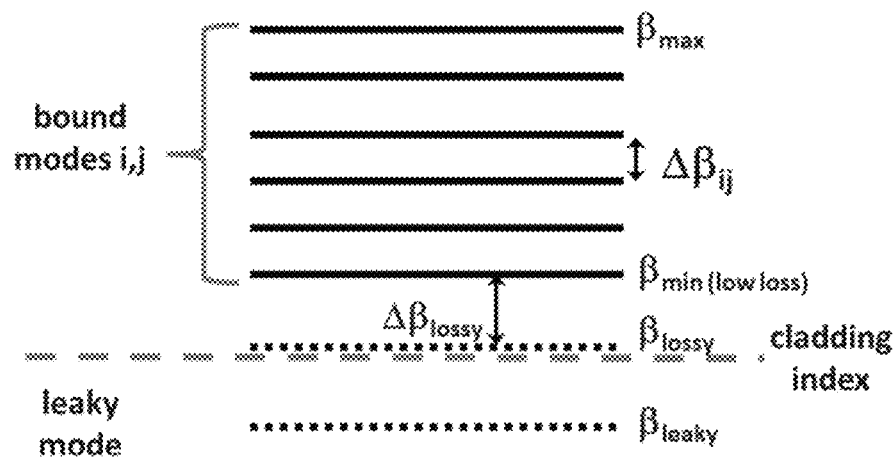
FIG. 1 is an illustrative diagram of modal propagation constants for a hypothetical step-index or graded-index few-mode fiber (FMF) with no cladding structure.

Interest in SDM is mainly due to the impending "capacity crunch," in which the fundamental, non-linear Shannon limit to increasing the spectral efficiency of fiber optic transmission will force carriers to deploy fiber cables at an accelerating rate, rather than simply deploying faster transmitters at decreasing marginal cost-per bit, thus destroying the economics of the backbone network. A rich new medium with 100 to 1000 times the capacity of standard single mode fiber (SSMF) would be required. Few-mode fiber (FMF) technology combined with multi-core fiber technology might create such a medium.

For use in high-capacity SDM transmission it is desirable that the waveguide:
  supports the low loss propagation of N unique modes, where N is at least 2 and possibly 10 to 20. Here, "low loss" is considered to be that of conventional single mode fiber.
  has low differential mode attenuation (DMA), for example less than about 0.02 dB/km. DMA is a fundamental, uncorrectable impairment that limits the capacity of transmission based on multiple-input, multiple output (MIMO) signal processing.
  provides low differential group delay (DGD) between all of the low loss modes so that the receiver design can be simplified. To support 1000 km transmission with ASIC technology that may be realizable on a 10-year timeframe, the accumulated DGD of a FMF transmission line probably needs to be equalizable with perhaps hundreds of T/2-spaced complex taps for a time domain equalizer. This represents a technological, but not a fundamental, limitation. The relationship between fiber DGD and accumulated DGD will be discussed below. In a contrary view, large DGD may have the beneficial impact of reducing non-linear crosstalk between modes. (As used herein, the term "differential group delay" or "DGD" as it relates to LP modes carried by an FMF is generally synonymous with the term "differential mode delay" or "DMD.")
  optimizes the strength of distributed mode coupling. It has been proposed that low mode-coupling in the fiber will minimize the complexity of MIMO crosstalk mitigation hardware. In a contrary view, strong mode coupling has the benefit of minimizing the accumulation of DGD with distance as well as minimizing the impact of DMA in the fiber and mode-dependent gain in the amplifier.
  provides a low level of transmission penalty caused by nonlinear propagation impairments, including maximizing the effective areas of the low loss modes.
  can be cost effectively realized with state-of-the-art fiber fabrication techniques.

It will be noted that alternative suggestions have been put forward as to the most beneficial properties for FMFs. In the following portion of the specification we will discuss FMF design strategies for step-index and graded index fibers and consider the inevitable tradeoffs that will be made in trying to achieve a design that meets any set of objectives. Recent fiber design and transmission experiments over few-mode fiber have been conducted with two limits in mind. In one case, it is assumed that mode coupling in an N-mode fiber will be confined to a subset of M modes where M<N. In one example of this low mode-coupling paradigm, the fiber supported five spatial modes (comprising $LP_{01}$, $LP_{11}$, and $LP_{21}$), where the only strong couplings were between $LP_{11}$a and $LP_{11}$b and then between $LP_{21}$a and $LP_{21}$b. So it was only necessary to implement two 4×4 MIMO recovery algorithms instead of one 10×10 MIMO algorithm. In another paradigmatic case, it is assumed that all N fiber spatial modes mix sufficiently such that full 2N×2N MIMO recovery of the signals is necessary (where 2N accounts for two polarizations for each spatial mode). In prior work independent data streams were multiplexed onto three independent spatial modes (comprising $LP_{01}$, $LP_{11}$) and their x- and y-polarizations were then demultiplexed by a 6×6 MIMO recovery algorithm over 10 km, then 96 km, and then 1200 km. In the case of 96 km transmission, large penalties were observed for reduced complexity 4×4 MIMO demodulation of the $LP_{11a}$ and $LP_{11b}$ modes. This is the more complex case for receiver design and implementation. In the former case, the fiber design must maintain a relatively large Δβ between nearest neighbor modes to reduce distributed mode coupling. In the latter case, a smaller Δβ between guided modes would beneficially slow the accumulation of DGD as a function of length and mitigate the effects of DMA through stronger mode mixing (within and between the low-loss modes).

In this context, it is interesting as well as important to consider that DMA, mode coupling, and maximum accumulated DGD are inter-related quantities. Consider the schematic diagram of fiber mode propagation constants in FIG. 1. (The propagation constant can be converted to effective index by $n_{eff}=\beta/k$.) Modes above the cladding index are bound modes, while those below the cladding are leaky modes. Attenuation and DMA will be strongly influenced by the macro- and microbending losses of the modes. Macrobending loss is generally minimized by maximizing (or equivalently the effective index $n_{eff}$); keeping $\beta_{min}$ above some minimum level is critical for minimizing loss in SSMF and DMA in FMF. SSMF is generally designed so that there is a highly lossy, though technically still bound, mode just above the cladding index; that mode is said to be effectively cutoff through the high loss. The same principle will hold for step-index or graded-index FMF with no cladding structure: an optimized design would have a mode just above the cladding index as shown as a dashed line in FIG. 1. In the case of a structured cladding, the lossy mode may drop below the cladding index and become a leaky mode. It is difficult in practice to engineer the modal spacings such that $\Delta\beta_{lossy} \gg \Delta\beta_{i,j}$.

In the presence of cable stress, microbending loss may result from coupling between bound modes (i.e., the modes that carry data signals) and the lossy or leaky modes. Microbending loss for the lowest bound mode is a strong function of $\Delta\beta_{lossy}$, so maximizing $\Delta\beta_{lossy}$ is also a condition for minimizing DMA. In an ideal case for the strong mode-mixing paradigm, all $\Delta\beta_{i,j}$ would be small, $\beta_{min}$ would be relatively large, and $\Delta\beta_{lossy} \gg \Delta\beta_{i,j}$. This would result in a fiber where modes couple strongly in pairwise fashion leading to (1) accumulation of DGD which is proportional to the square root of the fiber length even over shorter links of a few hundred km and (2) mitigation of the deleterious impact of DMA. Furthermore macro- and microbending of the lowest guide mode would be small, leading to low DMA. In fact, these are difficult conditions to fulfill. It is typical that the spacing between adjacent modes does not vary strongly over a few modes, and there is typically no abrupt change in mode spacing across the cladding index. In other words, it is challenging to design a fiber to promote mixing between multiple low-loss bound modes while simultaneously minimizing the loss of the lowest bound mode.

Since low DMA is a fundamental requirement, we conclude that $\beta_{min}$ must be kept greater than some threshold for low macrobending and $\Delta\beta_{lossy}$ (typically similar to $\Delta\beta_{i,j}$) must be kept large enough to minimize microbending loss. Once these two criteria are fulfilled, there will typically be little flexibility to manipulate the magnitude of $\Delta\beta_{i,j}$.

Figure 2:
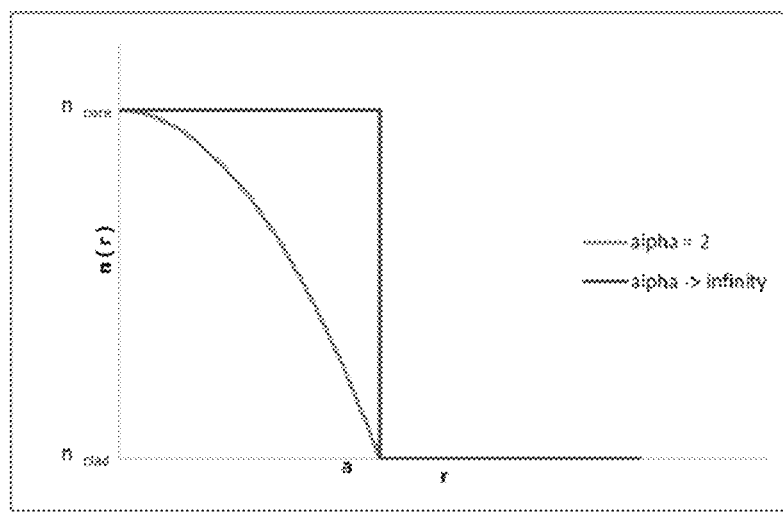
FIG. 2 illustrates the index of refraction for step-index ($\alpha=\infty$) and parabolic ($\alpha=2$) core shapes.

Consider a circularly symmetric optical fiber with cladding of infinite radial extent and radially varying index of refraction as shown in FIG. 2. The index of the cladding is given by $n_{clad}$ and the index of the core at r=0 is $n_{core}$. The index within the core, n(r), at radial position r is given by $$n(r) = n_{clad} + n_{core} * \left[1 - \left(\frac{r}{a}\right)^\alpha\right] \text{ for } r \leq a \quad (1)$$

where a is the core radius, $\alpha$ is the core shape parameter. The ideal step-index core shape occurs when $\alpha$ becomes infinite.

It can be shown that the effective index, $\beta/k$, of a mode guided by this waveguide structure must satisfy the inequality $$n_{clad} < \beta/k < n_{core} \quad (2)$$

where $\beta$ is the propagation constant of the mode and $k=2\pi/\lambda$ is the propagation constant of a plane wave in free space. When the effective index is greater than the cladding index the solutions for the transverse fields in the cladding region are radially evanescent and therefore the modal energy is confined within the waveguide structure and the mode is referred to as a guided mode. A mode is said to be cutoff when its effective index is equal to the cladding index since the solutions for the transverse fields in the cladding is oscillatory, rather than evanescent, and energy is carried away from the fiber axis. In general it is desirable for a mode to have effective index far above the cladding index since this results in rapid decay of the evanescent field in the cladding, and it being less susceptible to bending losses.

When the weakly guiding assumption holds, i.e., when $$\frac{n_{core} - n_{clad}}{n_{clad}} \ll 1,$$

then the waveguide properties can be accurately approximated by linearly polarized modes that have no longitudinal field components, i.e., the polarization is in the plane transverse to the fiber axis. The fields and characteristic equation of the linearly polarized modes can be described by simple analytic formulas that simplify calculation of the waveguide properties. The properties of the LP modes are a good approximation of those of the real modes of weakly guiding fibers over a wide range of conditions. For these reasons, the LP mode analysis is often used when considering typical optical fibers used in optical communications systems.

The LP modes correspond to degenerate groups of the HE, TE and TM modes given by the more general analysis that does not make use the weakly guiding approximation. For the LP modes with no azimuthal variation of the fields, i.e., the azimuthal mode number is zero, the LP modes are comprised of two degenerate modes; the two polarizations of the $HE_{1x}$ modes. For the LP modes with azimuthal variation of the fields, i.e., the azimuthal mode number is greater than zero, then the LP modes are comprised of four nearly degenerate modes; a set of HE, EH, TE and TM modes.

The $LP_{l,m}$ nomenclature is generally used to name the individual linearly polarized modes. Here, the azimuthal and radial mode-numbers are given by l and m, respectively. The lowest order $LP_{01}$ mode is often referred to as the "fundamental mode" and corresponds to the two polarizations of the $HE_{11}$ mode. The first higher-order mode, the $LP_{11}$ mode, is comprised of the two polarizations of the $HE_{21}$ mode and the $TM_{01}$ and $TE_{01}$ modes, i.e., four nearly degenerate "real" modes.

The normalized frequency of a step-index fiber is defined as $$V = k\, a(n_{core}^2 - n_{clad}^2)^{1/2} \approx k\, n_{core} a\sqrt{2\Delta} \quad (3)$$

where $$\Delta = \frac{n_{core} - n_{clad}}{n_{clad}}.$$

The normalized frequency is sometimes referred to as the waveguide strength because any given guided mode will be better confined to the core, i.e., more strongly guided, when the waveguide has a larger value of V.

Figure 3:
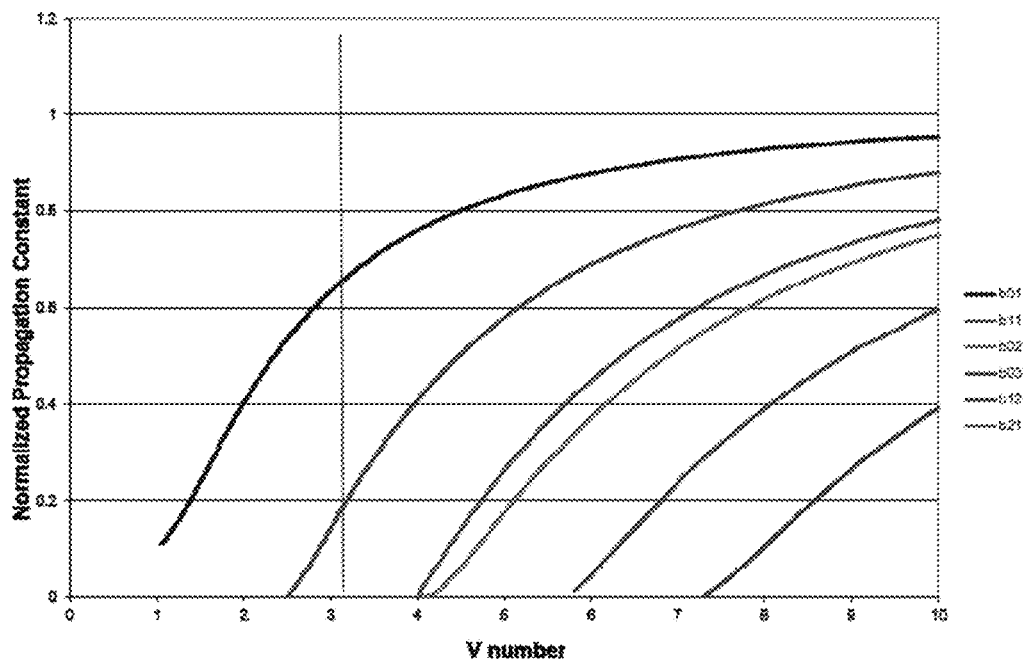
FIG. 3 shows the Normalized Propagation Constant, $b_{l,m}$, as a function of V for $LP_{l,m}$ modes of a step-index fiber. Vertical red line is located at V=3.15 where the differential group delay (DGD) between the $LP_{11}$ and $LP_{02}$ modes is zero.

FIG. 3 shows the normalized propagation constant of the guided $LP_{l,m}$ modes of a step-index fiber as a function of the normalized frequency, V. The normalized propagation constant of the i,j mode, $b_{i,j}$, is defined as $$b_{i,j} = \frac{\left(\frac{\beta_{i,j}}{k} - n_{clad}\right)}{(n_{core} - n_{clad})} \quad (4)$$

when V is less than 2.405, then only the fundamental $LP_{01}$ satisfies the condition that the effective index is greater than $n_{clad}$ and therefore the fiber is single-moded. When V is greater than 2.405 then additional modes satisfy the propagation condition and the fiber supports the propagation of more than one LP mode.

When designing the index profile of a single mode fiber it is usual to place the V value slightly greater than 2.405 at the shortest operating wavelength, say V~2.8. Even though the fiber can theoretically support the propagation of the $LP_{11}$ mode, the effective index of the $LP_{11}$ mode is very low and the loosely bound $LP_{11}$ mode is susceptible to excess loss caused by bending and waveguide imperfections. With a fiber of this design under practical deployment conditions, the $LP_{11}$ mode is effectively cut off because of the excess losses that result from bending. This design trick of operating the waveguide at V-number slightly above the cutoff V-number results in a "stronger waveguide" and therefore the fundamental mode has better mode confinement and lower susceptibility to bending loss than would be otherwise possible. This same design approach can be used when designing FMFs.

As noted previously, it is desirable for FMFs to have low mode coupling between the modes that will be used for SDM multiplexing to minimize the crosstalk between the multiplexed data streams. An additional requirement is that the highest-order mode used in the SDM scheme should have low mode coupling to guided, leaky, or radiation modes of an even higher order since energy coupled to these modes results in energy loss.

The field shapes of the guided modes of an ideal fiber satisfy an orthogonality condition and therefore energy does not couple between the modes. However, in a real fiber the orthogonality can be broken by imperfections in the fiber, e.g. inhomogeneities of the index of refraction or deformations of the fiber axis or core size, core noncircularity, etc.; which can result in the coupling of energy between the modes. Imperfections in the transmission path or coupling points can cause optical modes to exchange power. This issue can be addressed with MIMO signal processing, but for a good understanding of the FMF properties, one must have a grasp of the potential and implications of mode coupling.

For degenerate modes (such as the two polarizations of the $LP_{01}$ which have identical phase constants) the mode coupling is usually strong; that is a substantial optical power will be transferred between the modes within a few tens of meters. In the case of other modes ($LP_{11}$ to $LP_{01}$ for example) the coupling can be much weaker, and depends on the relative difference in phase constants. In such a case, the optical signal may travel tens of kilometers before there is significant coupling to another mode. Different FMF design strategies can result in either strong or weak mode coupling. Prior work found that energy will couple between two modes when the imperfections have a longitudinal spatial frequency component equal to the difference in the longitudinal propagation constants of the modes, $\Delta\beta$. The strength of the coupling between two modes is a strong function of $\Delta\beta$. Coupling between modes of adjacent mode groups is proportional to $$(\Delta\beta)^{-(4+2p)} \quad (5)$$

where p characterizes the power spectrum of the perturbation and typically has values of 0, 1 or 2 depending on the nature of the external stresses, the fiber outer diameter, and coating properties. This result implies that to minimize mode coupling we must maximize the $\Delta\beta$ of the modes.

From FIG. 3 one can see for a step-index 2-mode fiber with V equal to about 4 that $\Delta\beta$ between the $LP_{01}$ and $LP_{11}$ modes and $\Delta\beta$ between the $LP_{11}$ and the $LP_{21}$ modes are simultaneously maximized. This condition results in low mode coupling between the $LP_{01}$ and $LP_{11}$ modes that are used for SDM and low mode coupling between the $LP_{11}$ and the lossy $LP_{21}$ mode. Similarly, for a 4-mode step-index fiber that supports propagation of the $LP_{01}$, $LP_{11}$, $LP_{21}$ and $LP_{02}$ modes, the mode coupling between the 4 modes will be minimum when the V~5.5. However, the coupling between $LP_{21}$ and $LP_{02}$ will always be relatively much stronger than coupling between other pairs of modes.

When the group velocities of the modes that carry independent SDM data channels are different, then pulses that are simultaneously launched into the various modes of the fiber will arrive at the end of the fiber at different times. When mode coupling and DGD are both present then crosstalk between modes can spread across multiple bit periods. The MIMO signal processing electronics that address channel crosstalk in the SDM receiver hardware become more complex when the accumulated DGD between the modes grows and the crosstalk spreads over many bit periods. Therefore for long distance SDM transmission it is desirable to minimize the DGD.

Figure 4:
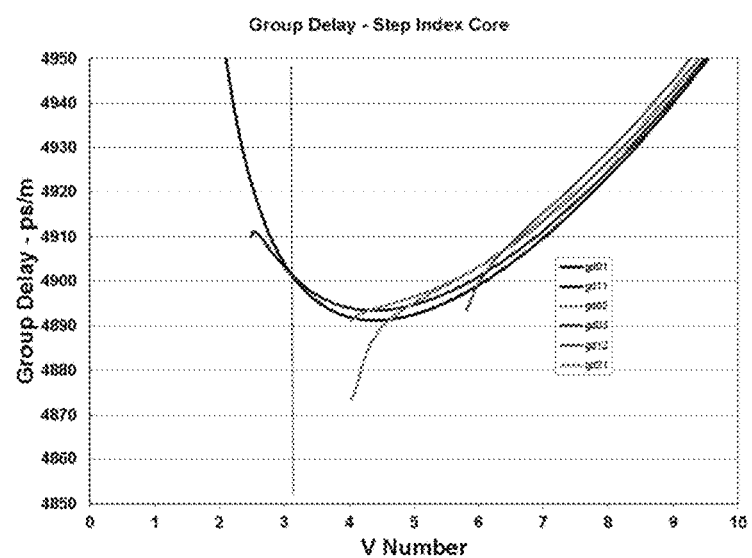
FIG. 4 shows group delay as a function of V for the first 6 $LP_{l,m}$ modes of a step-index fiber.

FIG. 4 plots the normalized group delay as a function of V for various modes of a step-index fiber. FIG. 4 shows that the group delay curves of the $LP_{01}$ and the $LP_{11}$ modes cross and the DGD becomes zero when V is approximately equal to 3.15. Note that we found in the previous section that the $\Delta\beta$'s of a 2-mode step-index fiber are maximized when V~4. So for 2-mode step-index fibers it is not possible to simultaneously minimize both DGD and mode coupling. For a 4-mode fiber, FIG. 3 shows that a step-index design does not exist where the group delay between all of the lowest order 4-modes is zero. Note that for step-index fibers there are values of V where the group delays of a subset of the guided modes are equalized. For example the group delay of the $LP_{02}$, $LP_{21}$ and $LP_{12}$ modes are approximately equal when V is equal to about 6.5. However, when V~6.5, the fiber supports three more modes with quite different group delays.

In FIG. 4 the vertical line is located at V=3.15 where the DGD between the $LP_{01}$ and $LP_{11}$ modes is zero. However, when V=3.15 the normalized propagation constant of the $LP_{11}$ mode is very small and coupling between the $LP_{11}$ mode and leaky modes will be large resulting in DMA. When V~4.5, the normalized propagation constants and the difference between the propagation constants of the $LP_{01}$ and $LP_{11}$ are large which gives low sensitivity to mode coupling between the $LP_{01}$ and $LP_{11}$ modes and between the $LP_{11}$ mode and leaky modes. Further, the propagation constant of the $LP_{02}$ and $LP_{21}$ modes is very small so that these modes will be very lossy and therefore only the two lowest order modes propagate with low loss. However, the $LP_{01}$ and $LP_{11}$ mode DGD is quite large when V~4.5. In addition to the magnitude of the $\Delta\beta$ of the fiber profile design, mode coupling also depends on factors related to the deployment of the fiber. Here cabling and splicing effects need to be considered. Cabling stress will increase distributed mode coupling by providing an additional source of perturbations of the fiber. Splices and connectors provide points of discrete mode coupling.

When small and random mode coupling is considered, it can be shown that the DGD will grow linearly with length for distances much shorter than the correlation length and as the square root of length for long lengths. The two-mode case is completely analogous to the results obtained for PMD. If a short pulse is launched simultaneously in each mode then the variance in arrival times of portions of the pulse is given as a function of fiber length, L:

$$\langle (T - \langle T \rangle_{av})^2 \rangle_{av} = \frac{DGD^2 l_c L}{4} \left[ 1 - \frac{l_c}{2L}(1 - \exp(-2L/l_c)) \right] \quad (6)$$

$$\lim_{L/l_c \to \infty} \langle (T - \langle T \rangle_{av})^2 \rangle_{av} = \frac{DGD^2 l_c L}{4} \quad (7)$$

where $l_c$ is the correlation length and T is the time-of-flight through the fiber. Note from the second equation (long fiber limit) that the spread in arrival times scales as the square root of the product of the correlation length and the fiber length. A similar scaling law holds for guides with any number of modes.

Figure 5:
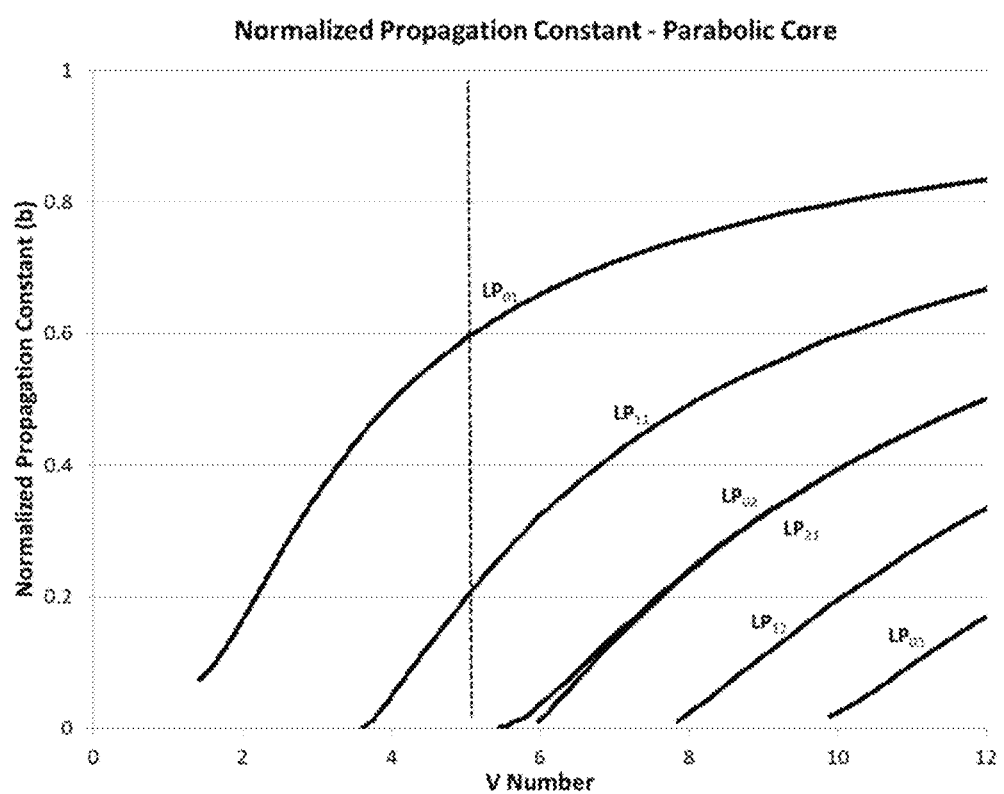
FIG. 5 shows normalized propagation constants for the first 6 modes of a parabolic core.
Figure 6:
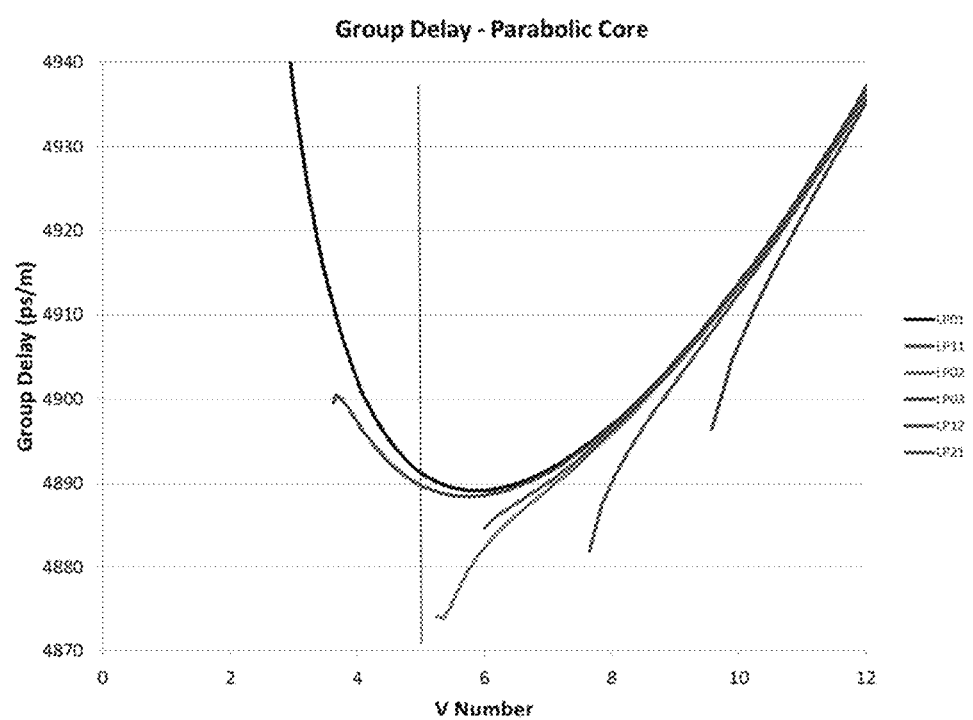
FIG. 6 shows group delay curves for 6 modes of a parabolic ($\alpha=2.00$) core fiber.

The inability of two-mode, step-index fibers to simultaneously provide low DGD, low mode coupling and low DMA leads to consideration of fibers with more complicated core shape. It was pointed out in prior work that when the core shape parameter $\alpha$ is 2.5 that the group delay curves of the $LP_{01}$ and $LP_{11}$ modes cross when V is ~5.5 and that the fiber is effectively two-moded. FIG. 5 and FIG. 6 show curves of the normalized propagation constant and group delay, respectively, for the first 6 LP modes of a parabolic ($\alpha=2.00$) core fibers a function V. For non-step-index fibers, i.e. $\alpha \neq \infty$, we define V as previously defined for step-index fibers. When $\alpha$ is finite, the fiber is single moded when $V < 2.405 \cdot (1+2/\alpha)^2$. For example, cutoff occurs when $V=3.40$ for a parabolic profile. The core shape parameter $\alpha$ can be chosen to minimize DGD at a particular wavelength.

FIG. 5 illustrates that when V~6, the difference between the propagation constants of the $LP_{01}$ and $LP_{11}$ are large which gives low sensitivity to mode coupling between the $LP_{01}$ and $LP_{11}$ modes. Also when V~6 the normalized propagation constant of the $LP_{11}$ mode of the parabolic core fiber is quite large which minimizes the coupling of $LP_{11}$ to leaky modes. Further, the propagation constant of the $LP_{02}$ and $LP_{21}$ modes are very small so that these modes will be very lossy and therefore only the two lowest order modes propagate with low loss. FIG. 6 shows for a parabolic core shape that when V~6 the difference between the $LP_{01}$ and $LP_{11}$ group delays is low.

FIG. 5 and FIG. 6 also show that when the V of a parabolic core shape fiber has value slightly larger than 6, the first four LP modes will have widely spaced propagation constants giving low mode coupling as well as low DGD. Further, the propagation constants of the $LP_{02}$ and $LP_{21}$ modes are maximized while higher order modes are effectively cut-off.

When V~6, the normalized propagation constants and the difference between the propagation constants of the $LP_{01}$ and $LP_{11}$ are large which gives low sensitivity to mode coupling between the $LP_{01}$ and $LP_{11}$ modes and between the $LP_{11}$ mode and leaky modes. Further, the propagation constant of the $LP_{02}$ and $LP_{21}$ modes are very small so that these modes will be very lossy and therefore only the two lowest order modes propagate with low loss.

Also, when V~6 and the difference between the $LP_{01}$ and $LP_{11}$ group delays is low. (FIG. 6 shows group delay curves for 6 modes of a parabolic ($\alpha=2.00$) core fiber. The difference between the group delay curves for the $LP_{01}$ and $LP_{11}$ modes is small for V~6.)

Figure 7:
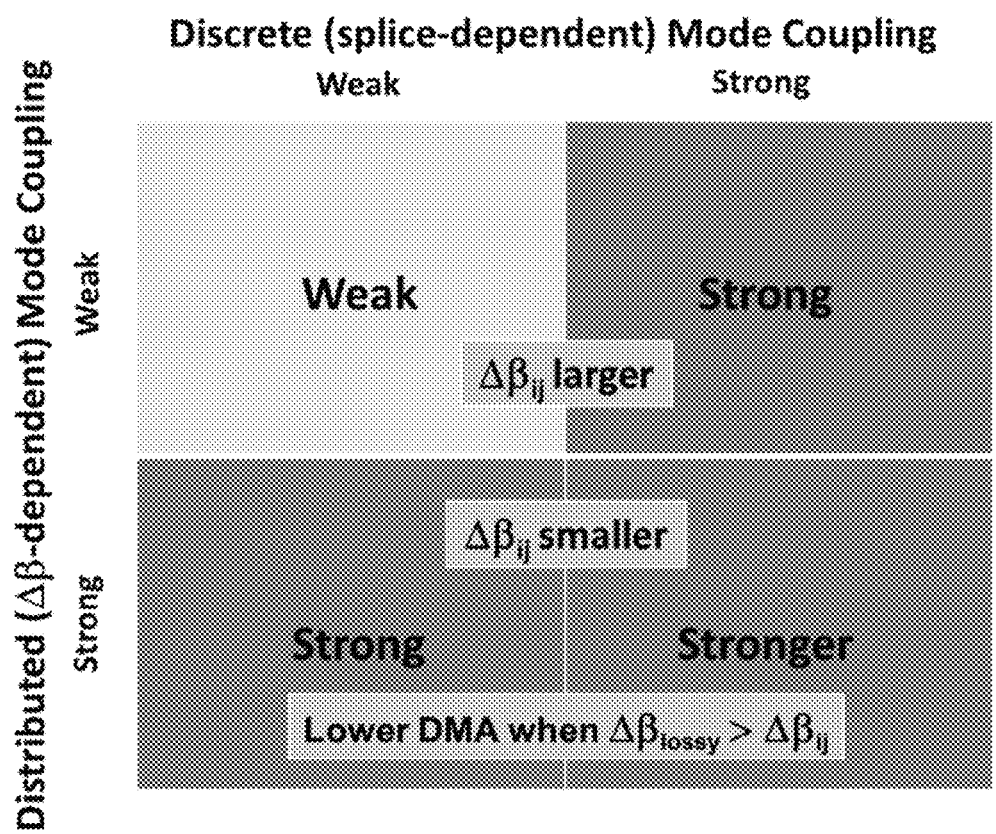
FIG. 7 shows a four-quadrant chart illustrating the strength of mode coupling in a deployed FMF transmission line.

While two regimes of strong and weak mode coupling for few-mode transmission have been contemplated, there may be some doubt that a weak coupling regime will exist in a deployed transmission link. The picture can be clarified by considering that the strength of mode coupling in a FMF transmission line will depend on both distributed and discrete contributions. FIG. 7 shows a four-quadrant chart illustrating the possibilities. In a deployed fiber cable splices will occur approximately every five kilometers, so an 80 km amplified span will contain about 16 splices on average. Furthermore, other components such as wavelength selective switches and optical amplifiers will also be nodes for mode-coupling.

If the mode coupling at splices is sufficient such that the correlation length $l_c$ is equal to five to 10 cable segments, then transmission will occur in a strongly mode-coupled regime regardless of the strength of distributed mode coupling in the fiber (i.e. regardless of $\Delta\beta_{i,j}$). This will have the beneficial result that DGD will accumulate as $\sqrt{L}$ in the link, and mitigate the impact of DMA, but necessitate full 2N×2N MIMO processing in all cases. However large $\Delta\beta$ will nonetheless generally give the lowest possible DMA and perhaps always be desirable for this fundamental reason. With reference to FIG. 7, the strength of mode coupling in a deployed FMF transmission line will depend on both distributed and discrete mode coupling. Transmission in the weakly mode-coupled regime requires that both contributions be weak. If discrete mode coupling at splices, connections, and in-line components is sufficiently strong, then the mode spacings in the fiber $\Delta\beta$ will be of secondary importance for mode-mixing considerations but remain of primary importance for minimizing DMA.

The impact of splicing modern FMF on mode coupling has not yet been quantitatively determined, although early studies considered loss and mode-mixing at splices of traditional MMF. If it be the case that splices, connectors, and components generally leads to the strong mode coupling regime, then the upper right quadrant of FIG. 7 may prove to be the best approach to FMF design, yielding lowest possible DGD and DMA, though necessitating full 2N×2N MIMO processing at the receiver.

Table I shows the modal content of the LP modes in terms of the more fundamental HE, TE, and TM modes. To calculate the total number of modes onto which data can be multiplexed, multiply by two to account for the two polarizations for each spatial mode pattern.

| LP-Mode Designation | True Mode Content | Number of Degenerate Spatial Modes |
|---|---|---|
| $LP_{01}$ | $HE_{11}$ | 1 |
| $LP_{11}$ | $TE_{01}$, $TM_{01}$, $HE_{21}$ | 2 |
| $LP_{21}$ | $EH_{11}$, $HE_{31}$ | 2 |
| $LP_{02}$ | $HE_{12}$ | 1 |
| $LP_{31}$ | $EH_{21}$, $HE_{41}$ | 2 |
| $LP_{12}$ | $TE_{02}$, $TM_{02}$, $HE_{22}$ | 2 |
| $LP_{41}$ | $EH_{31}$, $HE_{51}$ | 2 |
| $LP_{22}$ | $EH_{12}$, $HE_{32}$ | 2 |

The table illustrates that designing a FMF to support, e.g., 10 low loss, orthogonal spatial modes is equivalent to designing for the lowest 6 LP modes for transmission. Increasing the number of low loss modes requires increasing the V-number. If V is increased by raising the core diameter, then the modes will become more closely spaced, the mode $A_{eff}$ will increase, and $\Delta\beta_{lossy}$ will become smaller leading to higher DMA. If V is increased by the increasing the core $\Delta$, then the mode $A_{eff}$ will decrease, Rayleigh scattering losses will increase due to higher concentration of $GeO_2$, and the modal spacing will increase helping to minimize DMA. A judicious combination of adjusting core $\Delta$ and diameter, along with other degrees of freedom in the profile, will be necessary to guide 10 to 20 modes with low DMA and low attenuation losses.

FIG. 4 shows for a step-index fiber that the DGD between the $LP_{01}$ and $LP_{11}$ modes can be small only when the V-number is near 3.15, i.e. where the group delay curves cross. Therefore, to obtain low DGD with a step-index profile requires tight tolerances on core delta and core radius to ensure that the V-number is close to 3.15. FIG. 4 also shows that the group delay will remain low only over a narrow range of wavelengths.

Figure 8:
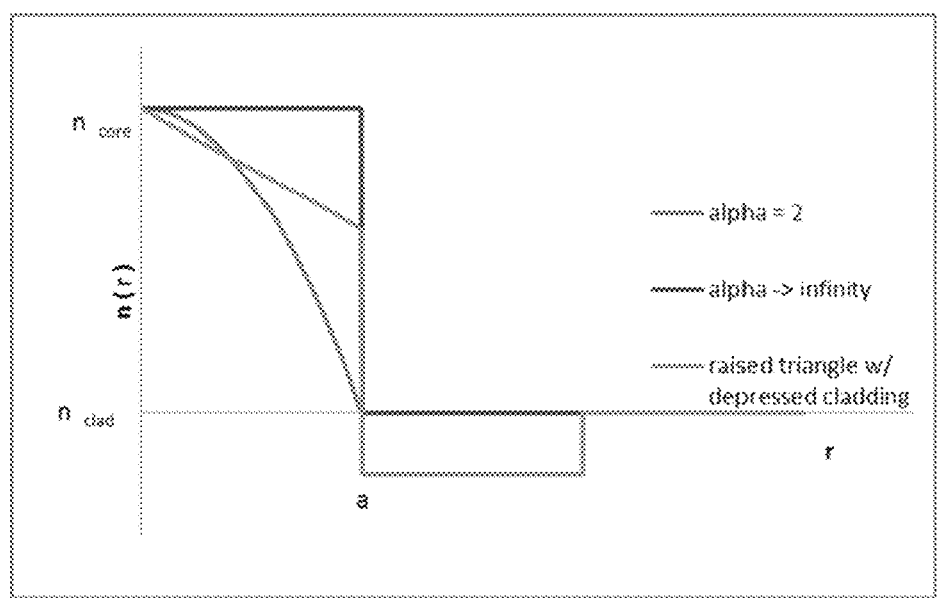
FIG. 8 illustrates a raised-triangle, depressed-cladding index profile that is optimized for low DGD and ease of manufacturing.

FIG. 8 illustrates a raised-triangle, depressed cladding index profile that is optimized for low DGD and ease of manufacturing of two-mode fiber over broad wavelength range and four-mode fiber over narrow wavelength range. In FIG. 8 $n_{clad}$ is undoped silica (zero delta). The core comprises a portion extending from the center of the core, $n_{core}$, to radius a, in which the refractive index decreases linearly to point a. The maximum refractive index value of point a is greater than half of the value at $n_{core}$. Abutting or adjacent the core is a down doped trench as shown. In FIG. 8, the trench is shown in contact with the core. However, in some cases there may be a ledge between the core and the trench.

The term "ledge" is used herein to define a region separating an up-doped core and a down-doped trench. Typically, the ledge portion is undoped.

In general terms the optical fiber just described can be characterized as having a core and a cladding surrounding the core, wherein the core and cladding have a refractive index profile that is structured to support propagation of a plurality of desired signal-carrying modes, while suppressing undesired modes, wherein the core comprises a portion extending from the center of the core, $n_{core}$, to radius a, in which the refractive index decreases linearly from $n_{core}$ to point a, wherein the cladding comprises a down-doped cladding region abutting or adjacent to the core, and an undoped cladding region abutting the down-doped cladding region, wherein the core, and cladding are configured to support propagation of a spatially multiplexed optical signal comprising a plurality of desired modes, while suppressing undesired modes, wherein the core and surrounding cladding is configured such that undesired modes have respective effective indices that are close to or less than the cladding index so as to result in leaky modes that leak into the outer cladding region, and wherein the index spacing between the desired mode having the lowest effective index and the leaky mode with the highest effective index is sufficiently large so as to substantially prevent coupling therebetween.

FIG. 8 shows an index profile as in FIG. 8, referred to as a raised-triangle, depressed-cladding design, that is optimized to provide 2-mode operation with low DGD over a wider range of V than a step-index profile. The DGD of a two-mode fiber design with this profile shape is insensitive to V-number.

Figure 9:
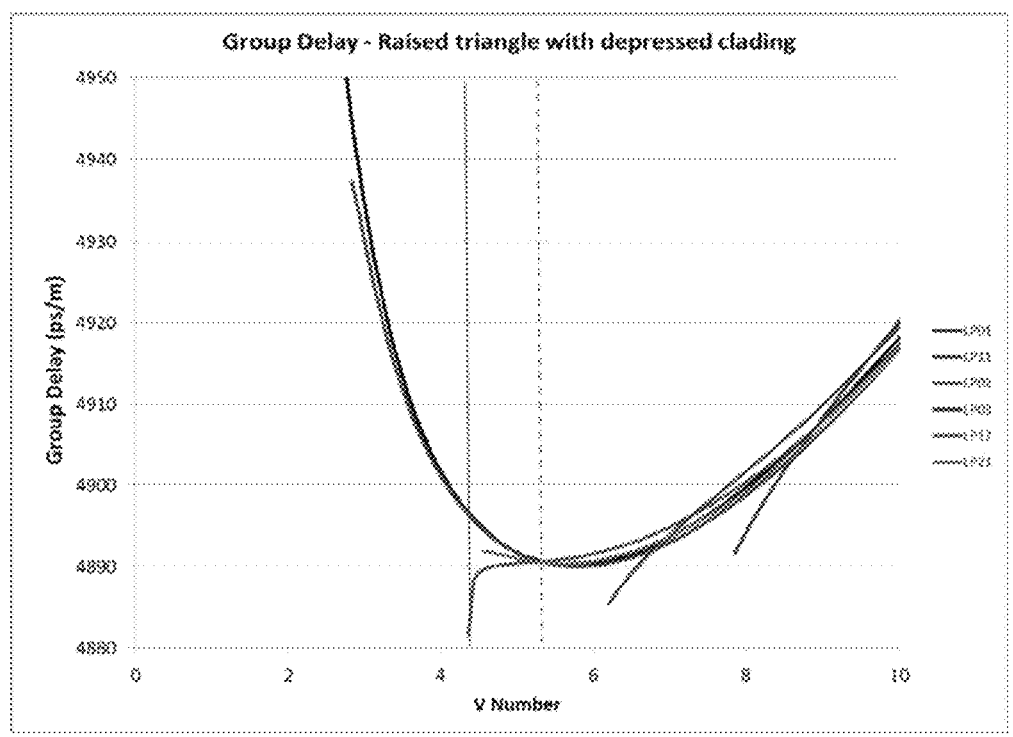
FIG. 9 shows the calculated differential group delay between the $LP_{01}$ and $LP_{11}$ modes over a wide range of V-numbers for a prototype fiber having a raised-triangle, depressed-cladding design.

FIG. 9 shows the group delay curves calculated for a prototype raised-triangle, depressed-cladding fiber fabricated using the VAD process. The group delay curves for the $LP_{01}$ and $LP_{11}$ modes fall very close to one another over a broad range of V-numbers. This behavior maintains low DGD, i.e. less than 100 ps/km over the entire C-Band, while using standard fabrication techniques used for manufacturing single mode transmission fibers and manufacturing tolerances typical for SSMF. The VAD and rod-in-tube manufacturing techniques were used to fabricate a few hundred kilometers of raised-triangle, depressed-cladding, two-mode optical fiber with low DGD, low DMA and good axial uniformity. The $A_{eff}$ of the $LP_{01}$ and $LP_{11}$ modes were 155 $\mu m^2$ and 160 $\mu m^2$, respectively. The attenuation of the two mode fiber was 0.2 dB/km.

Figure 10:
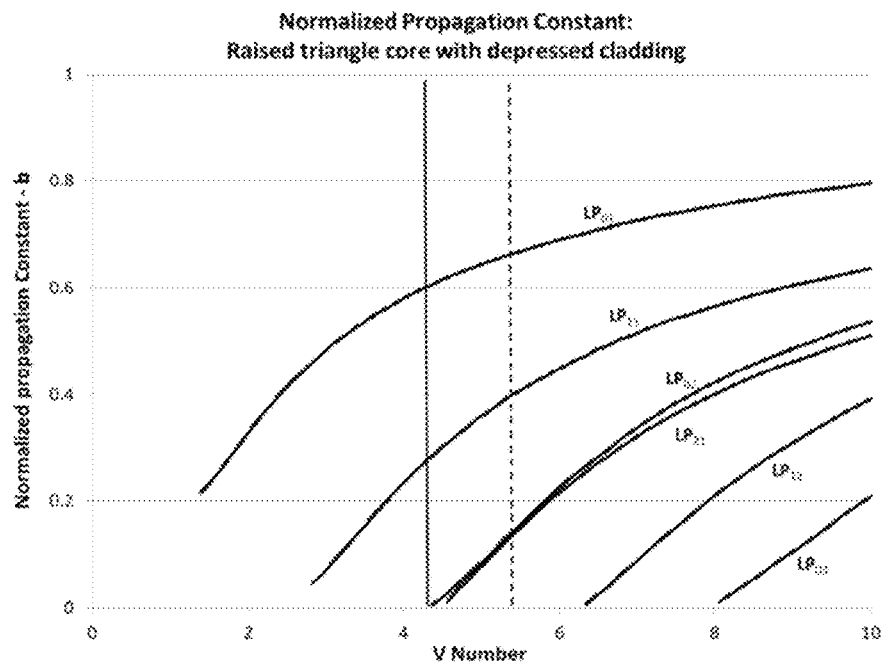
FIG. 10 shows the normalized propagation constant as a function of V-number of a raised-triangle, depressed cladding design.

FIG. 10 shows normalized propagation constant as a function of V-number of a raised-triangle, depressed cladding design. When V~4.5, the waveguide supports the propagation of two modes with low DGD as indicated in FIG. 9. The previous example shows that zero DGD can be achieved for two-mode fibers with step-index, parabolic index and raised triangle core depressed cladding index shapes. FIG. 4 shows that for a step-index fiber the group delay curves of all propagating modes cross only for the two-mode case when V=3.15. FIG. 10 shows that, for parabolic core fiber, V can be chosen so that the group delay curves of all but the highest order propagating mode lie very close together and therefore low DGD is achievable. V is properly chosen when the highest order mode is effectively cut off. FIG. 10 shows that for the raised-triangle depressed cladding fiber when V~5.31 the group delay curves for the first four LP modes simultaneously cross resulting in low DGD across all four low loss modes. However $\beta$ for the $LP_{02}$ and $LP_{21}$ modes are small which may result in elevated sensitivity to macrobends and strong coupling to leaky modes. Since the group delay curves do not simultaneously cross for larger values of V, this design does not provide low DGD for a more than four LP modes.

EXAMPLE 1

Figure 11:
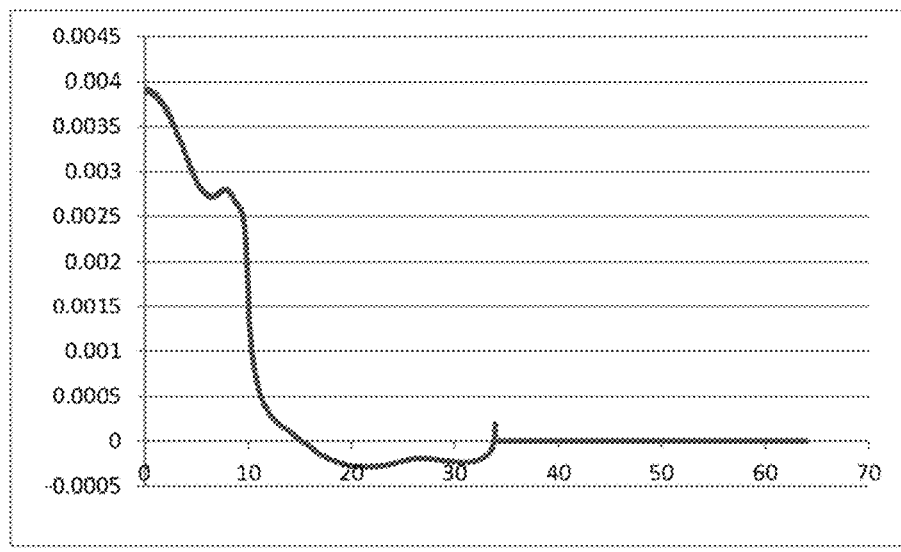
FIG. 11 illustrates a raised triangle profile based on actual VAD core shape.

FIG. 11 shows a raised-triangle profile based on actual VAD core shape. The fiber has 116 ps/km DGD at 1550 nm for the $LP_{01}$, $LP_{11}$, $LP_{02}$, and $LP_{21}$ modes.

The following chart gives calculated properties of the raised-triangle, depressed-clad profile shown in FIG. 11:

| wave | gd01 | gd11 | gd02 | gd03 | gd12 | gd21 | dgdn (ps/m) | N01 | N11 | N02 | N03 | N12 | N21 |
|---|---|---|---|---|---|---|---|---|---|---|---|---|---|
| 1.30 | 4890.3 | 4890.0 | 4891.7 | | 4886.7 | 4890.7 | 5.044 | 1.45114 | 1.44990 | 1.44877 | 0 | 1.44737 | 1.44871 |
| 1.31 | 4890.3 | 4890.0 | 4891.7 | | 4886.1 | 4890.7 | 5.556 | 1.45102 | 1.44977 | 1.44863 | 0 | 1.44722 | 1.44857 |
| 1.32 | 4890.3 | 4890.0 | 4891.7 | | 4885.5 | 4890.7 | 6.150 | 1.45090 | 1.44964 | 1.44848 | 0 | 1.44708 | 1.44843 |
| 1.33 | 4890.4 | 4890.1 | 4891.7 | | 4884.7 | 4890.7 | 6.980 | 1.45078 | 1.44951 | 1.44834 | 0 | 1.44694 | 1.44828 |
| 1.34 | 4890.4 | 4890.1 | 4891.7 | | | 4890.8 | 1.594 | 1.45065 | 1.44937 | 1.44819 | 0 | 0 | 1.44814 |
| 1.35 | 4890.4 | 4890.2 | 4891.7 | | | 4890.8 | 1.554 | 1.45053 | 1.44924 | 1.44805 | 0 | 0 | 1.44800 |

-continued

| | | | | | | | | | | | |
|---|---|---|---|---|---|---|---|---|---|---|---|
| 1.36 | 4890.5 | 4890.2 | 4891.8 | 4890.8 | 1.512 | 1.45041 | 1.44911 | 1.44791 | 0 | 0 | 1.44786 |
| 1.37 | 4890.6 | 4890.3 | 4891.8 | 4890.9 | 1.466 | 1.45028 | 1.44898 | 1.44776 | 0 | 0 | 1.44771 |
| 1.38 | 4890.6 | 4890.4 | 4891.8 | 4891.0 | 1.418 | 1.45016 | 1.44885 | 1.44762 | 0 | 0 | 1.44757 |
| 1.39 | 4890.7 | 4890.5 | 4891.8 | 4891.0 | 1.366 | 1.45004 | 1.44871 | 1.44747 | 0 | 0 | 1.44743 |
| 1.40 | 4890.8 | 4890.6 | 4891.9 | 4892.1 | 1.311 | 1.44991 | 1.44858 | 1.44733 | 0 | 0 | 1.44728 |
| 1.41 | 4890.9 | 4890.7 | 4891.9 | 4891.2 | 1.253 | 1.44979 | 1.44845 | 1.44718 | 0 | 0 | 1.44714 |
| 1.42 | 4891.0 | 4890.8 | 4892.0 | 4891.3 | 1.193 | 1.44967 | 1.44831 | 1.44704 | 0 | 0 | 1.44700 |
| 1.43 | 4891.1 | 4890.9 | 4892.0 | 4891.4 | 1.128 | 1.44954 | 1.44818 | 1.44689 | 0 | 0 | 1.44685 |
| 1.44 | 4891.2 | 4891.0 | 4892.1 | 4891.5 | 1.060 | 1.44942 | 1.44805 | 1.44675 | 0 | 0 | 1.44671 |
| 1.45 | 4891.3 | 4891.2 | 4892.2 | 4891.6 | 0.989 | 1.44929 | 1.44791 | 1.44660 | 0 | 0 | 1.44657 |
| 1.46 | 4891.5 | 4891.3 | 4892.2 | 4891.7 | 0.914 | 1.44917 | 1.44778 | 1.44646 | 0 | 0 | 1.44642 |
| 1.47 | 4891.6 | 4891.5 | 4892.3 | 4891.8 | 0.835 | 1.44904 | 1.44764 | 1.44631 | 0 | 0 | 1.44628 |
| 1.48 | 4891.8 | 4891.6 | 4892.4 | 4891.9 | 0.754 | 1.44892 | 1.44751 | 1.44617 | 0 | 0 | 1.44613 |
| 1.49 | 4891.9 | 4891.8 | 4892.5 | 4892.0 | 0.667 | 1.44879 | 1.44737 | 1.44602 | 0 | 0 | 1.44599 |
| 1.50 | 4892.1 | 4892.0 | 4892.5 | 4892.2 | 0.578 | 1.44866 | 1.44724 | 1.44588 | 0 | 0 | 1.44584 |
| 1.51 | 4892.2 | 4892.1 | 4892.6 | 4892.3 | 0.484 | 1.44854 | 1.44710 | 1.44573 | 0 | 0 | 1.44570 |
| 1.52 | 4892.4 | 4892.3 | 4892.7 | 4892.4 | 0.386 | 1.44841 | 1.44697 | 1.44558 | 0 | 0 | 1.44555 |
| 1.53 | 4892.6 | 4892.5 | 4892.8 | 4892.6 | 0.284 | 1.44828 | 1.44683 | 1.44544 | 0 | 0 | 1.44540 |
| 1.54 | 4892.8 | 4892.7 | 4892.9 | 4892.7 | 0.178 | 1.44816 | 1.44669 | 1.44529 | 0 | 0 | 1.44526 |
| 1.55 | 4893.0 | 4892.9 | 4893.0 | 4892.9 | 0.116 | 1.44803 | 1.44656 | 1.44515 | 0 | 0 | 1.44511 |
| 1.56 | 4893.2 | 4893.1 | 4893.1 | 4893.0 | 0.164 | 1.44790 | 1.44642 | 1.44500 | 0 | 0 | 1.44497 |
| 1.57 | 4893.4 | 4893.3 | 4893.2 | 4893.2 | 0.244 | 1.44777 | 1.44628 | 1.44485 | 0 | 0 | 1.44482 |
| 1.58 | 4893.6 | 4893.5 | 4893.2 | 4893.3 | 0.365 | 1.44764 | 1.44614 | 1.44470 | 0 | 0 | 1.44467 |
| 1.59 | 4893.8 | 4893.8 | 4893.3 | 4893.5 | 0.492 | 1.44751 | 1.44600 | 1.44456 | 0 | 0 | 1.44452 |
| 1.60 | 4894.1 | 4894.0 | 4893.4 | 4893.7 | 0.624 | 1.44738 | 1.44586 | 1.44441 | 0 | 0 | 1.44437 |
| 1.61 | 4894.3 | 4894.2 | 4893.5 | 4893.8 | 0.762 | 1.44725 | 1.44572 | 1.44426 | 0 | 0 | 1.44423 |
| 1.62 | 4894.5 | 4894.5 | 4893.6 | 4894.0 | 0.905 | 1.44712 | 1.44558 | 1.44411 | 0 | 0 | 1.44408 |
| 1.63 | 4894.8 | 4894.7 | 4893.7 | 4894.2 | 1.054 | 1.44699 | 1.44544 | 1.44397 | 0 | 0 | 1.44393 |
| 1.64 | 4895.0 | 4895.0 | 4893.8 | 4894.4 | 1.210 | 1.44686 | 1.44530 | 1.44382 | 0 | 0 | 1.44378 |
| 1.65 | 4895.3 | 4895.3 | 4893.9 | 4894.6 | 1.372 | 1.44672 | 1.44516 | 1.44367 | 0 | 0 | 1.44363 |
| 1.66 | 4895.6 | 4895.5 | 4894.0 | 4894.7 | 1.541 | 1.44659 | 1.44502 | 1.44352 | 0 | 0 | 1.44348 |
| 1.67 | 4895.8 | 4895.8 | 4894.1 | 4894.9 | 1.716 | 1.44646 | 1.44488 | 1.44337 | 0 | 0 | 1.44333 |
| 1.68 | 4896.1 | 4896.0 | 4894.2 | 4895.1 | 1.899 | 1.44632 | 1.44473 | 1.44322 | 0 | 0 | 1.44318 |
| 1.69 | 4896.4 | 4896.3 | 4894.3 | 4895.3 | 2.089 | 1.44619 | 1.44459 | 1.44307 | 0 | 0 | 1.44303 |
| 1.70 | 4896.7 | 4896.6 | 4894.4 | 4895.5 | 2.288 | 1.44606 | 1.44444 | 1.44292 | 0 | 0 | 1.44287 |

| 1550 nm properties | $LP_{01}$ | $LP_{11}$ | $LP_{02}$ | $LP_{21}$ |
|---|---|---|---|---|
| chromatic dispersion (ps/nm · km) | 19.99 | 20.43 | 9.15 | 15.30 |
| effective area $A_{eff}$ (μm²) | 177.1 | 180.6 | 353.0 | 239.5 |
| effective index difference | 0.00362 | 0.00215 | 0.00074 | 0.00071 |

Since variations on the step-index design such as the raised triangle, depressed-cladding profile can provide only a narrow design space for low DGD when no more than four modes are allowed to propagate, an alternative is to consider Graded Index (GRIN) fiber designs. The index profile considered here consists of a graded-index core region and a depressed cladding region (i.e. a "trench"). There could be a number of additional design features between the graded core and the trench, such as a shelf region between the core and the trench or an index step between the core and the trench. The purpose of these features to the index profile outside the core region is to provide additional flexibilities to manipulate the spacing of the modal propagation constants so that the desired combination of transmission properties can be obtained.

The simplest way to characterize the graded-core region is shown in Eq. 1. The alpha parameter α can be chosen between 1 and ∞, whereas α=2 corresponds to an inverted parabola. For two-mode design, low DGD between $LP_{01}$ and $LP_{11}$ modes can be obtained with any α between 1 and ∞ combining proper values of other profile parameters such as $n_{core}$, $r_{core}$, trench depth and position. However, for FMF design beyond two LP modes, α is preferentially chosen close to an inverted parabola shape to achieve low DGD among all LP modes. The preferred range is 2.0+/−0.03. The trench feature has three functions. As shown in FIG. 6, $\Delta\beta_{ij}$ should be as large as possible. A trench structure allows $\beta_{min}$ ($LP_{11}$ mode in two mode) to be closer to the cladding index while maintaining low loss and push down $\beta_{lossy}$ below the cladding index to become a leaky mode. The trench also promotes reduced bending loss and differential modal attenuation (DMA) of both $LP_{01}$ and $LP_{11}$ modes. The trench on the periphery of the raised index core also forms an index structure to manipulate DGD, especially of the high order mode(s).

The inventive fiber profiles have a maximum Δ of 0.8%, which will give lower attenuation loss, important for system performance.

EXAMPLE 2

Figure 12:
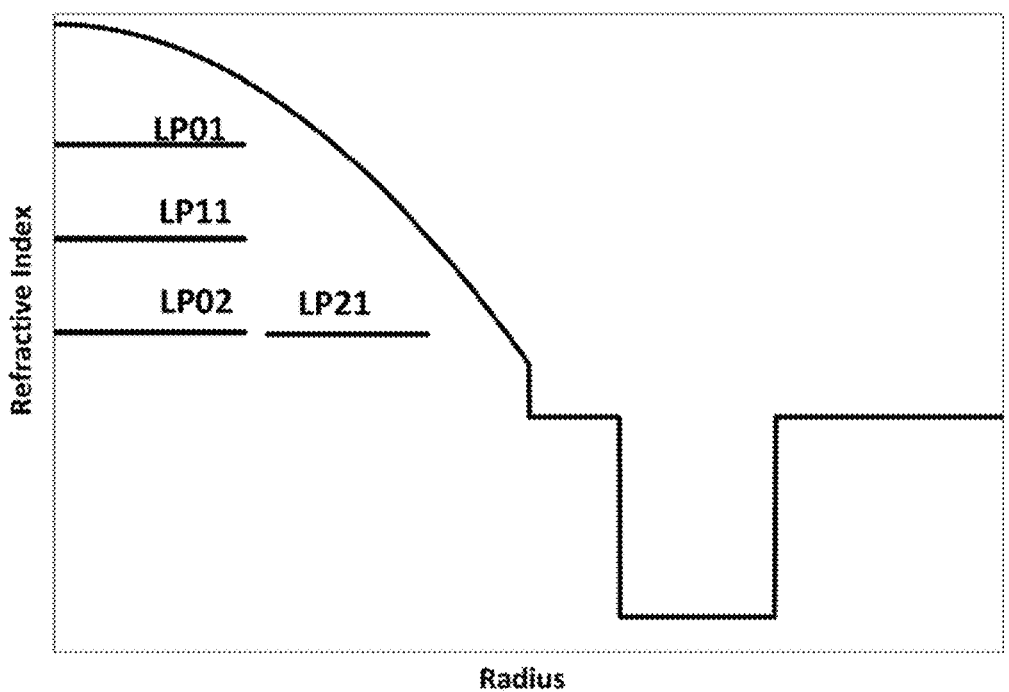
FIG. 12 shows a refractive index profile for a practice of the invention, Example 2.

FIG. 12 shows a refractive index profile for Example 2. The fiber has a GRIN core a shelf and a trench. This profile describes a generic class of optical fibers that are particularly effective for multiple mode multiplexing. Profile parameters for the fiber design, describing the core, shelf, trench, are:

| index region | start delta | end delta | alpha | width (μm) |
|---|---|---|---|---|
| 1 | 0.00800 | 0.00113 | 1.972 | 10.00 |
| 2 | 0.00000 | 0.00000 | 0.000 | 1.92 |
| 3 | −0.00410 | −0.00410 | 0.000 | 3.28 |
| 4 | 0.00000 | 0.00000 | 0.000 | 50.30 |

| 1550 nm properties | LP$_{01}$ | LP$_{11}$ | LP$_{02}$ | LP$_{21}$ |
|---|---|---|---|---|
| chromatic dispersion (ps/nm·km) | 18.9 | 19.3 | 19.1 | 19.4 |
| effective area A$_{eff}$ (μm$^2$) | 93.2 | 93.5 | 186.9 | 124.6 |
| effective index difference | 0.0081 | 0.0053 | 0.0025 | 0.0025 |

Figure 13:
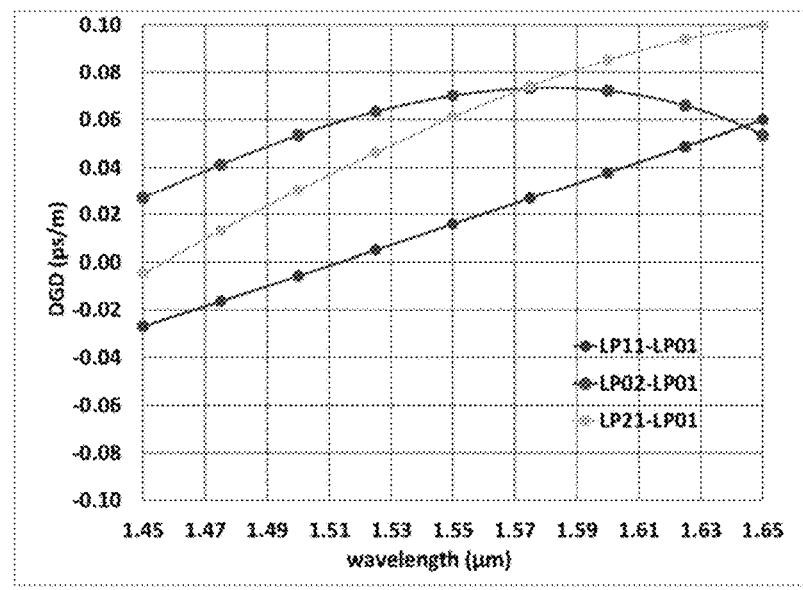
FIG. 13 shows the differential group delay for the optical fiber of Example 2.

FIG. 13 shows the differential group delays for the optical fiber of Example 2.

As mentioned, the refractive index profile of FIG. 2 is representative of a family of optical fiber designs that were developed specifically to support multiple modes for mode division multiplexing. Many of these designs feature an alpha core, typically having an alpha value between 1.5 and 2.5, preferably 1.8 to 2.2, with a truncated edge. A truncated edge is defined as a portion in the refractive index curve that drops from a positive delta index value to zero within two μm or less. A trench may be similarly defined as having a portion of a refractive index curve that abuts or is adjacent to the core, and drops from a delta value at or near zero to a substantial negative value within 2 μm or less. So in general the preferred designs in this category have a truncated alpha core, a ledge, a trench, and an undoped cladding.

It has been found that in some optical fiber designs it may not be necessary to truncate the core. Also it has been found that some designs that omit the trench may also be effective.

Figure 14:
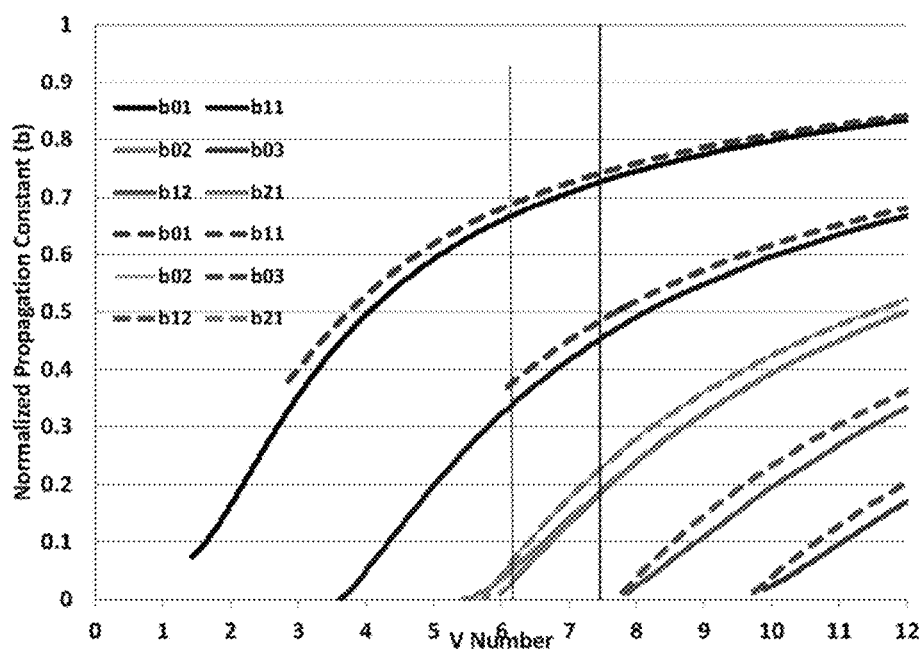
FIG. 14 shows the normalized propagation constant versus V-number for two families of fiber profiles.

Design parameters for radius width that have been found to be effective are:

Truncated (or standard) core radius: 5 to 20 μm
Ledge: 1 to 5 μm
Trench: 1 to 10 μm FIG. 14 gives normalized propagation constant versus V-number for two families of fiber profiles. Solid curves are the simple parabolic (α=2) GRIN profile, while the dashed curves are for a GRIN FMF (dashed lines). The solid curves in FIG. 14 correspond to the α=2.00 GRIN fiber of FIG. 4. The dashed curves correspond to a GRIN design with an alpha profile core and a trench structure which have been optimized for transmission in the C-band. The modal structure of this new design remains similar to that of FIG. 4, with some improvement in the normalized propagation constant. For the same core index, the modes have improved macrobending characteristics, leading to improved DMA. Four LP modes, specifically LP$_{01}$, LP$_{11}$, LP$_{02}$, and LP$_{21}$, are well guided at V≈7.5, and the cutoff wavelength of the next higher-order mode LP$_{12}$ is below 1550 nm. The V-number is chosen to achieve the large effective index difference between the lowest two guided LP modes and the cladding. The large spacing of the normalized propagation constant between different guided LP modes supports a large Δβ$_{lossy}$, keeping DMA low. FIG. 13 confirms the low DGD over a wide bandwidth.

Figure 15:
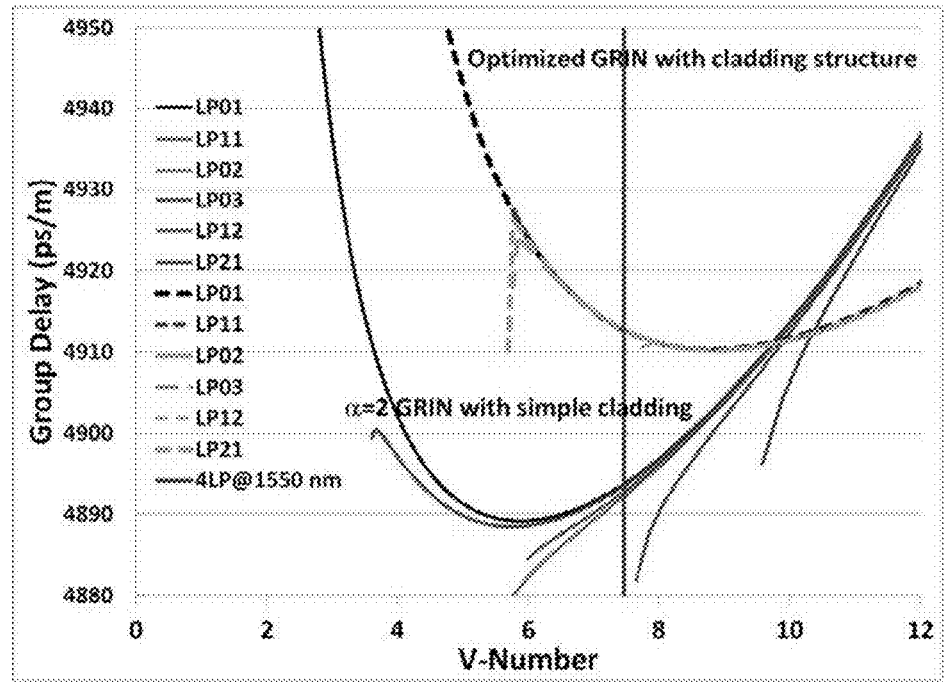
FIG. 15 shows group delays of $LP_{01}$, $LP_{11}$, $LP_{02}$, $LP_{21}$, $LP_{03}$ and $LP_{12}$ modes for a parabolic GRIN-FMF (lower curves) and a GRIN-FMF with a cladding structure, optimized for operation in the C-band (upper curves)

FIG. 15 shows group delays of LP$_{01}$, LP$_{11}$, LP$_{02}$, LP$_{21}$, LP$_{03}$ and LP$_{12}$ modes for a parabolic GRIN-FMF (lower curves) and a GRIN-FMF with a cladding structure, optimized for operation in the C-band (upper curves). The vertical line near V-number equal 7.5 corresponds to four-mode operation.

EXAMPLE 3

Figure 16:
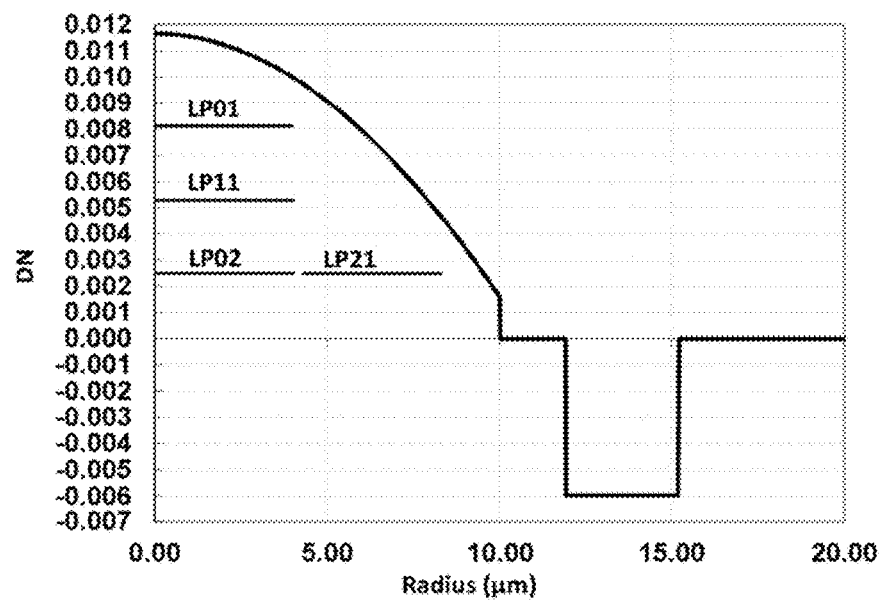
FIG. 16 is a refractive index profile for another practice, Example 3, of the invention.

A further embodiment of the invention is represented by the refractive index profile of FIG. 16. Relevant design parameters are given in the following tables.

| index region | start delta | end delta | alpha | width (μm) |
|---|---|---|---|---|
| 1 | 0.00800 | 0.00107 | 1.972 | 10.00 |
| 2 | 0.00000 | 0.00000 | 0.000 | 1.92 |
| 3 | −0.00410 | −0.00410 | 0.000 | 3.28 |
| 4 | 0.00000 | 0.00000 | 0.000 | 47.30 |

| 1550 nm properties | LP$_{01}$ | LP$_{11}$ | LP$_{02}$ | LP$_{21}$ |
|---|---|---|---|---|
| chromatic dispersion (ps/nm·km) | 18.5 | 18.9 | 18.6 | 19.0 |
| effective area A$_{eff}$ (μm$^2$) | 92.5 | 92.8 | 186.2 | 123.9 |
| effective index difference | 0.0081 | 0.0053 | 0.0025 | 0.0025 |

Figure 17:
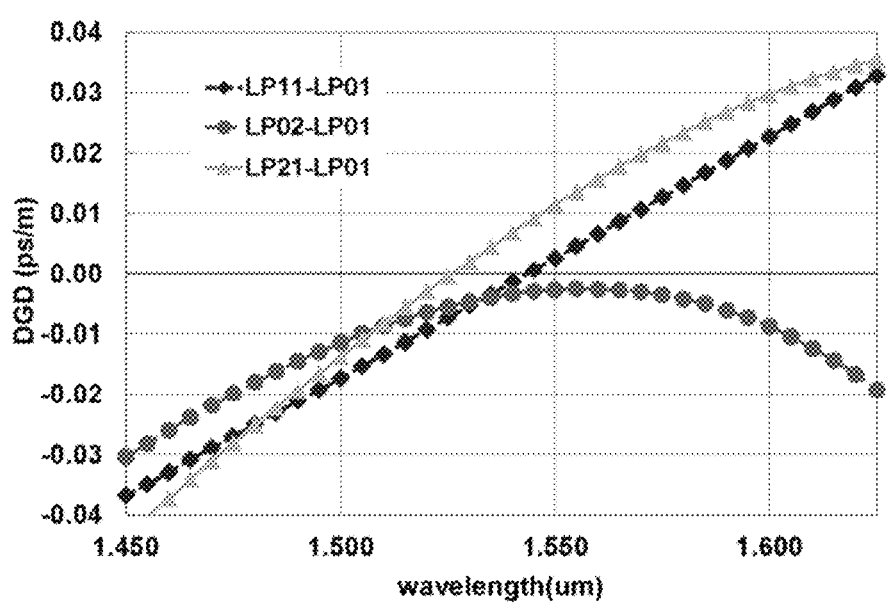
FIG. 17 gives differential group delay data for Example 3.

FIG. 17 gives differential group delay data for the Example 3 embodiment.

EXAMPLE 4

Figure 18:
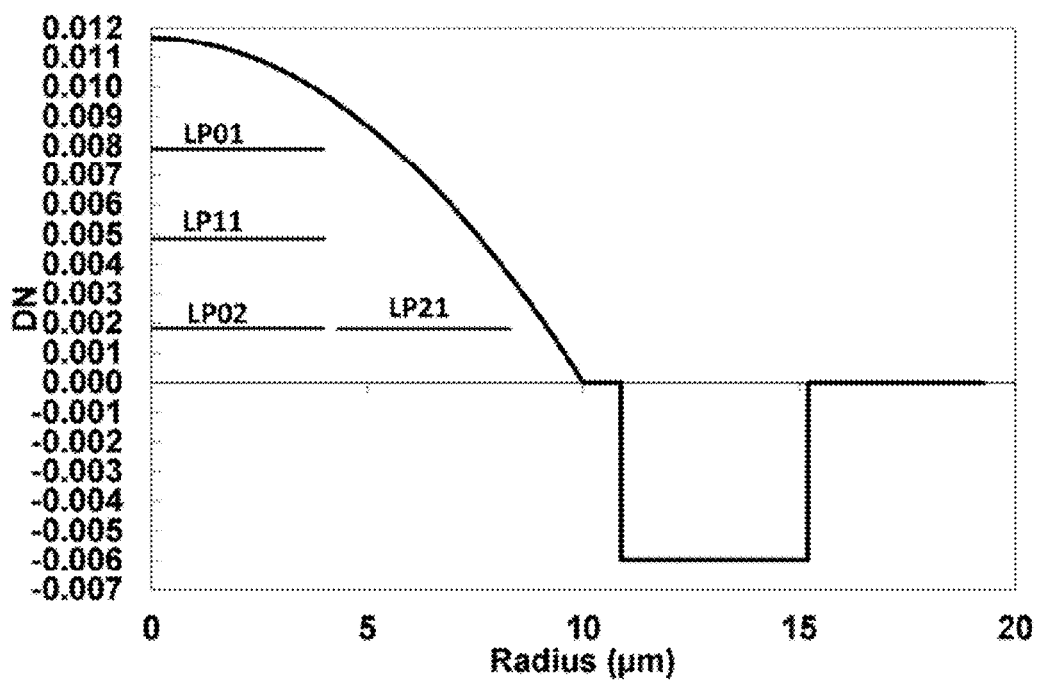
FIG. 18 is a refractive index profile for another practice, Example 4, of the invention.

A further embodiment of the invention is represented by the refractive index profile of FIG. 18. Relevant design parameters are given in the following table.

| 1550 nm properties | LP$_{01}$ | LP$_{11}$ | LP$_{02}$ | LP$_{21}$ |
|---|---|---|---|---|
| chromatic dispersion (ps/nm·km) | 18.9 | 19.3 | 19.2 | 19.5 |
| effective area A$_{eff}$ (μm$^2$) | 86.4 | 86.8 | 174.3 | 115.9 |
| effective index difference | 0.0079 | 0.0049 | 0.0018 | 0.0018 |

Figure 19:
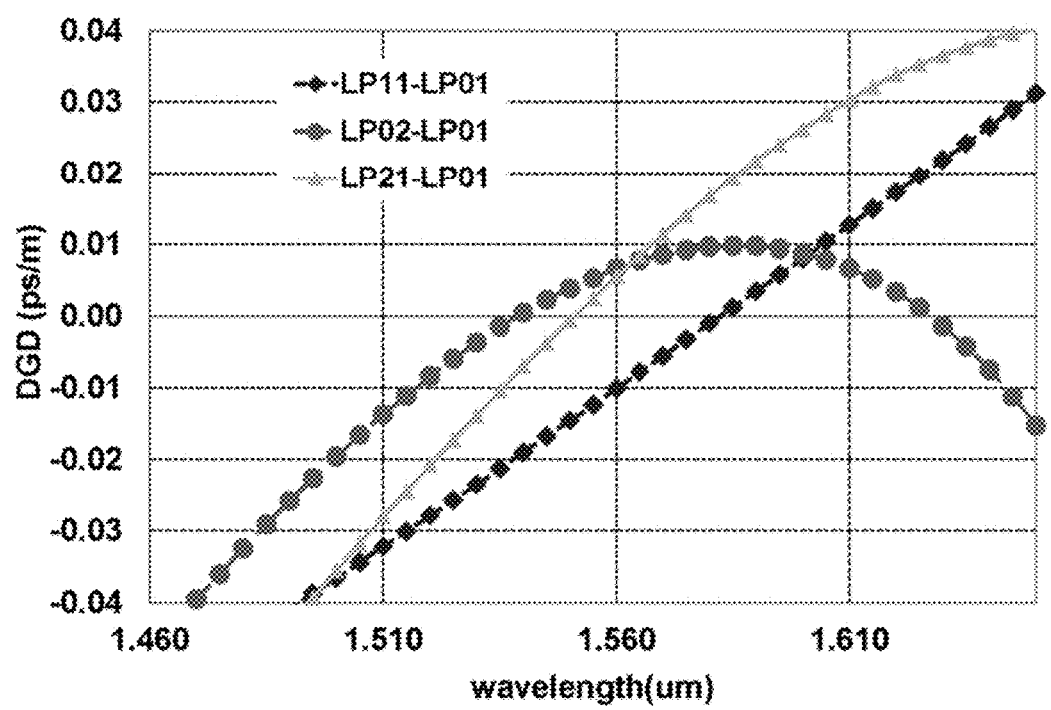
FIG. 19 gives differential group delay data for Example 4.

FIG. 19 gives differential group delay data for the Example 4 embodiment.

EXAMPLE 5

Figure 20:
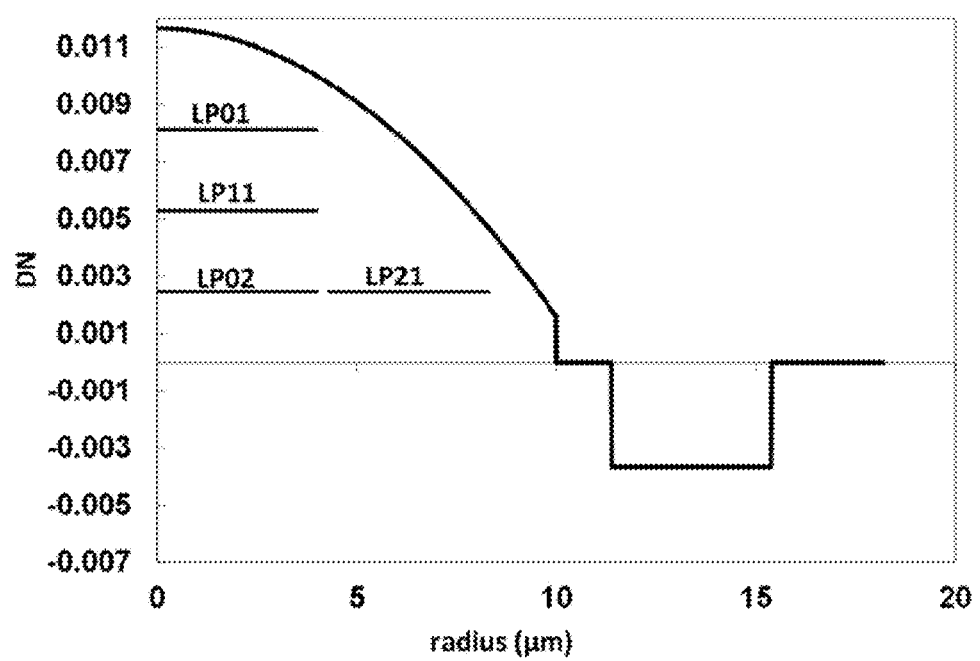
FIG. 20 is a refractive index profile for another practice, Example 5, of the invention.

A further embodiment of the invention is represented by the refractive index profile of FIG. 20. Relevant design parameters and the resulting 1550 nm properties are given in the following tables:

| index region | start delta | end delta | alpha | width (μm) |
|---|---|---|---|---|
| 1 | 0.0080 | 0.00109 | 1.972 | 10.00 |
| 2 | 0.0000 | 0.00000 | 0.000 | 1.39 |
| 3 | −0.0025 | −0.00250 | 0.000 | 4.00 |
| 4 | 0.0000 | 0.00000 | 0.000 | 47.11 |

| 1550 nm properties | LP$_{01}$ | LP$_{11}$ | LP$_{02}$ | LP$_{21}$ |
|---|---|---|---|---|
| chromatic dispersion (ps/nm·km) | 18.9 | 19.3 | 18.1 | 18.9 |
| effective area A$_{eff}$ (μm$^2$) | 92.9 | 93.2 | 186.7 | 124.3 |
| effective index difference | 0.0081 | 0.0053 | 0.0025 | 0.0025 |

Figure 21:
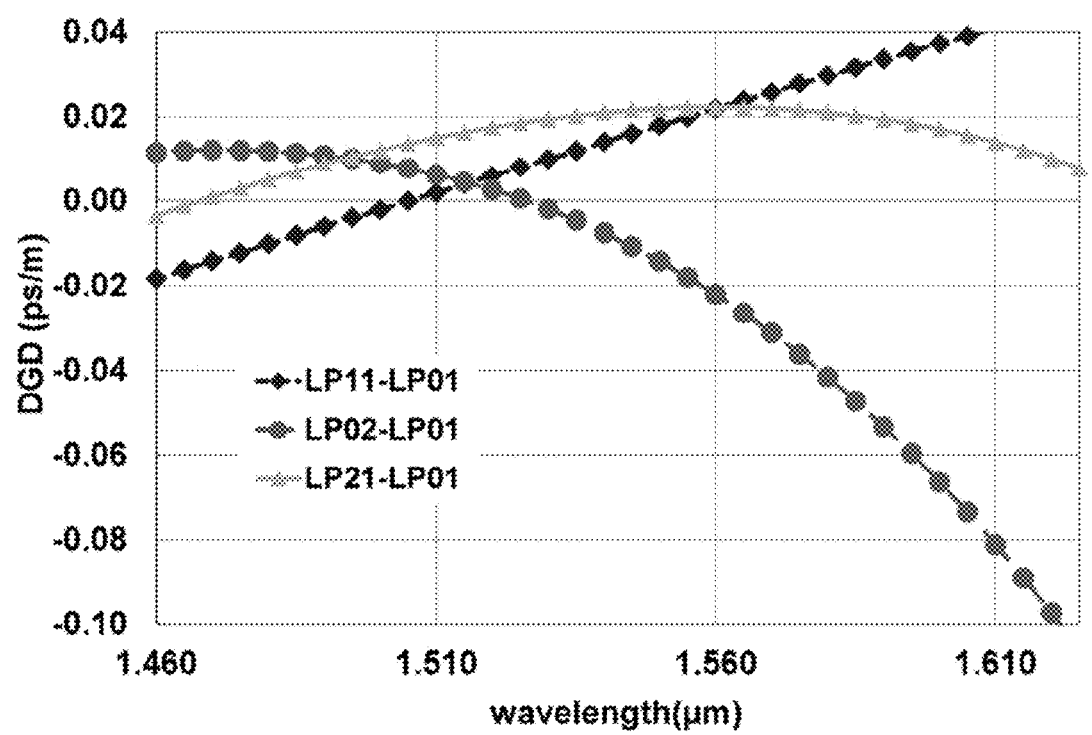
FIG. 21 gives differential group delay data for Example 5.

FIG. 21 gives differential group delay data for the Example 5 embodiment.

EXAMPLE 6

Figure 22:
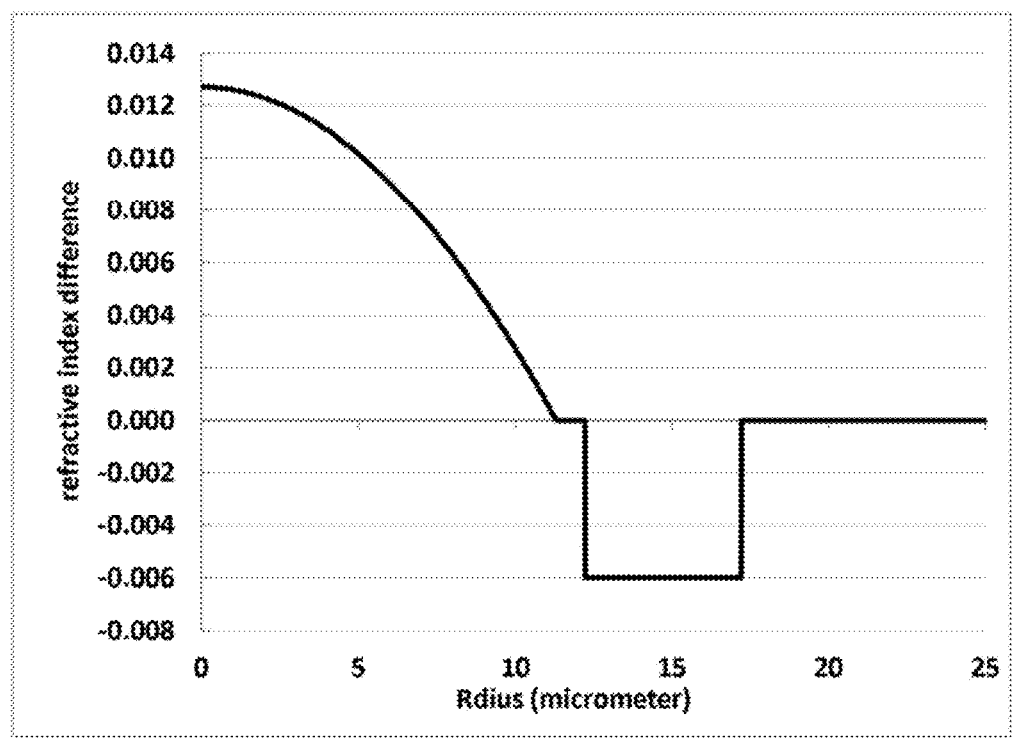
FIG. 22 is a refractive index profile for another practice, Example 6, of the invention, which is a six-mode design.

A further embodiment of the invention is represented by the refractive index profile of FIG. 22. This design is a six-mode design. Relevant design parameters are given in the following table.

| index region | start index | end index | alpha | width |
|---|---|---|---|---|
| 1 | 0.0127 | 0.0000 | 1.97 | 11.30 |
| 2 | 0.0000 | 0.0000 | 0.00 | 0.92 |
| 3 | −0.0060 | −0.0060 | 0.00 | 5.00 |
| 4 | 0.0000 | 0.0000 | 0.00 | 45.28 |

Figure 23:
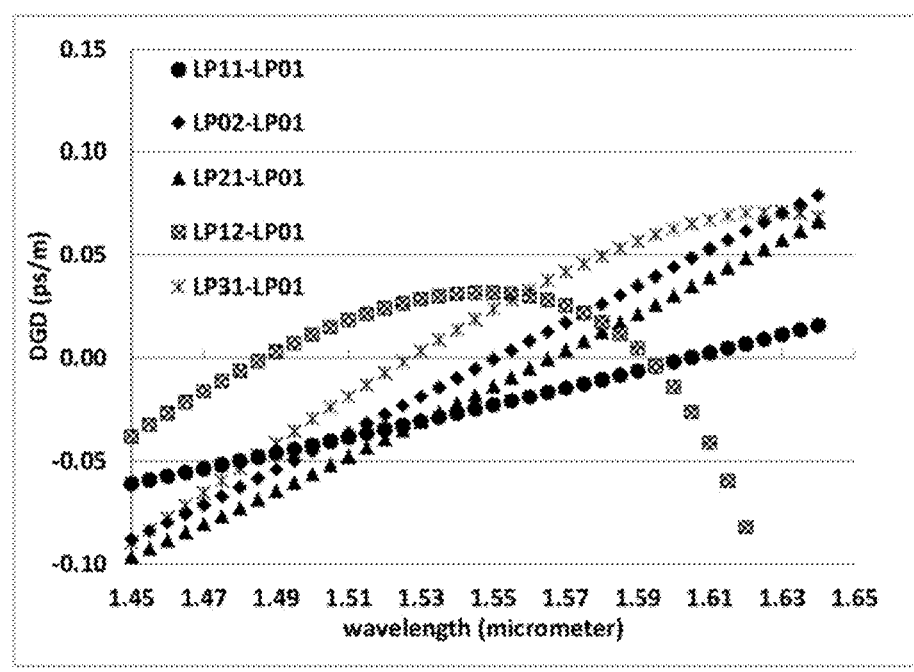
FIG. 23 gives differential group delay between the first five higher-order LP modes and the $LP_{01}$ mode for Example 6.

FIG. 23 gives differential group delay between first five higher order LP modes and $LP_{01}$ mode for the design in table above.

The following table shows effective area of $LP_{01}$, $LP_{11}$, $LP_{02}$, $LP_{21}$, $LP_{12}$ and $LP_{31}$ modes versus wavelength of the six-mode design in FIG. 22.

| wavelength | effective area (µm²) | | | | | |
|---|---|---|---|---|---|---|
| (um) | LP01 | LP11 | LP02 | LP21 | LP12 | LP31 |
| 1.500 | 90 | 91 | 182 | 121 | 291 | 146 |
| 1.505 | 91 | 91 | 183 | 122 | 292 | 146 |
| 1.510 | 91 | 91 | 184 | 122 | 293 | 147 |
| 1.515 | 91 | 92 | 184 | 123 | 294 | 147 |
| 1.520 | 92 | 92 | 185 | 123 | 295 | 148 |
| 1.525 | 92 | 92 | 185 | 123 | 296 | 148 |
| 1.530 | 92 | 93 | 186 | 124 | 297 | 149 |
| 1.535 | 92 | 93 | 187 | 124 | 298 | 149 |
| 1.540 | 93 | 93 | 187 | 125 | 299 | 150 |
| 1.545 | 93 | 94 | 188 | 125 | 300 | 150 |
| 1.550 | 93 | 94 | 189 | 125 | 301 | 151 |
| 1.555 | 94 | 94 | 189 | 126 | 302 | 151 |
| 1.560 | 94 | 94 | 190 | 126 | 304 | 152 |
| 1.565 | 94 | 95 | 190 | 127 | 305 | 152 |
| 1.570 | 95 | 95 | 191 | 127 | 306 | 153 |
| 1.575 | 95 | 95 | 192 | 128 | 307 | 153 |
| 1.580 | 95 | 96 | 192 | 128 | 308 | 154 |
| 1.585 | 96 | 96 | 193 | 128 | 309 | 154 |
| 1.590 | 96 | 96 | 193 | 129 | 310 | 155 |
| 1.595 | 96 | 97 | 194 | 129 | 311 | 155 |
| 1.600 | 96 | 97 | 195 | 130 | 312 | 156 |
| 1.605 | 97 | 97 | 195 | 130 | 314 | 156 |
| 1.610 | 97 | 98 | 196 | 130 | 315 | 157 |
| 1.615 | 97 | 98 | 197 | 131 | 316 | 157 |
| 1.620 | 98 | 98 | 197 | 131 | 317 | 158 |
| 1.625 | 98 | 98 | 198 | 132 | 319 | 158 |

Large effective area in optical fibers can reduce nonlinear effects, both intra-modal and inter-modal. In addition, some differential group delay can reduce inter-modal nonlinear effect. However pairs of inverse differential group delay and differential group delay slope with similar effective areas would be desirable to reduce the total span group delay for simplicity and low cost receiver MIMO design.

In an effort to design very large effective area fibers that support multiple independent modes for mode division multiplexing we investigated a few-mode fiber design space resulting in an effective area large than 160 µm² for $LP_{01}$ mode, having differential group delay near zero, tunable for inverse differential group delay and differential group delay slope pairs. We refer to these as ultra large effective area few-mode fiber designs (ULA-FMF)

EXAMPLE 7

ULA-FMF Design 1

Figure 24:
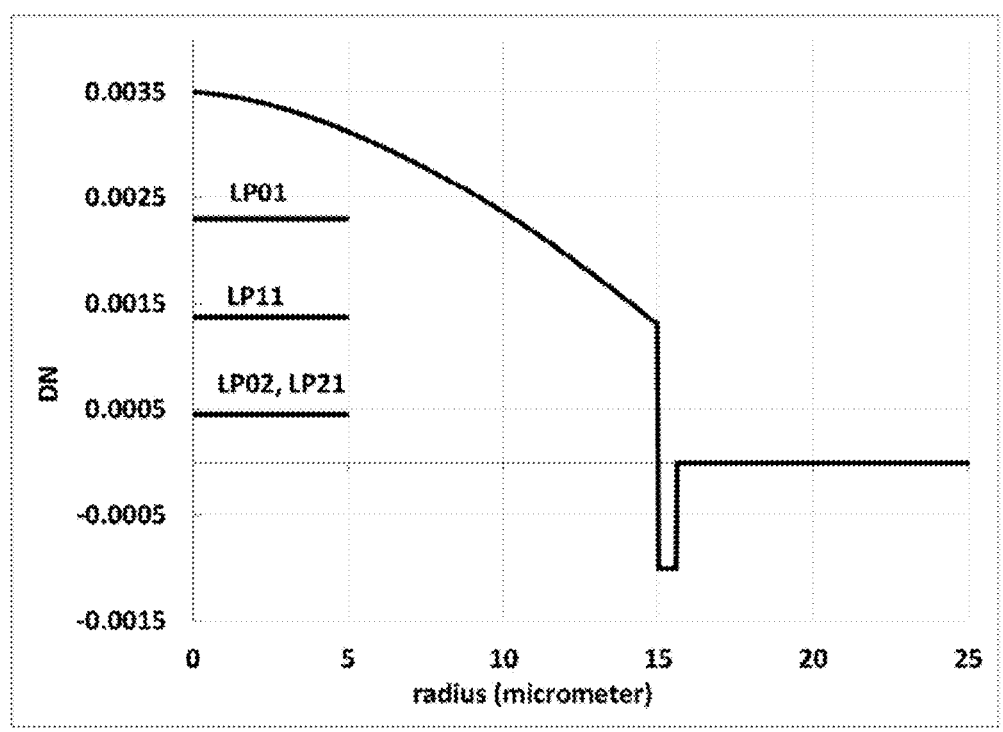
FIG. 24 shows a refractive index profile for the design of Example 7, an Ultra Large Area few-mode fiber (ULA-FMF) design.

A refractive index profile for ULA-FMF Example 7 is shown in FIG. 24. Numbers for the refractive index profile are:

| Region | Start Index | End Index | Alpha | Width |
|---|---|---|---|---|
| 1 | 0.0035 | 0.0013 | 1.63 | 15.0 |
| 2 | −0.0010 | −0.0010 | 0.00 | 0.6 |
| 3 | 0.0000 | 0.0000 | 0.00 | 46.9 |

In this ULA-FMF design the delta is kept small for low attenuation.

Figure 25:
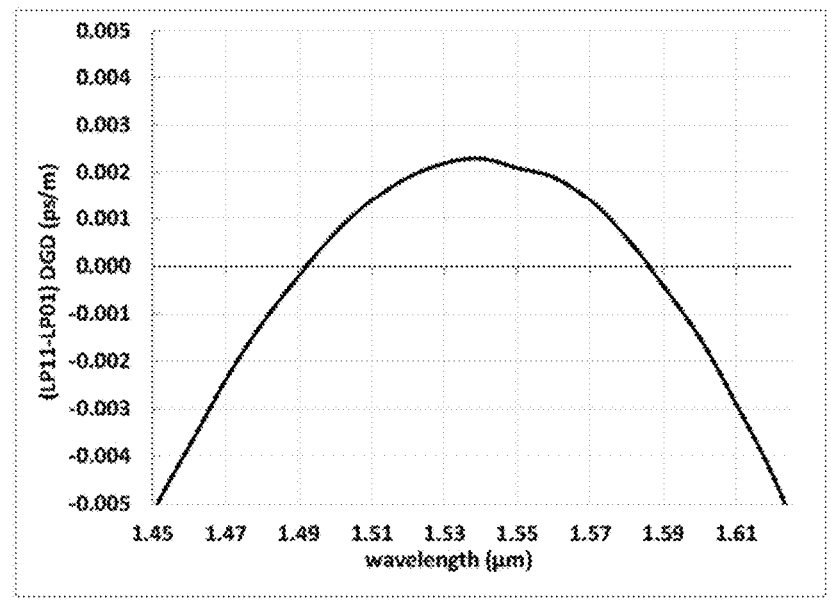
FIG. 25 shows differential group delay between the $LP_{11}$ mode and the $LP_{01}$ mode for Example 7.

Differential group delay between $LP_{11}$ mode and $LP_{01}$ mode for Example 7 is given in FIG. 25.

To illustrate the large effective area of this design the effective area is shown for a range of wavelengths in the following table:

| wavelength (µm) | $LP_{01}$ Aeff (µm²) | $LP_{11}$ Aeff (µm²) |
|---|---|---|
| 1.50 | 275 | 276 |
| 1.51 | 277 | 278 |
| 1.52 | 279 | 279 |
| 1.53 | 281 | 281 |
| 1.54 | 283 | 283 |
| 1.55 | 284 | 285 |
| 1.56 | 286 | 287 |
| 1.57 | 288 | 289 |
| 1.58 | 290 | 291 |
| 1.59 | 292 | 293 |
| 1.60 | 294 | 294 |
| 1.61 | 296 | 296 |
| 1.62 | 298 | 298 |
| 1.63 | 299 | 300 |

In Example 7 the width of the trench is less than 1 µm. In general, designs with trench widths less than 2 µm for mode division multiplexing are effective and unusual.

EXAMPLE 8

ULA-FMF Design 2

Figure 26:
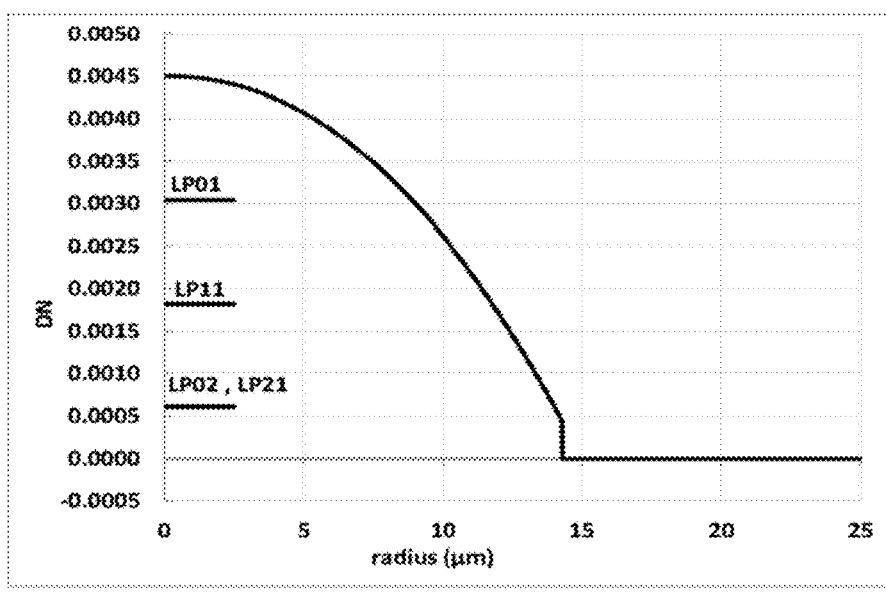
FIG. 26 shows a refractive index profile for the design of Example 8, a second Ultra Large Area few-mode fiber (ULA-FMF) design.

FIG. 26 shows a refractive index profile for a second example of a ULA-FMF fiber design.

The design parameters for this example are:

| Region | Start Index | End Index | Alpha | Width |
|---|---|---|---|---|
| 1 | 0.0045 | 0.0000 | 2.150 | 15.0 |
| 2 | 0.0000 | 0.0000 | 0.000 | 47.5 |

Figure 27:
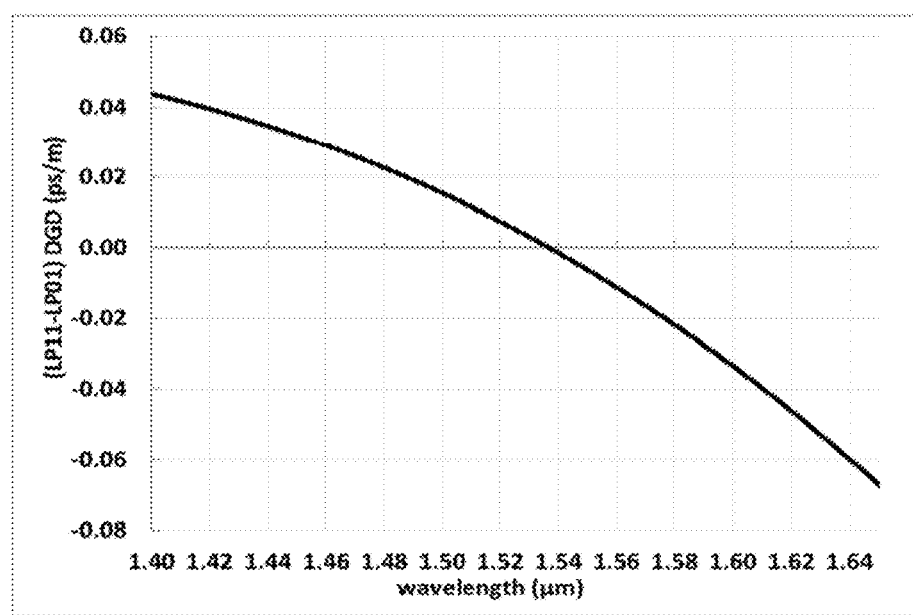
FIG. 27 shows differential group delay between $LP_{11}$ mode and $LP_{01}$ mode for Example 8.

FIG. 27 shows differential group delay between $LP_{11}$ mode and $LP_{01}$ mode for the design of Example 8.

The effective area of this design is shown for a range of wavelengths in the following table:

| wavelength (µm) | $LP_{01}$ Aeff (µm²) | $LP_{11}$ Aeff (µm²) |
|---|---|---|
| 1.50 | 209 | 207 |
| 1.51 | 210 | 208 |
| 1.52 | 211 | 210 |
| 1.53 | 213 | 211 |
| 1.54 | 214 | 213 |
| 1.55 | 216 | 215 |
| 1.56 | 217 | 216 |
| 1.57 | 218 | 218 |
| 1.58 | 220 | 219 |
| 1.59 | 221 | 221 |
| 1.60 | 222 | 222 |

-continued

| wavelength (μm) | $LP_{01}$ Aeff (μm$^2$) | $LP_{11}$ Aeff (μm$^2$) |
|---|---|---|
| 1.61 | 224 | 224 |
| 1.62 | 225 | 226 |

EXAMPLE 9

ULA-FMF Design 3

Figure 28:
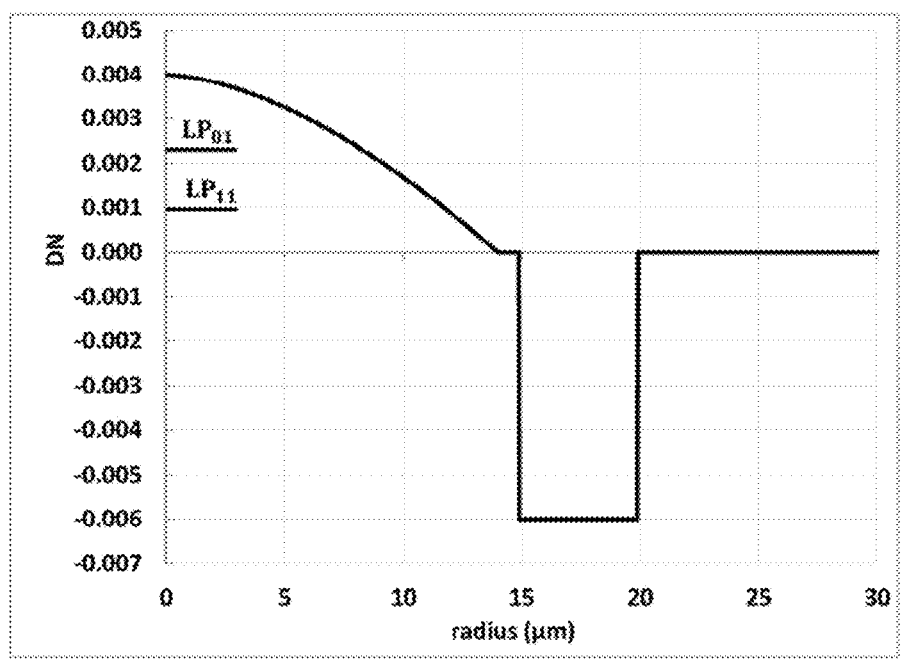
FIG. 28 shows a refractive index profile for the design of Example 9, a third Ultra Large Area few-mode fiber (ULA-FMF) design.

FIG. 28 shows a refractive index profile for a third example of a ULA-FMF fiber design.

The design parameters for this example are:

| Region | Start Index | End Index | Alpha | Width |
|---|---|---|---|---|
| 1 | 0.0040 | 0.0000 | 1.625 | 14.0 |
| 2 | 0.0000 | 0.0000 | 0 | 0.9 |
| 3 | −0.0060 | −0.0060 | 0 | 5.0 |
| 4 | 0.0000 | 0.0000 | 0 | 46.9 |

Figure 29:
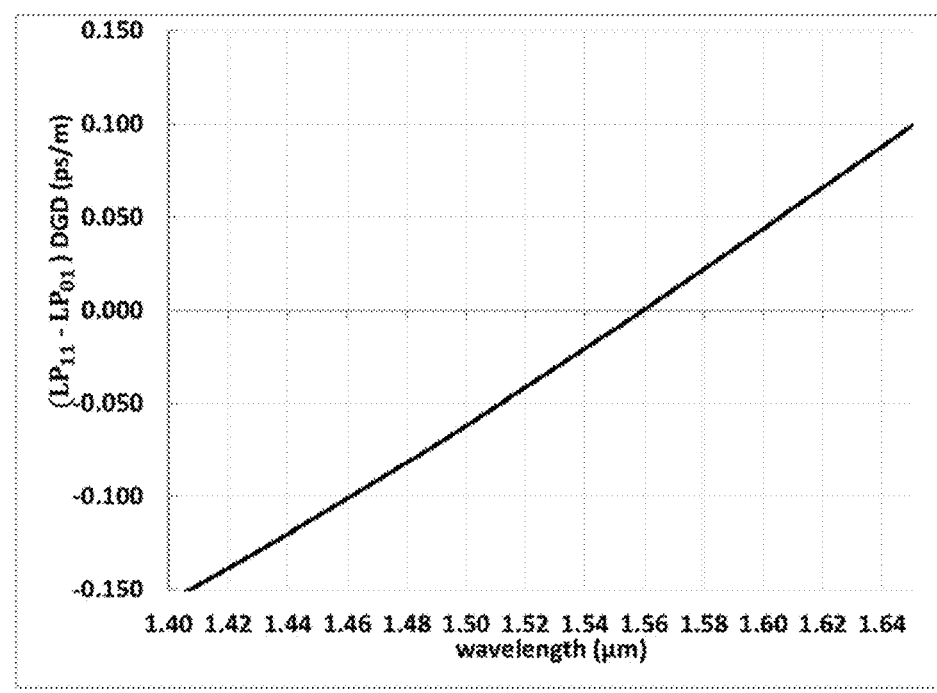
FIG. 29 shows differential group delay between $LP_{11}$ mode and $LP_{01}$ mode for Example 9.

FIG. 29 shows differential group delay between $LP_{11}$ mode and $LP_{01}$ mode for the design of Example 9.

The ULA-FMF design of Example 9 has two guided modes ($LP_{01}$ and $LP_{11}$). $LP_{02}$ mode is cut off at 1.421 μm. The effective area $LP_{01}$ mode is 196.35 μm$^2$ at 1550 nm, close to that of ULA-FMF design 2 (215.5 μm$^2$ at 1550 nm). The DGD slope has opposite signs. Thus ULA-FMF design 2 and 3 could be used in pair to reduce total DGD across a total transmission span. The DGD values can be further increased and DGD value/DGD slope can be further optimized to minimize inter-modal nonlinear effect and reduce accumulated net total span DGD.

In addition to the application of spatial mode division multiplexing using both $LP_{01}$ mode and $LP_{11}$ mode, single mode launch into $LP_{01}$ mode is another potential application. There will be some cross talk due to distributed coupling in long distance transmission, however the small net DGD can help to reduce the spread of the distributed coupling in time domain. Few-mode fibers as contemplated for the invention according to the current state of the technology generally support from 2 to 10 modes. Support in this context means that each of 2 to 10 modes are effectively transmission channels that are capable of transmitting optical signals independently without fatal crosstalk. Fatal crosstalk means that the signal is degraded beyond intelligence. It is noted that for the above Examples 1-9, the effective area of the $LP_{11}$ and $LP_{21}$ modes should have a scaling factor of 4/3. However, it will be appreciated that this scaling factor does not affect the aspects of the invention described and claimed herein.

Few-Mode Fibers Supporting 9 or More LP Modes

In the present section, there are provided a number of additional details relating to the design and fabrication of few-mode fibers. There are also provided a number of examples of few-mode fibers according to aspects of the invention described above that are capable of supporting nine or more LP modes (i.e., 15 or more spatial modes).

In the above description, it was noted that certain higher-order LP modes comprise a number of component polarizations, each of which is capable of carrying a separate spatially-multiplexed signal. Thus, generally speaking, the number of spatial modes supported by a FMF is equal to, or greater than, the number of LP modes supported by the FMF. As used hereinbelow, unless otherwise required by context, the term "mode" by itself refers to an "LP mode" rather than a "spatial mode."

As discussed above, space-division multiplexing (SDM) transmission systems place a number of demands on the transmission fiber. In the case of a few-mode fiber (FMF), the differential mode loss should be kept to a minimum, the bend loss should be kept to a minimum for the given application, and nonlinearities should be kept to a minimum (i.e., by configuring the fiber to have a suitable effective area and dispersion). Furthermore, to reduce the complexity of digital signal processing, it is desirable that the differential group delay (DGD) be kept as low as possible. Also, in practical transmission systems, splices typically occur every few kilometers. As such, a reasonable demand is that the fiber splices to itself with low loss and low mode coupling.

In the following discussion, there is first described a number of FMF examples supporting 9 or more LP modes. There is then provided a discussion of the sensitivity of differential group delay (DGD) with respect to a number of design parameters.

EXAMPLE 10

9 LP Mode Fiber

In the present section, there is described in detail an FMF design meeting the above criteria that supports 9 LP modes, allowing multiplexing over 15 spatial modes.

The maximal difference in DGD for the supported modes was found to be less than 0.8 ps/m, measured with both $S^2$ and time-of-flight measurement. Strong coupling was observed within the mode groups in the fiber. The attenuation was found to be low for all guided modes, and was found to vary between 0.20 and 0.22 dB/km. The design of the described fiber presented a number of challenges, including very precise control of the core index profile, to achieve an acceptable amount of differential group delay (DGD). The developed tools described above allow for easy optimization of alpha profiles within all MCVD products, decreasing run-in time of new products.

FIGS. 30 and 31 show, respectively, cross section and isometric views of an exemplary FMF 300 according to the present aspect of the invention, comprising four abutting concentric regions: a graded-index core 301 (Region 1), i.e., an "alpha core," having radius a; an undoped ledge region 302 (Region 2); a down-doped trench region 303 (Region 3); and an undoped outer cladding region 304 (Region 4).

FIG. 32 shows a table 320 setting forth the following parameters for Regions 1-4 of the FMF: start index, end index, alpha (α), and width (μm). Generally speaking, for a 9 LP-mode fiber according to the present invention, a suitable width for the graded-index core is approximately 13 μm or greater.

Figure 33:
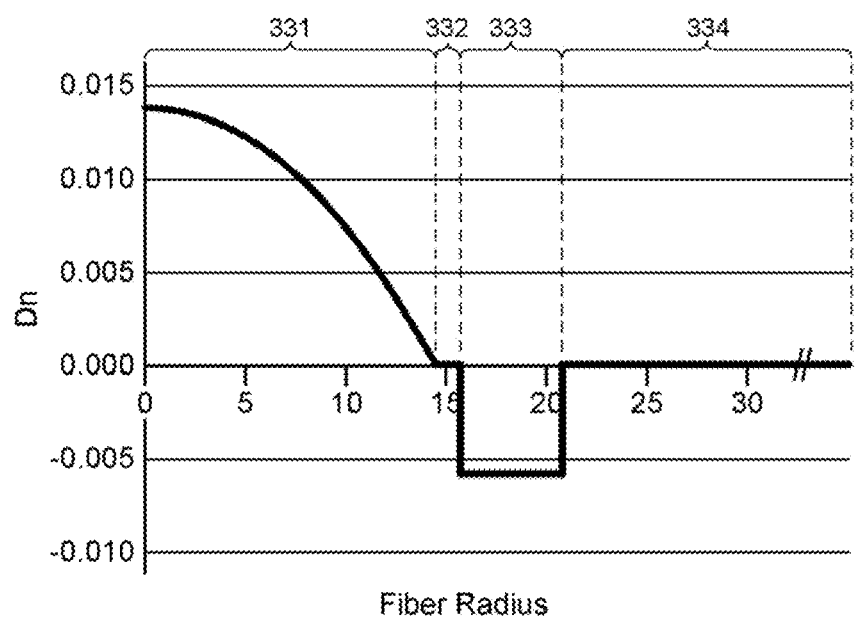
FIG. 33 shows a refractive index profile for Example 10.

FIG. 33 shows a refractive index profile 330 for FMF, in which the respective refractive index 331-334 for each of Regions 1-4 is expressed as the index difference relative to the undoped outer cladding region. (By definition, the outer cladding region has an index difference of 0.0.)

The graded-index core 301 is designed to minimize differential group delay (DGD). The volume of trench 303 is adjusted to minimize bend loss, to ensure that differential mode loss is kept low, and to shift the cutoff wavelength such that exactly 9 LP modes are well-guided: the fundamental $LP_{01}$ mode and higher-order $LP_{02}$, $LP_{03}$, $LP_{11}$, $LP_{12}$, $LP_{21}$, $LP_{22}$, $LP_{31}$, and $LP_{41}$ modes, divided into five mode groups: Group 1 ($LP_{01}$); Group 2 ($LP_{11}$); Group 3 ($LP_{02}$, $LP_{21}$) Group 4 ($LP_{12}$, $LP_{31}$); and Group 5 ($LP_{03}$, $LP_{22}$, $LP_{41}$).

Figure 34:
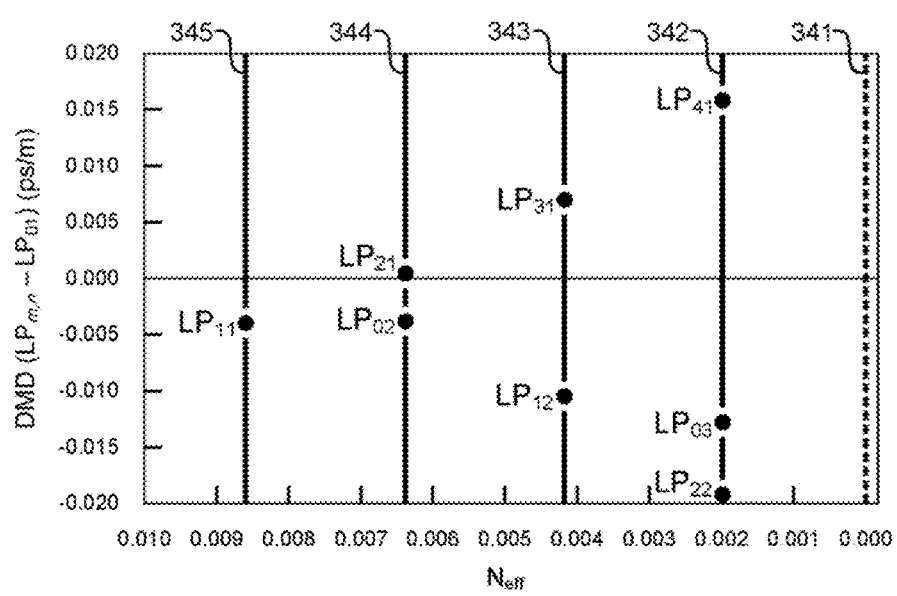
FIG. 34 shows a graph illustrating, for each of the higher-order modes supported by Example 10, the mode's predicted index difference relative to an undoped silica cladding, and the mode's predicted differential group delay.

FIG. 34 shows a graph 340 illustrating, for each of the higher-order modes, the mode's predicted index difference relative to an undoped silica cladding, and the mode's predicted DGD. The highest-order mode group (Group 5: $LP_{03}$, $LP_{22}$, $LP_{41}$) has a maximum effective index difference of $2.0 \cdot 10^{-3}$ relative to the silica cladding. The fiber is predicted to have excellent bend performance.

It is noted that the spacing of the mode groups in FIG. 34 corresponds to the schematic diagram of fiber mode propagation constants shown in FIG. 1, discussed above. In particular, the cladding $\Delta n$, indicated by vertical broken line 341, corresponds to the horizontal broken line in FIG. 1 labeled "cladding index." The respective positions of the mode groups along the x-axis, indicated by solid lines 342-345, correspond to the horizontal solid lines in FIG. 1 labeled "bound modes i,j."

Figures 35, 36:
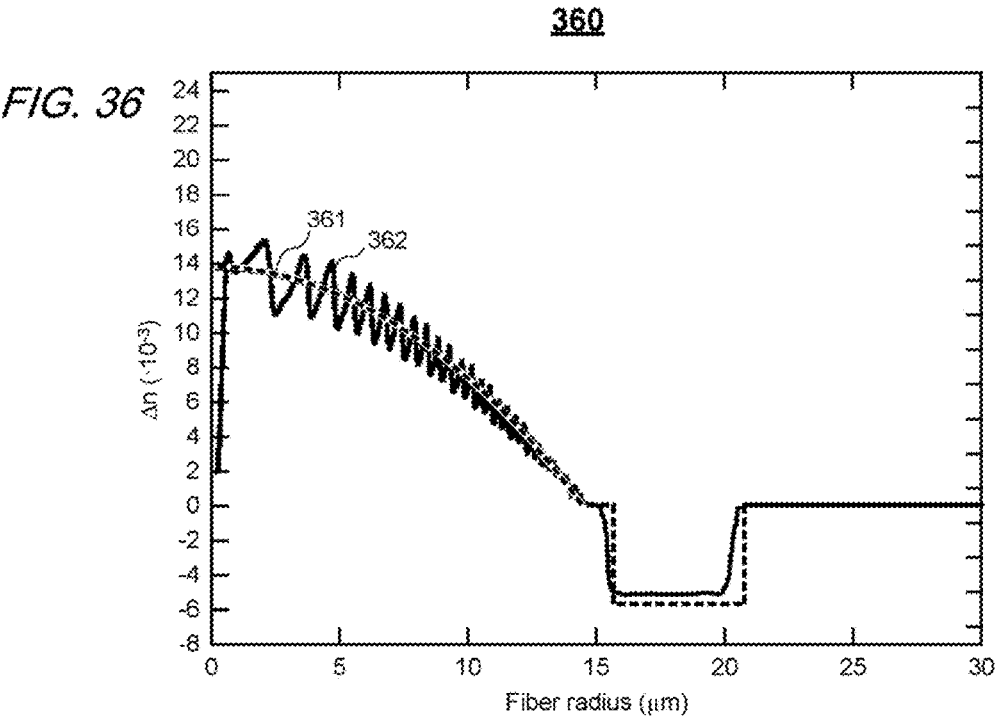
FIG. 35 shows a table illustrating the theoretical properties of Example 10.
FIG. 36 shows a graph illustrating the target refractive index profile and the actual refractive index profile achieved in a first attempt to fabricate a prototype of Example 10.

FIG. 35 shows a table illustrating the theoretical properties of the fiber. Small perturbations to the core profile are predicted to result in fairly large changes in DGD, and may also yield fiber with negative DGD, opening up the possibility for all-fiber DGD compensation. The sensitivity of DGD with respect to a number of design parameters is illustrated in FIGS. 60A-60F, discussed below.

According to a further aspect of the invention, FMF 30 is fabricated using a modified chemical vapor deposition (MCVD) technique. A silica tube is loaded into a lathe and is rotated around its longitudinal axis as an aerosol or other vapor-phase deposition technique is used to deposit onto the silica tube's interior wall a series of layers of a chemical soot containing silica and one or more selected dopants. The silica tube is subsequently sintered and collapsed to form a solid cylindrical preform that is then loaded into a draw tower and drawn into fiber. The concentration of dopant in each deposited layer is controlled by adjusting its flow rate.

In fabricating a prototype of the above-described fiber, an MCVD technique was used to construct a preform. The graded-index core 301 was formed from silica doped with varying amounts of germania in order to obtain the desired profile. The shoulder 302 was formed from undoped silica. The trench 303 was formed from fluorine-doped silica. The preform was then overcladded with a silica jacketing tube and drawn into standard 125 µm fiber under normal production draw conditions. The outer cladding region 304 was formed from the silica substrate tube and the silica jacketing tube.

FIG. 36 shows a graph 360 illustrating the target refractive index profile (curve 361) shown in FIG. 32, and the actual refractive index profile (curve 362) achieved in a first attempt to fabricate a preform using the described MCVD technique.

Figure 37:
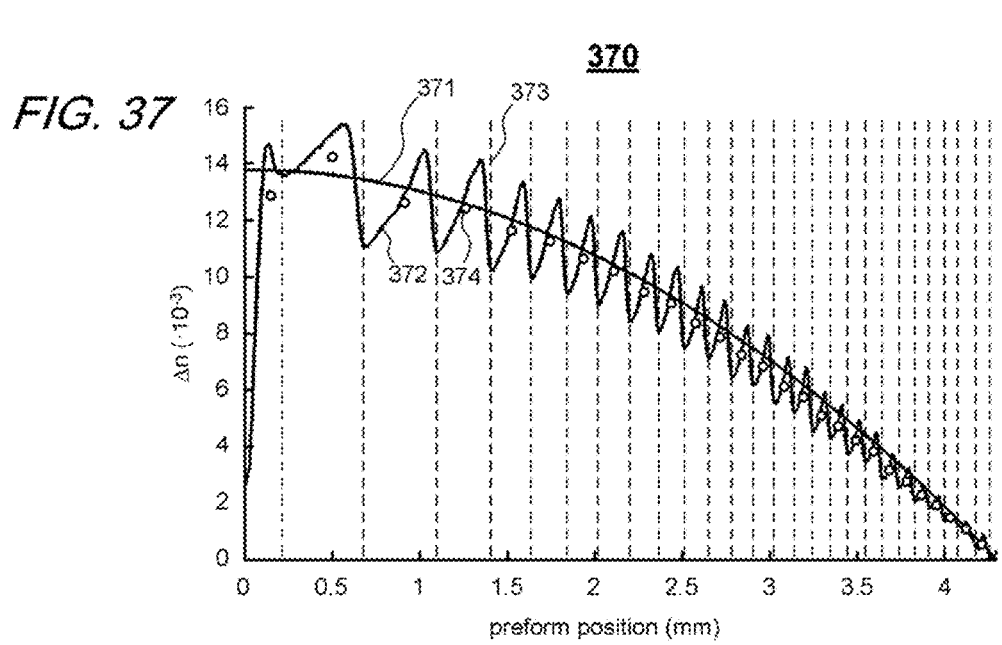
FIG. 37 shows a graph illustrating the target refractive index profile of the graded-index core region, and the measured refractive index profile for Example 10.

FIG. 37 shows a graph 370 illustrating the target refractive index profile (curve 371) of the graded-index core region, and the measured refractive index profile (curve 372). As discussed above, in an MCVD technique, the preform is built in successively applied layers containing silica and a selected amount of dopant (or no dopant). The boundary between each layer is marked using a series of broken lines 373. The average refractive index for each layer is marked as a series of dots 374.

The actual refractive index is reasonably close to the target index profile, but in order to obtain good DGD performance, the fabrication technique needs to be adjusted. According to a further aspect of the invention, the index profile of the fabricated fiber was adjusted by using a second-order polynomial fit of the input germania flow rate to the average index within each layer.

Figure 38:
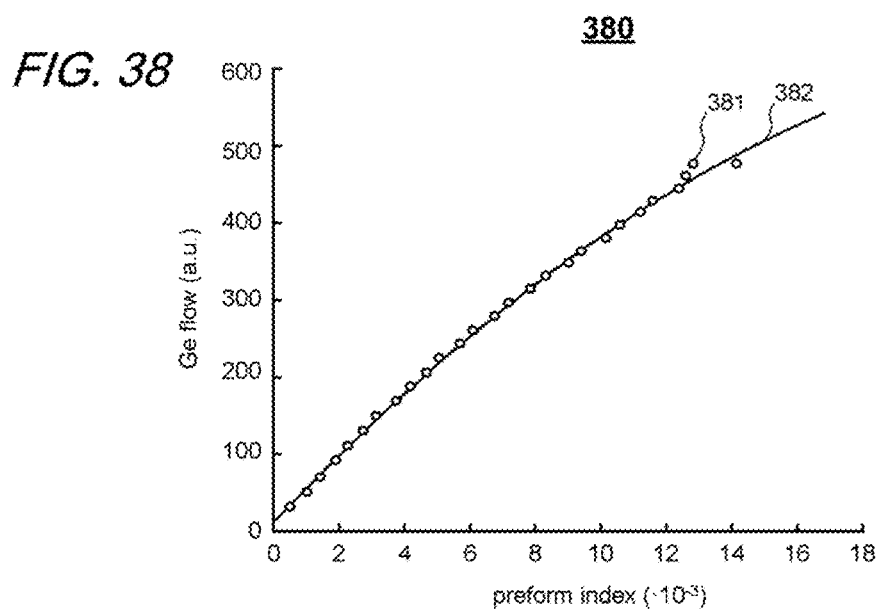
FIG. 38 shows a graph illustrating the relationship between the preform index for the graded-index core of Example 10 and the germania flow rate (expressed in arbitrary units)

FIG. 38 shows a graph 380 illustrating the relationship between the preform index for the graded-index core and the germania flow rate (expressed in arbitrary units). The measured germania flow input data is shown as a series of dots 381. The second-order polynomial fit of the flow input data is shown as a curve 382. The fit was used to approximate new germania flows based on the differences between target and measured profiles. Generally speaking, deviations from the fit within a given layer are indicative of temperature fluctuations.

Figure 39:
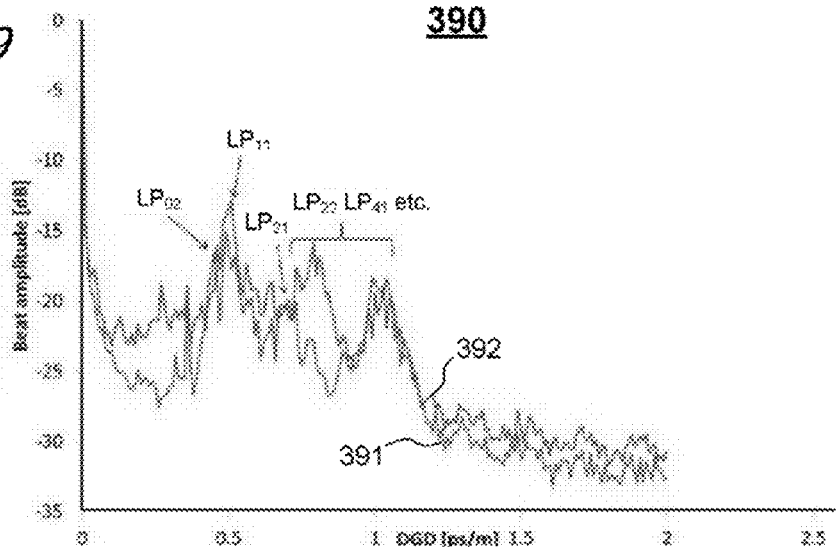
FIG. 39 shows a graph of the output of an S2 measurement on a 20-meter sample of Example 10.

The fiber was characterized by spatially-resolved and spectrally-resolved mode imaging ($S^2$ imaging), in order to assess differential group delays and mode coupling within the guided modes. FIG. 39 shows a graph 390 of the output of an $S^2$ measurement on a 20-meter sample of the 9 LP-mode fiber. Both centered-launch (trace 391) and offset-launch (trace 392) were used in order to excite higher-order modes. The $S^2$ measurements were in reasonable agreement with the calculated mode delay of the fiber. As expected, significant mode coupling was observed between the modes with similar group indices.

Figure 40:
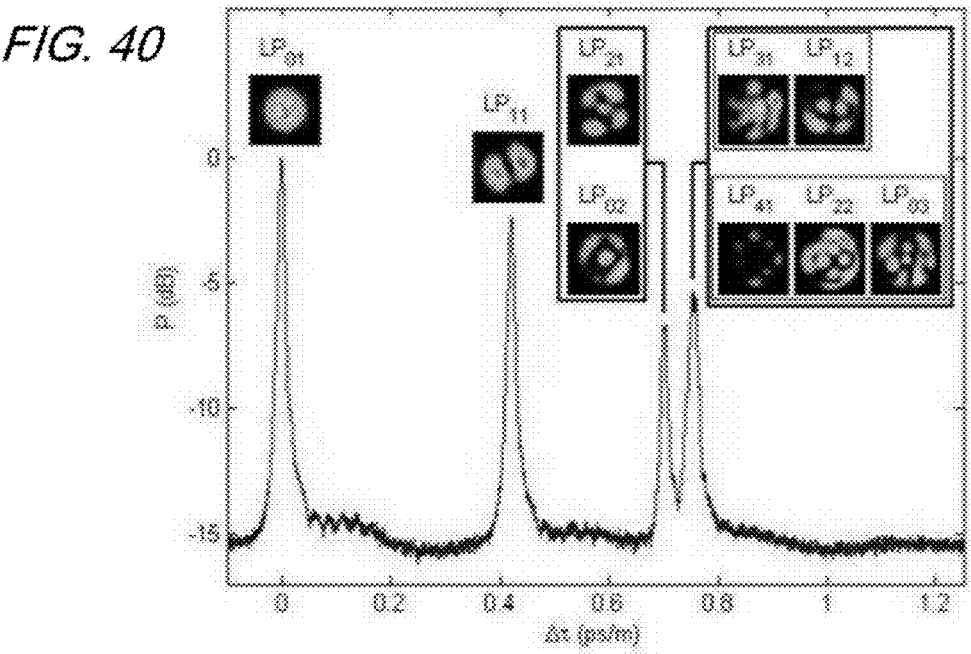
FIG. 40 shows a graph of the results.

A 13.2 km spool of fiber was then characterized by time-of-flight (ToF) measurements, in order to characterize the multimode fiber impulse response and thus the DGD of the fiber. FIG. 40 shows a graph 400 of the results. The modal content of the individual peaks was resolved by individually launching each individual mode group, using phase plates in a free space-setup. A CCD camera was used to capture images of the mode intensity, leading to identification of each mode group. In a similar fashion, an optical time-domain reflectometer was used to measure the mode dependent loss of each mode group.

The agreement between the $S^2$ and time-of-flight measurements was fairly good, particularly noting that the $S^2$ measurement is only on a 20-meter sample. Somewhat surprisingly, the $LP_{31}/LP_{12}$ and $LP_{41}/LP_{22}/LP_{03}$ groups seem to couple, despite a fairly large difference in effective index. Simulations from the index profile indicate that this is coincidental. It appears that the apparent coupling of these mode groups having respective DGDs that are too similar to each other to distinguish easily. There is some room for improvement compared to the theoretical design limit.

FIG. 41 shows a table 410 setting forth the measured modal loss for the four-mode groups in the 9 LP-mode fiber, found by launching each mode group separately and performing optical time domain reflectometry (OTDR).

Additional exemplary FMFs are described below, including three examples of a 9 LP mode fiber, a 12 LP mode fiber, a 16 LP mode fiber, and a 20 LP mode fiber.

Each of the following exemplary FMF designs comprises four regions: a graded-index core (Region 1); an undoped shoulder region (Region 2); a trench region (Region 3); and an undoped outer cladding region (Region 4). The above-described techniques for fabricating FMF 300 are equally applicable to the FMFs described below.

EXAMPLE 11-1

9 LP Modes

FIGS. 42-45 set forth data describing another example of a 9 LP mode FMF according to the invention.

FIG. 42 shows a table 420 setting forth the following parameters for Regions 1-4 of the FMF: start index, end index, alpha (α), and width (μm). As mentioned above, generally speaking, for a 9 LP-mode fiber according to the present invention, a suitable width for the graded-index core is approximately 13 μm or greater.

Figure 43:
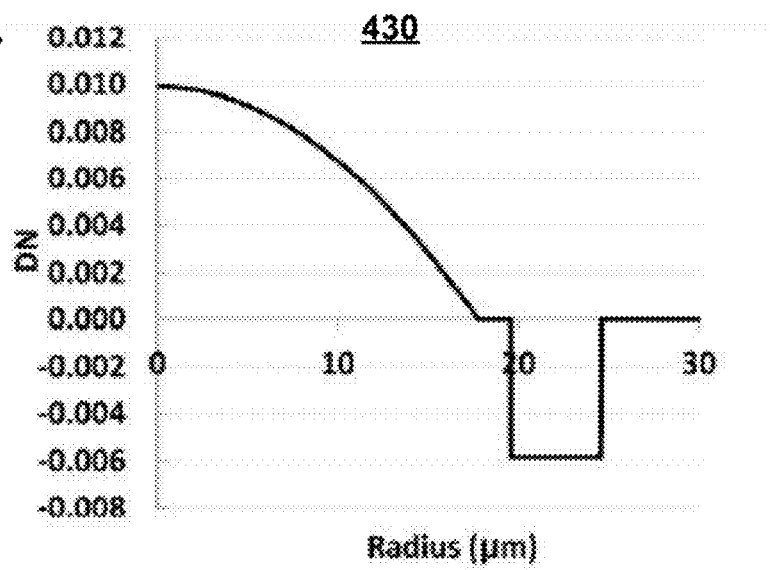

FIG. 43 shows the FMF's refractive index profile 430.

Figure 44:
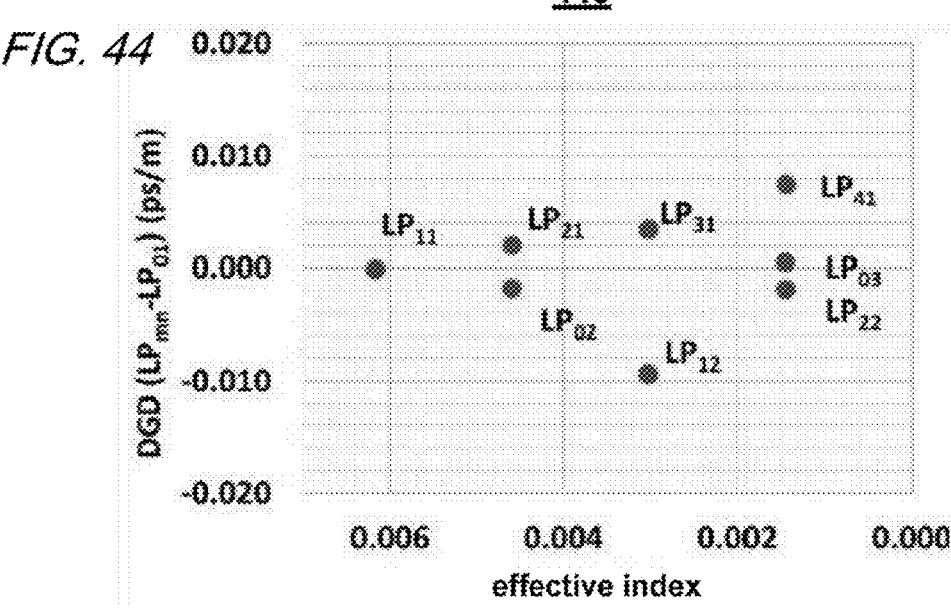

FIG. 44 shows a plot 440 of the respective effective index and DGD for the higher-order modes supported by the FMF.

FIG. 45 shows a table 450 setting forth the respective effective area for each of the supported modes at wavelengths ranging from 1.485 μm to 1.630 μm (in increments of 0.005 μm).

EXAMPLE 11-2

9 LP Modes

FIGS. 46-49 set forth data describing another example of a 9 LP mode FMF according to the invention.

FIG. 46 shows a table 460 setting forth the following parameters for Regions 1-4 of the FMF: start index, end index, alpha (α), and width (μm). As mentioned above, generally speaking, for a 9 LP-mode fiber according to the present invention, a suitable width for the graded-index core is approximately 13 μm or greater.

FIG. 47 shows the FMF's refractive index profile 470.

FIG. 48 shows a plot 480 of the respective effective index and DGD for the higher-order modes supported by the FMF.

FIG. 49 shows a table 490 setting forth the respective effective area for each of the supported modes at wavelengths ranging from 1.395 to 1.690 μm (in increments of 0.005 μm).

EXAMPLE 11-3

9 LP Modes

FIGS. 50-53 set forth data describing a further example of a 9 LP mode FMF according to the invention.

FIG. 50 shows a table 500 setting forth the following parameters for Regions 1-4 of the FMF: start index, end index, alpha (α), and width (μm). As mentioned above, generally speaking, for a 9 LP-mode fiber according to the present invention, a suitable width for the graded-index core is approximately 13 μm or greater.

FIG. 51 shows the FMF's refractive index profile 510.

FIG. 52 shows a plot 520 of the respective effective index and DGD for the higher-order modes supported by the FMF.

FIG. 53 shows a table 530 setting forth the respective effective area for each of the supported modes at wavelengths ranging from 1.395 μm to 1.640 μm (in increments of 0.005 μm.

EXAMPLE 12

12 LP Modes

Figures 54, 55:
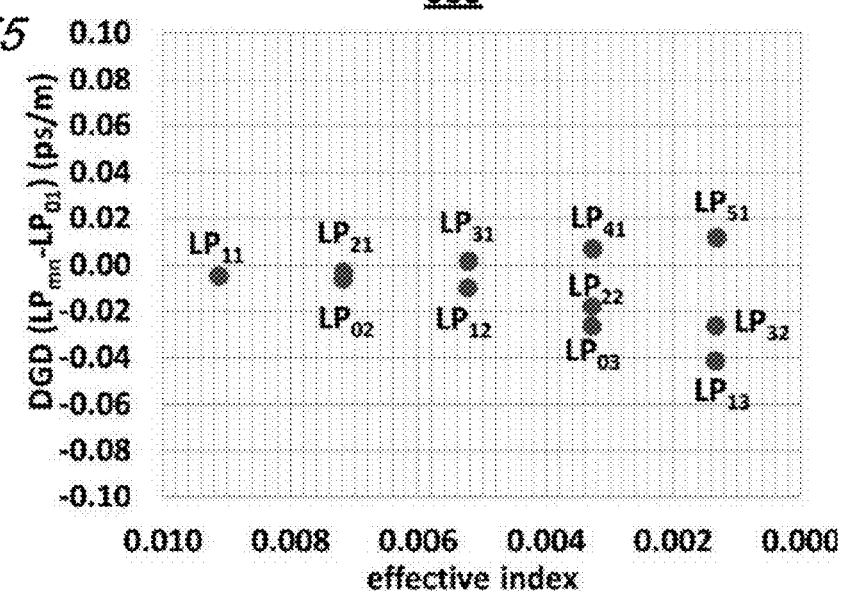
FIGS. 54 and 55 set forth data for another example of a 12 LP mode FMF according to the invention (Example 12)

FIGS. 54 and 55 set forth data describing another example of a 12 LP mode FMF according to the invention.

FIG. 54 shows a table 540 setting forth the following parameters for Regions 1-4 of the FMF: start index, end index, alpha (α), and width (μm). Generally speaking, for a 12 LP-mode fiber according to the present invention, a suitable width for the graded-index core is approximately 16 μm or greater.

FIG. 55 shows a plot 550 of the respective effective index and DGD for the higher-order modes supported by the FMF.

EXAMPLE 13

16 LP Modes

Figures 56, 57:
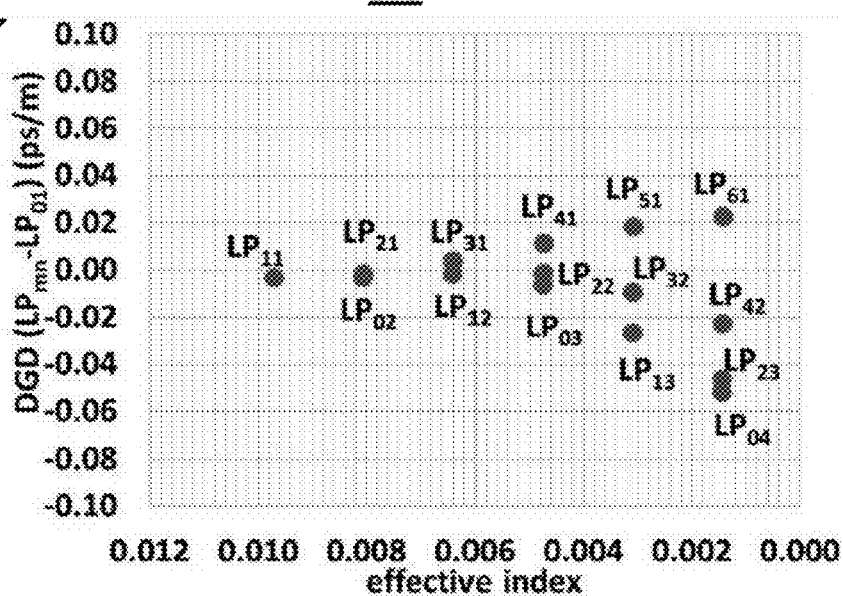
FIGS. 56 and 57 set forth data for another example of a 16 LP mode FMF according to the invention (Example 13)

FIGS. 56 and 57 set forth data describing another example of a 16 LP mode FMF according to the invention.

FIG. 56 shows a table 560 setting forth the following parameters for the Regions 1-4 of the FMF: start index, end index, alpha (α), and width (μm). Generally speaking, for a 12 LP-mode fiber according to the present invention, a suitable width for the graded-index core is approximately 19 μm or greater.

FIG. 57 shows a plot 570 of the respective effective index and DGD for the higher-order modes supported by the FMF.

EXAMPLE 14

20 LP Modes

Figures 58, 59:
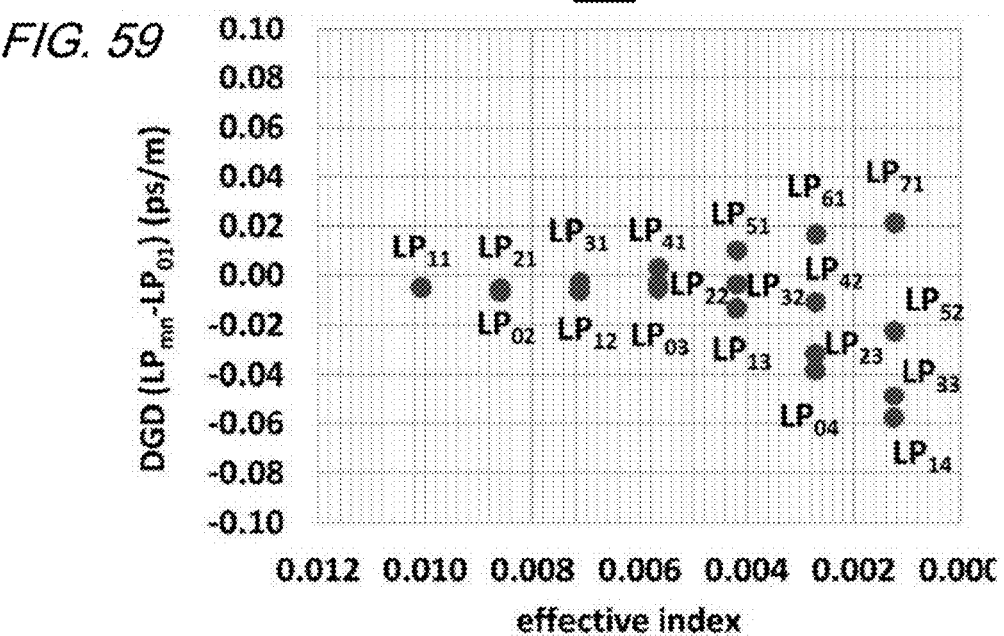
FIGS. 58 and 59 set forth data for another example of a 20 LP mode FMF according to the invention (Example 14)
Figure 60A:
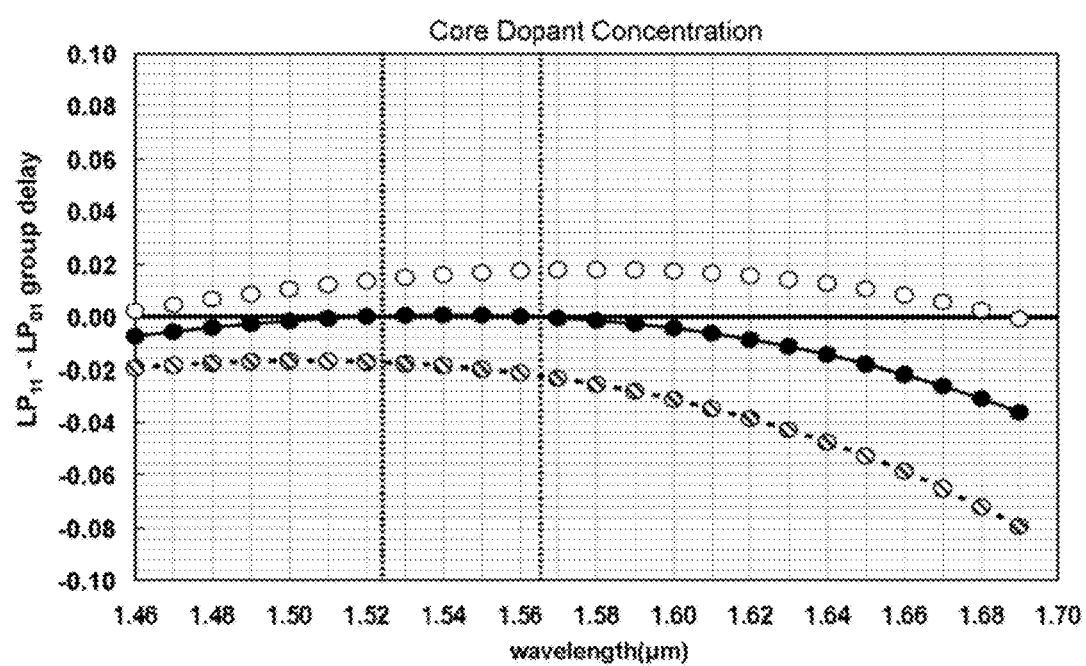
FIGS. 60A-60F are a series of figures illustrating the sensitivity of DGD between the $LP_{01}$ and $LP_{11}$ modes to variations in a number of design parameters for an exemplary 2 LP mode FMF.
Figure 60B:
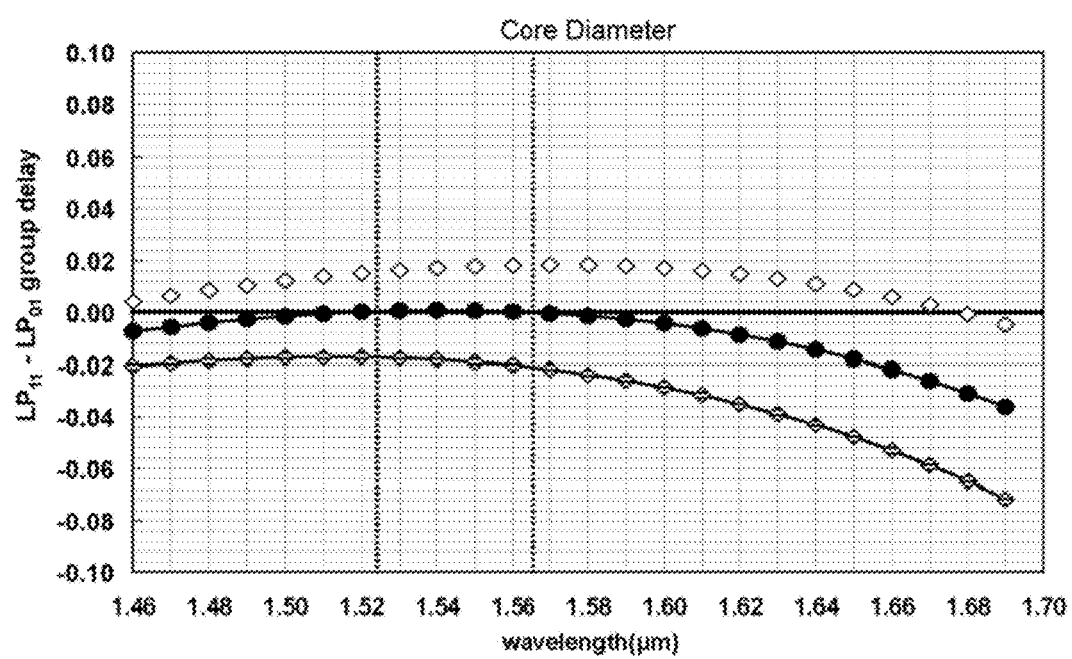
Figure 60C:
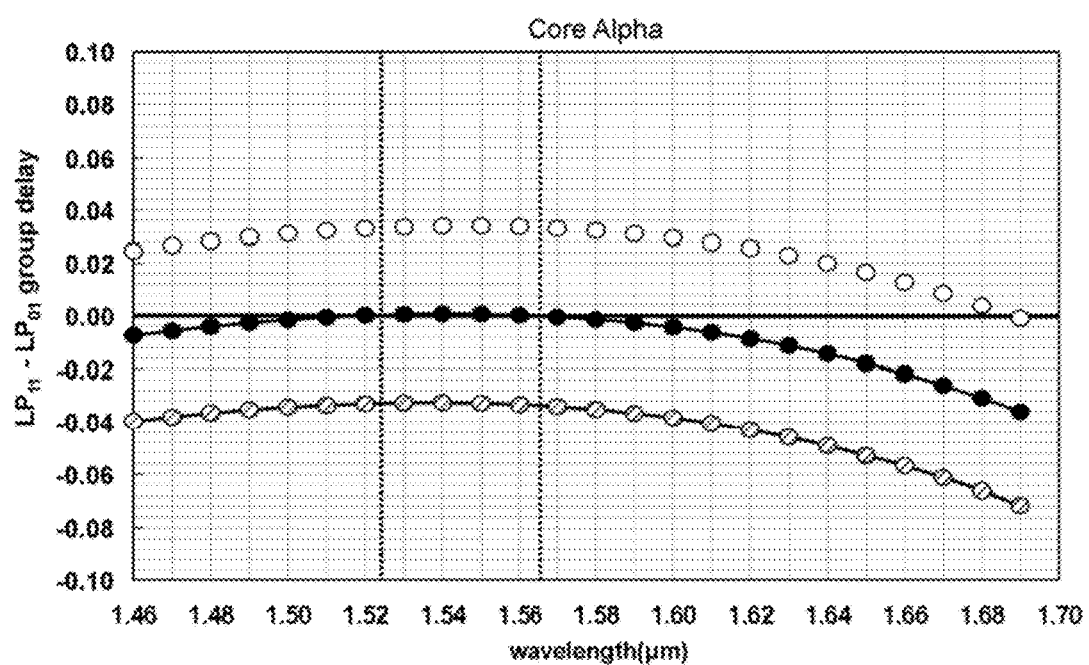
Figure 60D:
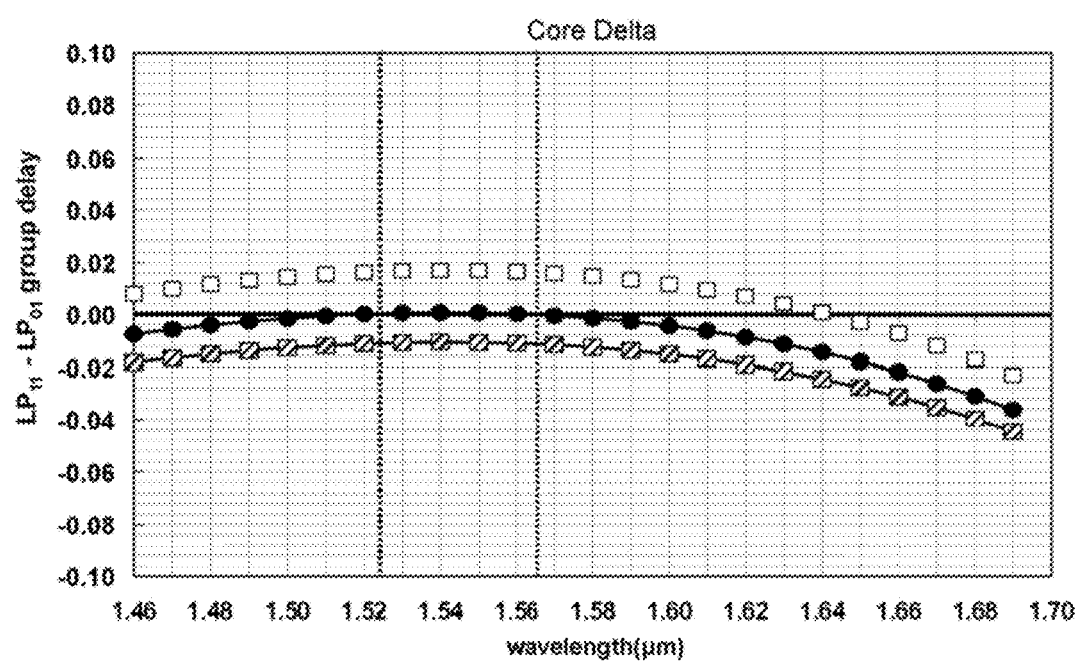
Figure 60E:
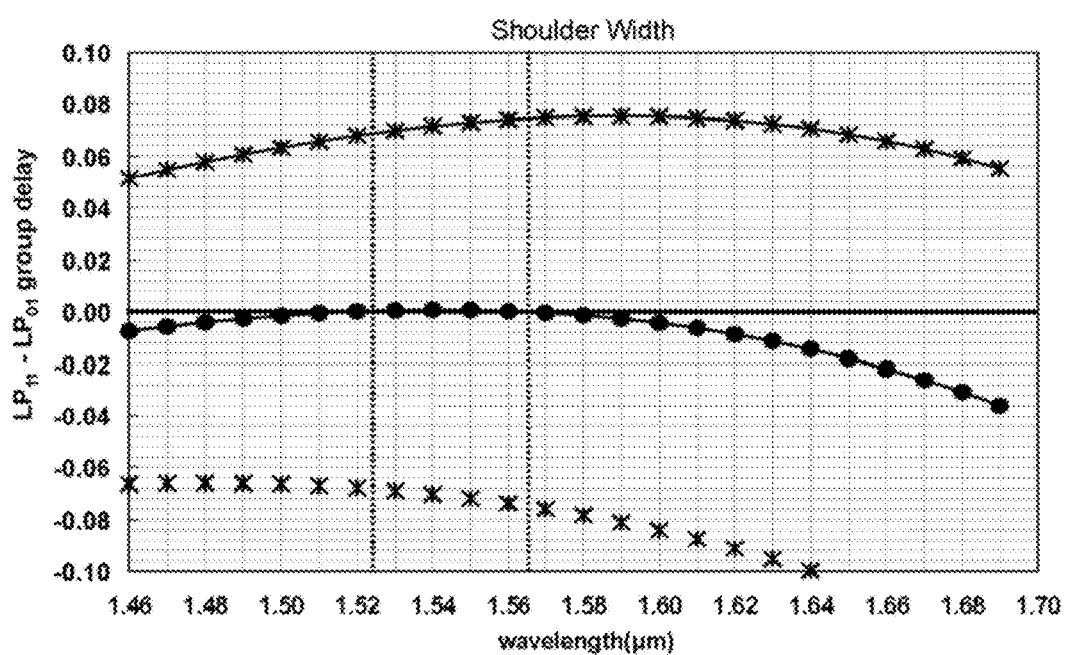
Figure 60F:
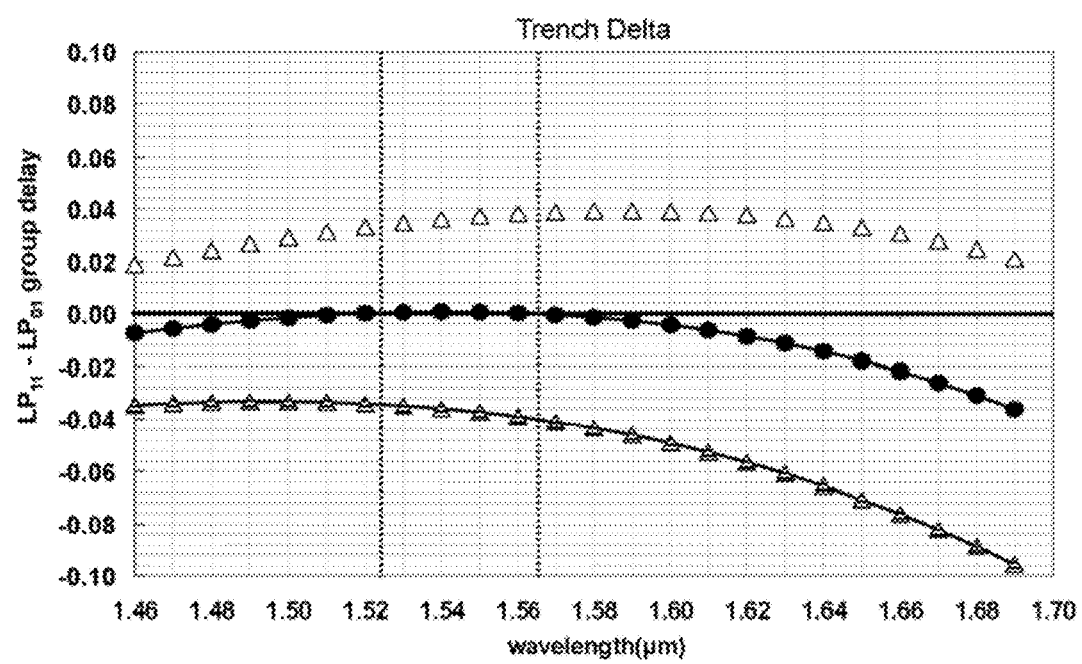

FIGS. 58 and 59 set forth data describing another example of a 20 LP mode FMF according to the invention.

FIG. 58 shows a table 580 setting forth the following parameters for Regions 1-4 of the FMF: start index, end index, alpha (α), and width (μm). Generally speaking, for a 20 LP-mode fiber according to the present invention, a suitable width for the graded-index core is approximately 22 μm or greater.

FIG. 59 shows a plot 590 of the respective effective index and DGD for the higher-order modes supported by the FMF.
Sensitivity of DGD with Respect to Various Design Parameters Generally speaking, DGD varies as a function of a number of fiber design parameters, including core dopant profile concentration, core diameter, core alpha, core delta, shoulder width, trench delta, and trench thickness.

The sensitivity of DGD to the above parameters was investigated with respect to an exemplary two-mode fiber design supporting propagation of the $LP_{01}$ and $LP_{11}$ modes. The following table sets forth the simulation parameters used in the investigation:

| Col. 1 Parameter | Col. 2 Design | Col. 3 Lowered | Col. 4 Raised |
|---|---|---|---|
| A. Core Dopant Concentration (FIG. 60A) | 1.00 (nominal) | 0.98 | 1.02 |
| B. Core Diameter (FIG. 60B) | 7.47 μm | 7.37 μm | 7.57 μm |
| C. Core Alpha (FIG. 60C) | 2.014 | 2.004 | 2.024 |
| D. Core Delta (FIG. 60D) | 0.95% | 0.90% | 1.00% |
| E. Shoulder Width (FIG. 60E) | 0.6544 μm | 0.5544 μm | 0.7544 μm |
| F. Trench Delta (FIG. 60F) | −0.41% | −0.39% | −0.43% |
| G. Trench Thickness (not shown) | 5 μm | 5 μm (no change) | 5 μm (no change) |

Column 1 sets forth the parameters that were investigated; Column 2 sets forth the design parameters for the exemplary two-mode FMF; Column 3 sets forth a selected lowered parameter value; and Column 4 sets forth a selected raised parameter value.

FIGS. 60A-60F are a series of figures illustrating the relationship between DGD and wavelength for the $LP_{01}$ and $LP_{11}$ modes for each of the above parameters. In each of these figures, the DGD data for the unmodified fiber is shown as a central plot; the DGD data for the lowered parameter is shown as a plot below the central plot; the DGD data for the raised parameter is shown as a plot above the central plot.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. An optical fiber, comprising:
a graded-index core and a surrounding cladding, wherein the cladding comprises a ledge surrounding the graded-index core, a down-doped trench surrounding the ledge, and an undoped cladding region surrounding the trench, wherein the core and cladding have a refractive index profile that is structured to support propagation of a spatially multiplexed optical signal comprising a plurality of desired signal-carrying modes, while suppressing undesired modes,
wherein the undesired modes comprise leaky modes, comprising modes having respective effective indices that are lower than the cladding index, so as to be unguided, and one or more lossy modes, comprising high-loss guided modes having respective effective indices that are close to the cladding index, wherein the index spacing between the desired mode having the lowest effective index and the undesired mode with the highest effective index is sufficiently large so as to substantially prevent coupling therebetween,
wherein the optical fiber is structured to support nine desired modes, divided into five mode groups: a first mode group comprising the $LP_{01}$ mode; a second mode group comprising the $LP_{11}$ mode; a third mode group comprising the $LP_{02}$ and $LP_{21}$ modes; a fourth mode group comprising the $LP_{12}$ and $LP_{31}$ modes; and a fifth mode group comprising the $LP_{03}$, $LP_{22}$, and $LP_{41}$ modes; and wherein one or more of the next higher-order modes beyond the fifth mode group are lossy modes, and wherein the higher modes beyond the lossy modes are leaky modes,
wherein the graded-index core has
a starting refractive index difference $\Delta n$, relative to the undoped cladding region, of 0.0068, and an ending refractive index difference $\Delta n$ of 0.0000;
an alpha parameter of 1.9870; and
a radial width of 17.80 μm;
wherein the ledge has
a starting refractive index difference $\Delta n$ of 0.0000, and an ending refractive index difference $\Delta n$ of 0.0000;
an alpha parameter of 0.0000; and
a radial width of 1.80 μm;
wherein the trench has
a starting refractive index difference $\Delta n$ of −0.0040, and an ending refractive index difference $\Delta n$ of −0.0040;
an alpha parameter of 0.0000; and
a radial width of 5.00 μm; and
wherein the undoped cladding region has
a starting refractive index difference $\Delta n$ of 0.0000, and an ending refractive index difference $\Delta n$ of 0.0000;
an alpha parameter of 0.0000; and
a radial width of 31.00 μm.

2. An optical fiber, comprising:
a graded-index core and a surrounding cladding, wherein the cladding comprises a ledge surrounding the graded-index core, a down-doped trench surrounding the ledge, and an undoped cladding region surrounding the trench, wherein the core and cladding have a refractive index profile that is structured to support propagation of a spatially multiplexed optical signal comprising a plurality of desired signal-carrying modes, while suppressing undesired modes,
wherein the undesired modes comprise leaky modes, comprising modes having respective effective indices that are lower than the cladding index, so as to be unguided, and one or more lossy modes, comprising high-loss guided modes having respective effective indices that are close to the cladding index, wherein the index spacing between the desired mode having the lowest effective index and the undesired mode with the highest effective index is sufficiently large so as to substantially prevent coupling therebetween,
wherein the optical fiber is structured to support nine desired modes, divided into five mode groups: a first mode group comprising the $LP_{01}$ mode; a second mode group comprising the $LP_{11}$ mode; a third mode group comprising the $LP_{02}$ and $LP_{21}$ modes; a fourth mode group comprising the $LP_{12}$ and $LP_{31}$ modes; and a fifth mode group comprising the $LP_{03}$, $LP_{22}$, and $LP_{41}$ modes; and wherein one or more of the next higher-order modes beyond the fifth mode group are lossy modes, and wherein the higher modes beyond the lossy modes are leaky modes,
wherein the graded-index core has
a starting refractive index difference $\Delta n$, relative to the undoped cladding region, of 0.0068, and an ending refractive index difference $\Delta n$ of 0.0000;
an alpha parameter of 1.9835; and
a radial width of 14.00 μm;
wherein the ledge has
a starting refractive index difference $\Delta n$ of 0.0000, and an ending refractive index difference $\Delta n$ of 0.0000;
an alpha parameter of 0.0000; and
a radial width of 1.39 μm;
wherein the trench has
a starting refractive index difference $\Delta n$ of −0.0050, and an ending refractive index difference $\Delta n$ of −0.0050;
an alpha parameter of 0.0000; and
a radial width of 6.00 μm; and
wherein the undoped cladding region has
a starting refractive index difference $\Delta n$ of 0.0000, and an ending refractive index difference $\Delta n$ of 0.0000;
an alpha parameter of 0.0000; and
a radial width of 31.00 μm.

3. An optical fiber, comprising:
a graded-index core and a surrounding cladding, wherein the cladding comprises a ledge surrounding the graded-index core, a down-doped trench surrounding the ledge, and an undoped cladding region surrounding the trench, wherein the core and cladding have a refractive index profile that is structured to support propagation of a spatially multiplexed optical signal comprising a plurality of desired signal-carrying modes, while suppressing undesired modes, wherein the undesired modes comprise leaky modes, comprising modes having respective effective indices that are lower than the cladding index, so as to be unguided, and one or more lossy modes, comprising high-loss guided modes having respective effective indices that are close to the cladding index, wherein the index spacing between the desired mode having the lowest effective index and the undesired mode with the highest effective index is sufficiently large so as to substantially prevent coupling therebetween, wherein the optical fiber is structured to support nine desired modes, divided into five mode groups: a first mode group comprising the $LP_{01}$ mode; a second mode group comprising the $LP_{11}$ mode; a third mode group comprising the $LP_{02}$ and $LP_{21}$ modes; a fourth mode group comprising the $LP_{12}$ and $LP_{31}$ modes; and a fifth mode group comprising the $LP_{03}$, $LP_{22}$, and $LP_{41}$ modes; and wherein one or more of the next higher-order modes beyond the fifth mode group are lossy modes, and wherein the higher modes beyond the lossy modes are leaky modes, wherein the graded-index core has
  a starting refractive index difference $\Delta n$, relative to the undoped cladding region, of 0.0095, and an ending refractive index difference $\Delta n$ of 0.0000;
  an alpha parameter of 1.9820; and
  a radial width of 13.500 µm;
wherein the ledge has
  a starting refractive index difference $\Delta n$ of 0.0000, and an ending refractive index difference $\Delta n$ of 0.0000;
  an alpha parameter of 0.0000; and
  a radial width of 1.535 µm;
wherein the trench has
  a starting refractive index difference $\Delta n$ of −0.0060, and an ending refractive index difference $\Delta n$ of −0.0060;
  an alpha parameter of 0.0000; and
  a radial width of 5.0000 µm; and
wherein the undoped cladding region has
  a starting refractive index difference $\Delta n$ of 0.0000, and an ending refractive index difference $\Delta n$ of 0.0000;
  an alpha parameter of 0.0000; and
  a radial width of 31.0000 µm.

4. An optical fiber, comprising:
a graded-index core and a surrounding cladding, wherein the cladding comprises a ledge surrounding the graded-index core, a down-doped trench surrounding the ledge, and an undoped cladding region surrounding the trench, wherein the core and cladding have a refractive index profile that is structured to support propagation of a spatially multiplexed optical signal comprising a plurality of desired signal-carrying modes, while suppressing undesired modes, wherein the undesired modes comprise leaky modes, comprising modes having respective effective indices that are lower than the cladding index, so as to be unguided, and one or more lossy modes, comprising high-loss guided modes having respective effective indices that are close to the cladding index, wherein the index spacing between the desired mode having the lowest effective index and the undesired mode with the highest effective index is sufficiently large so as to substantially prevent coupling therebetween, wherein the fiber is structured to support twelve desired modes, divided into six mode groups: a first mode group comprising the $LP_{01}$ mode; a second mode group comprising the $LP_{11}$ mode; a third mode group comprising the $LP_{02}$ and $LP_{21}$ modes; a fourth mode group comprising the $LP_{12}$ and $LP_{31}$ modes; a fifth mode group comprising the $LP_{03}$, $LP_{22}$, and $LP_{41}$ modes; and a sixth mode group comprising the $LP_{13}$, $LP_{32}$ and $LP_{51}$ modes, and wherein one or more of the next hi her-order modes be and the sixth mode group are lossy modes, and wherein the higher modes beyond the lossy modes are leaky modes, wherein the graded-index core has
  a starting refractive index difference $\Delta n$, relative to the undoped cladding region, of 0.0095, and an ending refractive index difference $\Delta n$ of 0.0000;
  an alpha parameter of 1.9830; and
  a radial width of 17.00 µm;
wherein the ledge has
  a starting refractive index difference $\Delta n$ of 0.0000, and an ending refractive index difference $\Delta n$ of 0.0000;
  an alpha parameter of 0.0000; and
  a radial width of 1.38 µm;
wherein the trench has
  a starting refractive index difference $\Delta n$ of −0.0040, and an ending refractive index difference $\Delta n$ of −0.0040;
  an alpha parameter of 0.0000; and
  a radial width of 5.00 µm; and
wherein the undoped cladding region has
  a starting refractive index difference $\Delta n$ of 0.0000, and an ending refractive index difference $\Delta n$ of 0.0000;
  an alpha parameter of 0.0000; and
  a radial width of 31.00 µm.

5. An optical fiber, comprising:
a graded-index core and a surrounding cladding, wherein the cladding comprises a ledge surrounding the graded-index core, a down-doped trench surrounding the ledge, and an undoped cladding region surrounding the trench, wherein the core and cladding have a refractive index profile that is structured to support propagation of a spatially multiplexed optical signal comprising a plurality of desired signal-carrying modes, while suppressing undesired modes, wherein the undesired modes comprise leaky modes, comprising modes having respective effective indices that are lower than the cladding index, so as to be unguided, and one or more lossy modes, comprising high-loss guided modes having respective effective indices that are close to the cladding index, wherein the index spacing between the desired mode having the lowest effective index and the undesired mode with the highest effective index is sufficiently large so as to substantially prevent coupling therebetween, wherein the fiber is structured to support sixteen desired modes, divided into seven mode groups: a first mode group comprising the $LP_{01}$ mode; a second mode group comprising the $LP_{11}$ mode; a third mode group comprising the $LP_{02}$ and $LP_{21}$ modes; a fourth mode group comprising the $LP_{12}$ and $LP_{31}$ modes; a fifth mode group comprising the $LP_{03}$, $LP_{22}$, and $LP_{41}$ modes; a sixth mode group comprising the $LP_{13}$, $LP_{32}$, and $LP_{51}$ modes; and a seventh mode group comprising the $LP_{O4}$, $LP_{23}$, $LP_{42}$, and $LP_{61}$ modes, wherein one or more of the next higher-order modes beyond the seventh mode group are lossy modes, and wherein the higher modes beyond the lossy modes are leaky modes, wherein the graded-index core has:
- a starting refractive index difference $\Delta n$, relative to the undoped cladding region, of 0.0095, and an ending refractive index difference $\Delta n$ of 0.0000;
- an alpha parameter of 1.9840; and
- a radial width of 20.00 μm;

wherein the ledge has
- a starting refractive index difference $\Delta n$ of 0.0000, and an ending refractive index difference $\Delta n$ of 0.0000;
- an alpha parameter of 0.0000; and
- a radial width of 1.60 μm;

wherein the trench has
- a starting refractive index difference $\Delta n$ of −0.0040, and an ending refractive index difference $\Delta n$ of −0.0040;
- an alpha parameter of 0.0000; and
- a radial width of 5.00 μm; and wherein the undoped cladding region has
- a starting refractive index difference $\Delta n$ of 0.0000, and an ending refractive index difference $\Delta n$ of 0.0000;
- an alpha parameter of 0.0000; and
- a radial width of 31.0000 μm.

6. An optical fiber, comprising:

a graded-index core and a surrounding cladding, wherein the cladding comprises a ledge surrounding the graded-index core, a down-doped trench surrounding the ledge, and an undoped cladding region surrounding the trench, wherein the core and cladding have a refractive index profile that is structured to support propagation of a spatially multiplexed optical signal comprising a plurality of desired signal-carrying modes, while suppressing undesired modes, wherein the undesired modes comprise leaky modes, comprising modes having respective effective indices that are lower than the cladding index, so as to be unguided, and one or more lossy modes, comprising high-loss guided modes having respective effective indices that are close to the cladding index, wherein the index spacing between the desired mode having the lowest effective index and the undesired mode with the highest effective index is sufficiently large so as to substantially prevent coupling therebetween, wherein the fiber is structured to support twenty desired modes, divided into eight mode groups: a first mode group comprising the $LP_{01}$ mode; a second mode group comprising the $LP_{11}$ mode; a third mode group comprising the $LP_{02}$ and $LP_{21}$ modes; a fourth mode group comprising the $LP_{12}$ and $LP_{31}$ modes; a fifth mode group comprising the $LP_{03}$, $LP_{22}$, and $LP_{41}$ modes; a sixth mode group comprising the $LP_{13}$, $LP_{32}$, and $LP_{51}$ modes; a seventh mode group comprising the $LP_{O4}$, $LP_{23}$, $LP_{42}$, and $LP_{61}$ modes; and an eighth mode group comprising the $LP_{14}$, $LP_{33}$, $LP_{52}$, and $LP_{71}$ modes, wherein one or more of the next higher-order modes beyond the eighth mode group are lossy modes, and wherein the higher modes beyond the lossy modes are leaky modes, wherein the graded-index core has
- a starting refractive index difference $\Delta n$, relative to the undoped cladding region, of 0.0095, and an ending refractive index difference $\Delta n$ of 0.0000;
- an alpha parameter of 1.9830; and
- a radial width of 22.50 μm;

wherein the ledge has
- a starting refractive index difference $\Delta n$ of 0.0000, and an ending refractive index difference $\Delta n$ of 0.0000;
- an alpha parameter of 0.0000; and
- a radial width of 1.75 μm;

wherein the trench has
- a starting refractive index difference $\Delta n$ of −0.0040, and an ending refractive index difference $\Delta n$ of −0.0040;
- an alpha parameter of 0.0000; and
- a radial width of 5.00 μm; and wherein the undoped cladding region has
- a starting refractive index difference $\Delta n$ of 0.0000, and an ending refractive index difference $\Delta n$ of 0.0000;
- an alpha parameter of 0.0000; and
- a radial width of 31.00 μm.

* * * * *